US009910061B2

(12) United States Patent
Waters et al.

(10) Patent No.: US 9,910,061 B2
(45) Date of Patent: Mar. 6, 2018

(54) SYSTEMS AND METHODS FOR EXTRACTING SYSTEM PARAMETERS FROM NONLINEAR PERIODIC SIGNALS FROM SENSORS

(71) Applicant: Lumedyne Technologies Incorporated, San Diego, CA (US)

(72) Inventors: Richard Lee Waters, San Diego, CA (US); John David Jacobs, San Diego, CA (US); Charles Harold Tally, IV, Carlsbad, CA (US); Xiaojun Huang, San Diego, CA (US); Yanting Zhang, San Diego, CA (US); Mark Steven Fralick, San Diego, CA (US)

(73) Assignee: Lumedyne Technologies Incorporated, San Diego, CA (US)

( * ) Notice: Subject to any disclaimer, the term of this patent is extended or adjusted under 35 U.S.C. 154(b) by 81 days.

(21) Appl. No.: 14/751,465

(22) Filed: Jun. 26, 2015

(65) Prior Publication Data
US 2015/0377917 A1  Dec. 31, 2015

Related U.S. Application Data

(60) Provisional application No. 62/035,237, filed on Aug. 8, 2014, provisional application No. 62/023,138, filed
(Continued)

(51) Int. Cl.
*G01P 15/125* (2006.01)
*G01C 19/5705* (2012.01)
(Continued)

(52) U.S. Cl.
CPC ........ *G01P 15/125* (2013.01); *G01C 19/5705* (2013.01); *G01C 19/5726* (2013.01); *G01C 19/5747* (2013.01); *G01P 15/0802* (2013.01)

(58) Field of Classification Search
CPC .............. G01C 19/5705; G01C 19/572; G01C 19/5747; G01P 15/0802; G01P 15/125; G01P 15/097
See application file for complete search history.

(56) References Cited

U.S. PATENT DOCUMENTS 3,925,642 A    12/1975  Roantree et al.
4,930,351 A *   6/1990  Macy ................. G01C 19/5607
                                              73/504.04
(Continued)

FOREIGN PATENT DOCUMENTS

EP    1083430    3/2001
EP    1172657    1/2002
(Continued)

OTHER PUBLICATIONS

International Search Report and Written Opinion dated Jan. 26, 2016 in PCT/US2015/038100, filed Jun. 26, 2015 (26 pages).
(Continued)

*Primary Examiner* — Helen Kwok
(74) *Attorney, Agent, or Firm* — Colby Nipper

(57) ABSTRACT

Systems and methods are disclosed herein for extracting system parameters from nonlinear periodic signals from sensors. A sensor such as an inertial device includes a first structure and a second structure that is springedly coupled to the first structure. The sensor is configured to generate an output voltage based on a current between the first and second structures. Monotonic motion of the second structure relative to the first structure causes a reversal in direction of the current.

22 Claims, 28 Drawing Sheets

Related U.S. Application Data on Jul. 10, 2014, provisional application No. 62/023,107, filed on Jul. 10, 2014, provisional application No. 62/017,782, filed on Jun. 26, 2014.

(51) Int. Cl.
  *G01P 15/08* (2006.01)
  *G01C 19/5726* (2012.01)
  *G01C 19/5747* (2012.01)

(56) References Cited

U.S. PATENT DOCUMENTS

| | | | |
|---|---|---|---|
| 5,561,400 A | 10/1996 | Iguchi et al. | |
| 5,635,638 A | 6/1997 | Green | |
| 5,703,292 A | 12/1997 | Ward | |
| 5,747,690 A | 5/1998 | Park et al. | |
| 5,894,282 A | 4/1999 | Betts et al. | |
| 5,955,668 A | 9/1999 | Hsu | |
| 5,996,411 A | 12/1999 | Leonardson et al. | |
| 6,044,707 A | 4/2000 | Kato | |
| 6,067,858 A | 5/2000 | Clark et al. | |
| 6,122,962 A | 9/2000 | Yoshino et al. | |
| 6,158,280 A | 12/2000 | Nonomura et al. | |
| 6,248,610 B1 | 6/2001 | Leondardson et al. | |
| 6,250,156 B1 | 6/2001 | Seshia et al. | |
| 6,259,999 B1* | 7/2001 | Pantle | B60R 21/013 |
| | | | 701/38 |
| 6,422,076 B1 | 7/2002 | Prokofiev et al. | |
| 6,526,826 B2 | 3/2003 | Kurachi et al. | |
| 6,629,460 B2 | 10/2003 | Challoner | |
| 6,715,353 B2 | 4/2004 | Johnson | |
| 6,796,178 B2 | 9/2004 | Jeong | |
| 6,966,224 B2 | 11/2005 | Yan et al. | |
| 7,107,841 B2 | 9/2006 | Mori | |
| 7,119,555 B2 | 10/2006 | Takekawa et al. | |
| 7,302,848 B2 | 12/2007 | Kourepenis et al. | |
| 7,444,868 B2 | 11/2008 | Johnson | |
| 7,481,110 B2 | 1/2009 | Handrich et al. | |
| 7,505,865 B2* | 3/2009 | Ohkubo | G01C 21/28 |
| | | | 340/425.5 |
| 7,836,765 B2 | 11/2010 | Challoner | |
| 7,997,137 B2 | 8/2011 | Lee et al. | |
| 8,061,201 B2 | 11/2011 | Ayazi et al. | |
| 8,141,426 B2 | 3/2012 | Ikeuchi | |
| 8,375,791 B2 | 2/2013 | Huang | |
| 8,378,756 B2 | 2/2013 | Huang | |
| 8,427,249 B1 | 4/2013 | Swanson et al. | |
| 8,453,504 B1 | 6/2013 | Mao | |
| 8,474,316 B2 | 7/2013 | Blomqvist | |
| 8,650,955 B2 | 2/2014 | Swanson et al. | |
| 8,833,162 B2 | 9/2014 | Seeger et al. | |
| 8,875,576 B2 | 11/2014 | Swanson et al. | |
| 8,952,838 B2 | 2/2015 | Waters et al. | |
| 8,981,834 B2* | 3/2015 | Spinella | G01P 15/125 |
| | | | 327/516 |
| 8,991,250 B2 | 3/2015 | Waters et al. | |
| 9,157,814 B2 | 10/2015 | Swanson et al. | |
| 9,170,107 B2 | 10/2015 | Anac et al. | |
| 9,194,704 B2 | 11/2015 | Lin et al. | |
| 9,246,017 B2 | 1/2016 | Van Der Heide et al. | |
| 9,274,136 B2 | 3/2016 | Trusov et al. | |
| 9,278,846 B2 | 3/2016 | Acar | |
| 9,423,254 B2* | 8/2016 | Waters | G01C 19/5705 |
| 9,618,533 B2* | 4/2017 | Waters | G01C 19/5705 |
| 9,645,166 B2* | 5/2017 | Waters | G01C 19/5705 |
| 2001/0022107 A1 | 9/2001 | Kato et al. | |
| 2001/0029784 A1 | 10/2001 | Kurachi et al. | |
| 2001/0039834 A1 | 11/2001 | Hsu | |
| 2002/0020219 A1 | 2/2002 | DeRoo et al. | |
| 2002/0093908 A1 | 7/2002 | Yeap | |
| 2003/0173981 A1 | 9/2003 | Fasen et al. | |
| 2004/0211258 A1 | 10/2004 | Geen | |
| 2005/0091006 A1* | 4/2005 | Rober | G01C 19/56 |
| | | | 702/189 |
| 2006/0074338 A1 | 4/2006 | Greenwald et al. | |
| 2006/0079191 A1 | 4/2006 | Parssinen et al. | |
| 2006/0162450 A1* | 7/2006 | Harada | G01C 9/06 |
| | | | 73/509 |
| 2006/0201250 A1 | 9/2006 | Kourepenis et al. | |
| 2006/0222107 A1 | 10/2006 | Neubauer et al. | |
| 2007/0032748 A1* | 2/2007 | McNeil | A61B 5/1038 |
| | | | 600/595 |
| 2007/0194857 A1 | 8/2007 | Schwarzelbach | |
| 2007/0210951 A1 | 9/2007 | Yamaji | |
| 2008/0000296 A1 | 1/2008 | Johnson | |
| 2008/0275664 A1* | 11/2008 | Schmid | B60R 21/01332 |
| | | | 702/141 |
| 2009/0064780 A1 | 3/2009 | Coronato et al. | |
| 2009/0183570 A1 | 7/2009 | Agar et al. | |
| 2010/0071467 A1 | 3/2010 | Nasiri et al. | |
| 2010/0107758 A1 | 5/2010 | Kandori et al. | |
| 2010/0107759 A1 | 5/2010 | Kato | |
| 2010/0319451 A1 | 12/2010 | Trusov et al. | |
| 2011/0004444 A1 | 1/2011 | Farrow et al. | |
| 2011/0016973 A1 | 1/2011 | Hamatani | |
| 2011/0041601 A1 | 2/2011 | Hsu et al. | |
| 2011/0167891 A1 | 7/2011 | Geen | |
| 2012/0065524 A1* | 3/2012 | Morren | A61B 5/1102 |
| | | | 600/484 |
| 2012/0096943 A1 | 4/2012 | Potasek et al. | |
| 2012/0272711 A1 | 11/2012 | Supino et al. | |
| 2012/0272732 A1 | 11/2012 | Leverrier | |
| 2012/0297873 A1 | 11/2012 | Zou et al. | |
| 2012/0326700 A1 | 12/2012 | Swanson et al. | |
| 2013/0061675 A1* | 3/2013 | Kim | G01P 15/125 |
| | | | 73/514.33 |
| 2013/0104622 A1 | 5/2013 | Swanson et al. | |
| 2013/0111990 A1* | 5/2013 | Wang | G01C 19/5776 |
| | | | 73/504.12 |
| 2013/0180333 A1 | 7/2013 | Swanson et al. | |
| 2013/0247669 A1 | 9/2013 | Swanson et al. | |
| 2013/0249615 A1 | 9/2013 | Lai et al. | |
| 2013/0283908 A1 | 10/2013 | Geen et al. | |
| 2013/0298670 A1 | 11/2013 | Tsugai et al. | |
| 2014/0007681 A1 | 1/2014 | Lin | |
| 2014/0047918 A1* | 2/2014 | Swanson | G01C 19/56 |
| | | | 73/504.12 |
| 2014/0060184 A1 | 3/2014 | Walther | |
| 2014/0069188 A1 | 3/2014 | Waters et al. | |
| 2014/0144230 A1 | 5/2014 | Magnoni et al. | |
| 2014/0144232 A1 | 5/2014 | Lin et al. | |
| 2014/0208823 A1 | 7/2014 | Trusov et al. | |
| 2014/0300425 A1 | 10/2014 | Cazzaniga et al. | |
| 2014/0305213 A1 | 10/2014 | Swanson et al. | |
| 2014/0361348 A1 | 12/2014 | Yoneoka et al. | |
| 2015/0211853 A1 | 7/2015 | Anac et al. | |
| 2015/0377622 A1 | 12/2015 | Waters et al. | |
| 2015/0377623 A1 | 12/2015 | Waters et al. | |
| 2015/0377916 A1 | 12/2015 | Waters et al. | |
| 2015/0377917 A1 | 12/2015 | Waters et al. | |
| 2015/0377918 A1 | 12/2015 | Waters et al. | |
| 2016/0126890 A1 | 5/2016 | Swanson et al. | |
| 2016/0341758 A1 | 11/2016 | Waters et al. | |
| 2016/0341761 A1* | 11/2016 | Waters | G01C 19/5705 |
| 2016/0341762 A1 | 11/2016 | Waters et al. | |
| 2017/0003314 A1 | 1/2017 | Waters et al. | |

FOREIGN PATENT DOCUMENTS

| | | |
|---|---|---|
| EP | 2259019 | 12/2010 |
| GB | 947310 | 1/1964 |
| GB | 2529277 | 2/2016 |
| JP | 02119314 | 5/1990 |
| JP | 2001135039 | 5/2001 |
| JP | 2006304035 | 11/2006 |
| WO | WO-00/05552 | 2/2000 |
| WO | 0169266 | 9/2001 |
| WO | WO 01/69266 | 9/2001 |
| WO | 2012037538 | 3/2012 |
| WO | 2014149085 | 9/2014 |
| WO | 2015200850 | 12/2015 |

(56) References Cited

FOREIGN PATENT DOCUMENTS

| WO | 2016187560 | 11/2016 |
|---|---|---|
| WO | 2017004443 | 1/2017 |
| WO | 2017095819 | 6/2017 |

OTHER PUBLICATIONS

U.S. Appl. No. 62/164,378, filed May 20, 2015, Waters et al.
U.S. Appl. No. 62/186,655, filed Jun. 30, 2015, Waters et al.
U.S. Appl. No. 13/847,521, filed Mar. 20, 2013, Swanson et al.
U.S. Appl. No. 14/954,749, filed Nov. 30, 2015, Waters et al.
U.S. Appl. No. 14/959,256, filed Dec. 4, 2015, Ricardo Emilio Dao.
International Search Report and Written Opinion dated Aug. 31, 2016 in PCT/US2016/033566, filed May 20, 2016 (11 pages).
Office Action dated Dec. 31, 2015 in U.S. Appl. No. 14/751,347, (16 pages).
Invitation to Pay Additional Fees dated Oct. 23, 2015 in PCT/US2015/038107 filed Jun. 26, 2015 (8 pages).
Invitation to Pay Additional Fees dated Nov. 5, 2015 in PCT/US2015/038100, filed Jun. 26, 2015 (8 pages).
Office Action dated Mar. 31, 2016 in U.S. Appl. No. 14/751,347, (16 pages).
"Final Office Action", U.S. Appl. No. 14/751,536, dated May 18, 2017, 14 pages.
"Non-Final Office Action", U.S. Appl. No. 14/954,749, dated Jul. 3, 2017, 9 pages.
"Non-Final Office Action", U.S. Appl. No. 14/751,536, dated Sep. 13, 2017, 8 pages.
"Non-Final Office Action", U.S. Appl. No. 14/751,536, dated Dec. 28, 2016, 20 pages.
"Signal Averaging", retrieved from http://en.wikipedia.org/w/index.php?title=Signal_averaging&oldid=382909172 on Oct. 13, 2017; As cited on EP Supplemental Search from EP Application 12825824.1 on Jun. 16, 2015, 3 pages.
"Written Opinion", PCT Application No. PCT/US2016/040538, dated Jan. 11, 2017, 11 pages.
"Written Opinion", PCT Application No. PCT/US2016/064023, dated Jun. 8, 2017, 7 pages.
"Written Opinion", PCT Application No. PCT/US2016/033566, dated Nov. 24, 2016, 6 pages.
Alshehri, et al., "Experimental Evaluation of a Two Degree of Freedom Capacitive MEMS Sensor for Velocity Measurements", Procedia Engineering, vol. 25, ISSN 1877-7058;, 2011, pp. 619-622.
Alshehri, et al., "Two-degree of Freedom Capacitive MEMS Velocity Sensor with Two Coupled Electrically Isolated Mass-Spring-Damper Systems", Sensors, IEEE, Valencia, 2014, pp. 1603-1606.
Kuijpers, "Micromachined Capacitive Long-Range Displacement Sensor for Nano-Positioning of Microactuator Systems", ISBN 90-365-2119-X, Dec. 8, 2004, 208 pages.
"International Search Report and Written Opinion", PCT Application No. PCT/US2017/044028, dated Jan. 9, 2018, 15 pages.
"International Search Report and Written Opinion", PCT Application No. PCT/US2017/044164, dated Nov. 6, 2017, 12 pages.
"International Search Report and Written Opinion", PCT Application No. PCT/US2017/044043, dated Nov. 6, 2017, 15 pages.
"Invitation to Pay Additional Fees and Partial Search Report", PCT Application No. PCT/US2017/044028, dated Nov. 17, 2017, 13 pages.
"Non-Final Office Action", U.S. Appl. No. 15/160,098, dated Jan. 2, 2018, 16 pages.
"Notice of Allowance", U.S. Appl. No. 14/751,536, dated Nov. 28, 2017, 7 pages.
"PCT International Search Report and Written Opinion", PCT Application No. PCT/US2017/044188, dated Oct. 30, 2017, 14 pages.
"Preliminary Report on Patentability", PCT Application No. PCT/US2016/033566, dated Nov. 30, 2017, 8 pages.

* cited by examiner

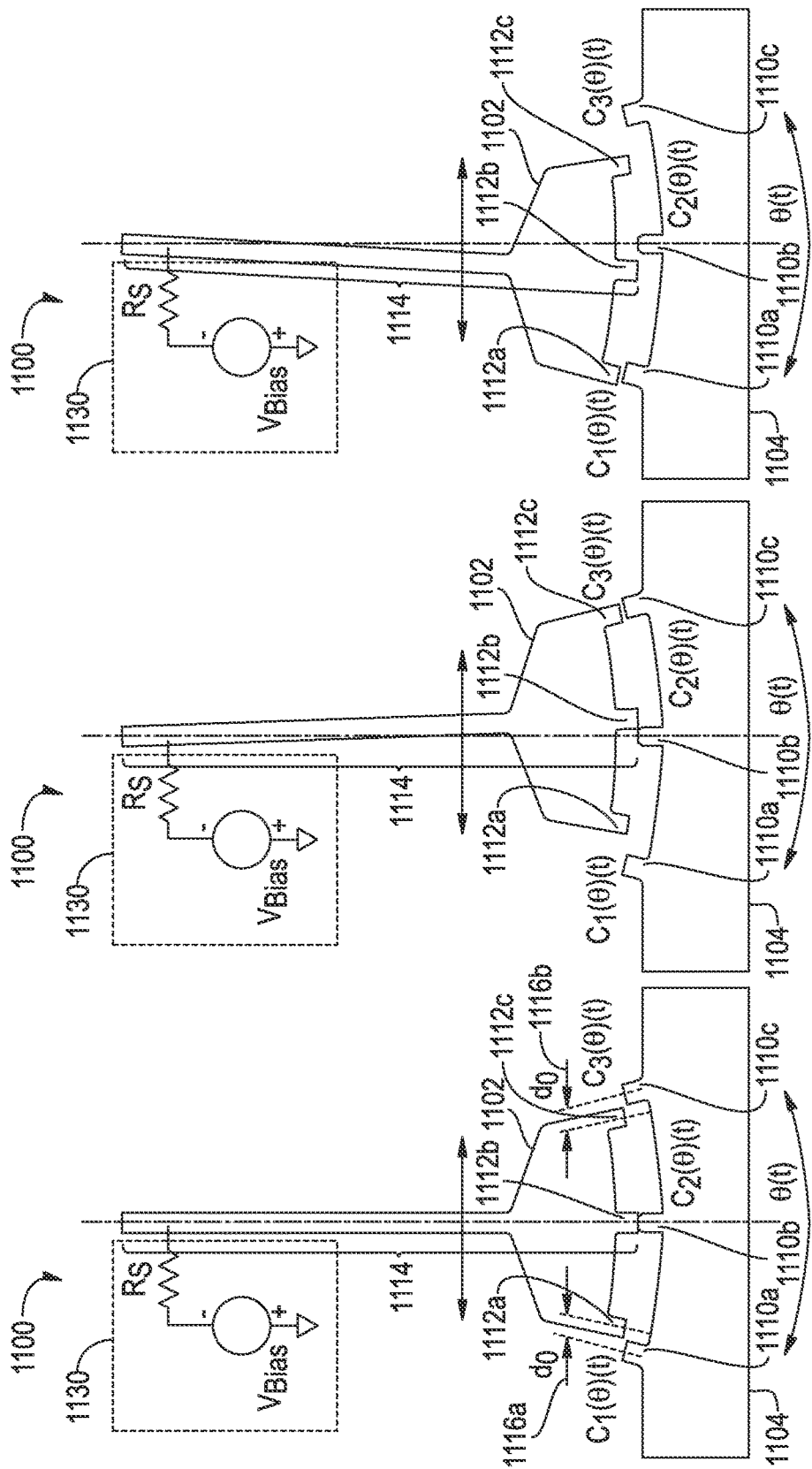

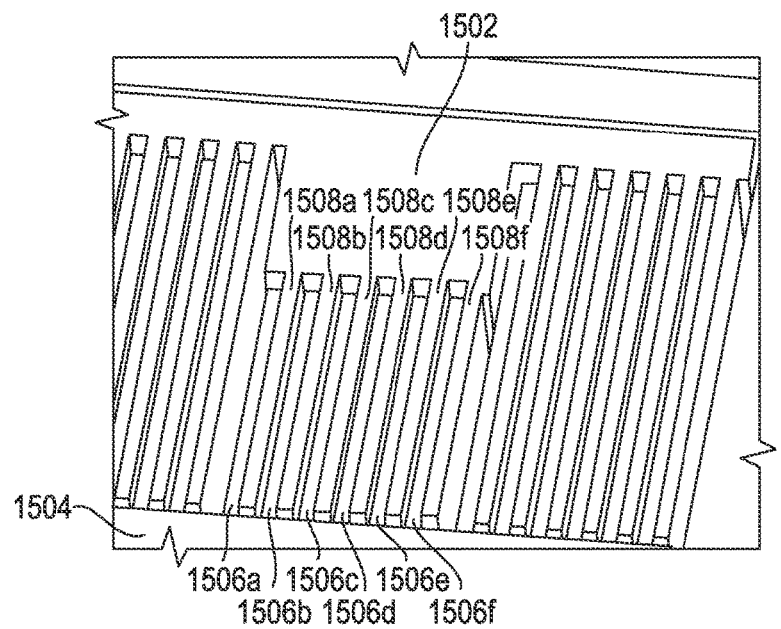
FIG. 15
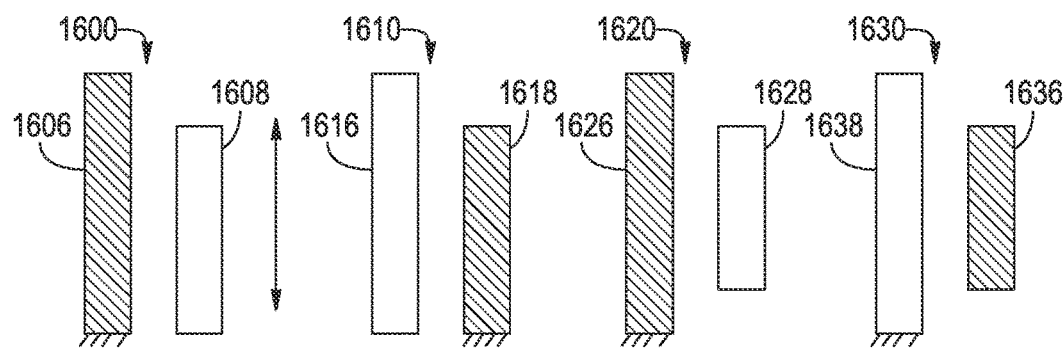
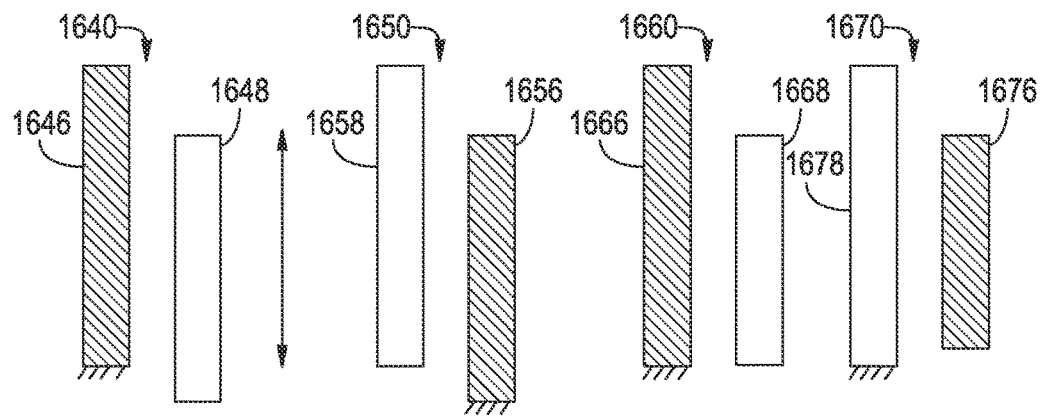
FIG. 16

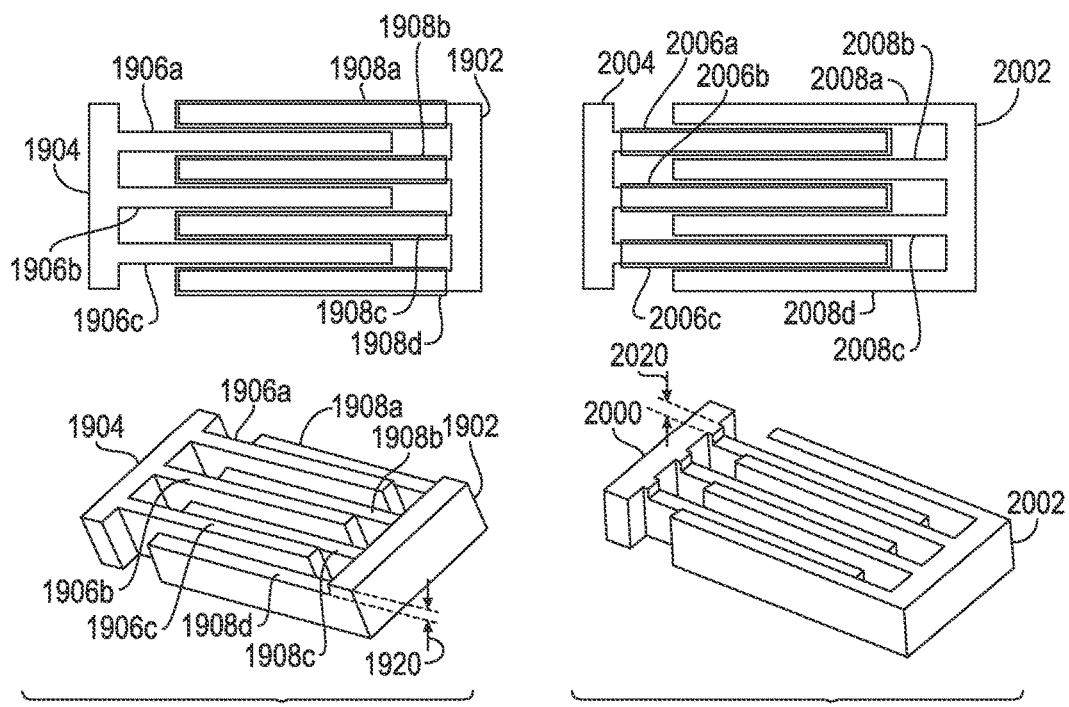
FIG. 19
FIG. 20
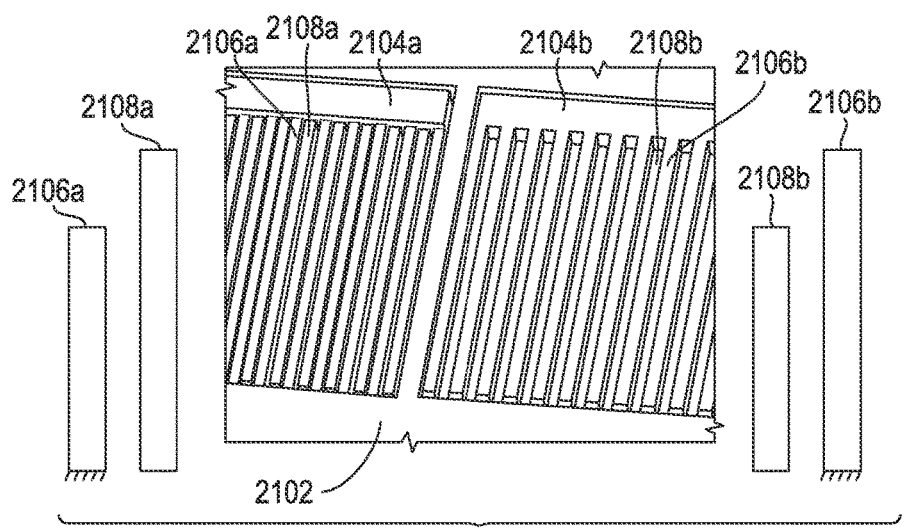
FIG. 21

SYSTEMS AND METHODS FOR EXTRACTING SYSTEM PARAMETERS FROM NONLINEAR PERIODIC SIGNALS FROM SENSORS

CROSS REFERENCE TO RELATED APPLICATIONS

This application claims priority to U.S. Provisional Application Ser. No. 62/017,782, filed Jun. 26, 2014, Ser. No. 62/023,138, filed Jul. 10, 2014, Ser. No. 62/023,107, filed Jul. 10, 2014, and Ser. No. 62/035,237, filed Aug. 8, 2014, of which the entire contents of each are hereby incorporated by reference.

FIELD OF THE INVENTION

In general, this disclosure relates to inertial sensors used to sense external perturbations such as acceleration and rotation. The inertial sensors are at scales ranging from microelectromechanical systems (MEMS) at the microscale, to mesoscale sensors, to large scale sensors.

BACKGROUND

A linear sensor measures an external perturbation by producing a system output that varies linearly with the external perturbation. A fixed scale factor can be used to describe the linear relationship between the external perturbation and the external output. The system output of the linear sensor can also include a fixed offset. However, both the scale factor and offset of the linear sensor can change over time due to many factors. These factors include changes in mechanical compliance due to temperature, long-term mechanical creep, changes in packaging pressure of sensors due to imperfect seals or internal outgassing, changes in quality factors of resonators, drift of one or more amplifier gain stages, capacitive charging effects, drift on bias voltages applied to the sensor, drift on any internal voltage reference required in a signal path, drift of input offset voltages, drift of any required demodulation phase and gain, and the like. In linear sensors, changes in the scale factor or the offset will result in changes in the system output, even if the external perturbation is not changed. This causes accuracy of linear sensors to degrade over time.

Controlling drift of sensor system output is important in many applications, especially those requiring performance at low frequencies. Low frequency, or 1/f, noise reduces low frequency performance. High levels of 1/f noise limit a sensor's ability to measure low frequency signals that may be masked by the 1/f noise. For example, navigation systems require good low-frequency performance with low 1/f noise and low drift. Because many useful navigation signals appear in the low frequency end of the spectrum, these must be accurately measured to compute position.

SUMMARY

Accordingly, systems and methods are described herein for extracting system parameters from nonlinear periodic signals from sensors. An inertial device comprises a first structure and a second structure that is springedly coupled to the first structure. The sensor is configured to generate an output voltage based on a current between the first and second structures. Monotonic motion of the second structure relative to the first structure causes a reversal in direction of the current.

In some examples, the inertial device includes a drive unit configured to oscillate the second structure relative to the first structure. The first structure can include a first plurality of equally spaced sub-structures. The second structure can include a second plurality of equally spaced sub-structures. The inertial device can include an output unit configured to output, based on the output voltage, an output signal indicating an external perturbation acting on the inertial device.

In some examples, motion of a first sub-structure of the first plurality of equally spaced sub-structures past an aligned position with a second sub-structure of the second plurality of equally spaced sub-structures causes the reversal in direction of the current.

The output signal can consist essentially of a first value and a second value. The output unit can be configured to output the first value as the output signal. The output unit can receive, from the sensor, the output voltage. The output unit can compare a value of the output voltage to a threshold. The output unit can output, based on the comparison, the second value as the output signal.

The output unit can compare the value of the output voltage to a plurality of thresholds. The output unit can determine, based on the comparison, that the output voltage crosses one of the plurality of thresholds. The output unit can toggle, based on the determination, the output signal between the first value and the second value.

In some examples, the output unit toggles the output signal in a toggling event. The inertial device further comprises a signal processing unit configured to receive the toggled output signal. The signal processing unit can determine a time between the toggling event and a subsequent toggling event. The signal processing unit can, based on the determined time, determine an inertial parameter of the inertial device. The signal processing unit can, based on the determined inertial parameter, output an inertial signal.

In some examples, the first plurality of equally spaced sub-structures is arranged along a first axis, such that distances along the first axis between adjacent sub-structures of the first plurality of equally spaced sub-structures are equal. The second plurality of equally spaced sub-structures is arranged along the first axis, such that distances along the first axis between adjacent sub-structures of the second plurality of equally spaced sub-structures are equal.

In some examples, the motion of the second periodic structure relative to the first periodic structure is along the first axis. The nonmonotonic change can occur due to alignment of the first and second pluralities of equally spaced sub-structures. In some examples, the nonmonotonic change can occur due to anti-alignment of the first and second pluralities of equally spaced substructures.

The first structure can comprise a third plurality of equally spaced sub-structures. Each of the first plurality of equally spaced sub-structures can be disposed on a respective sub-structure of the third plurality of equally spaced sub-structures. The second structure can comprise a fourth plurality of equally spaced sub-structures. Each of the second plurality of equally spaced sub-structures can be disposed on one of the fourth plurality of equally spaced sub-structures.

In some examples, each of the first and second pluralities of equally spaced sub-structures has a rectangular profile. In other examples, each of the first and second pluralities of equally spaced sub-structures has a non-rectangular profile.

The inertial device can include a voltage source unit configured to apply a constant voltage to one of the first and second structures. The inertial device can include a drive unit configured to drive the second structure in oscillatory motion relative to the first periodic structure. The oscillatory motion of the second structure relative to the first periodic structure results in oscillations in the current.

In some examples, motion of the inertial device results in first modulation of the oscillations in the current. The first modulation of the oscillations in the current can result in second modulation of the output signal. The drive unit can be configured to receive the modulated output signal. Based on the received modulated output signal, the drive unit can adjust the oscillatory motion of the second periodic structure relative to the first periodic structure.

The inertial device can include a voltage source unit configured to apply an oscillatory voltage to one of the first and second periodic structures. The oscillatory voltage results in oscillations in the current. Motion of the inertial device can result in first modulation of the oscillations in the current. The first modulation of the oscillations in the current can result in second modulation of the output signal.

In some examples, a nonlinear periodic signal is processed to determine inertial information. A nonlinear periodic input signal is received. The nonlinear periodic input signal is converted to a two-valued signal having first and second values. First and second transition times between the first and second values are determined. A trigonometric function is applied to an argument that includes the first and second transition times to determine a trigonometric result. An inertial parameter is extracted from the trigonometric result.

In some examples, applying the trigonometric function to the argument that includes the first and second transition times further includes determining a first time interval between the first and second transition times and applying the trigonometric function to an argument comprising the time interval to determine the trigonometric result.

Receiving the nonlinear periodic input signal can include receiving a first nonlinear periodic signal and a second nonlinear periodic signal. The first and second nonlinear periodic signals can be combined to result in the nonlinear periodic input signal.

Converting the nonlinear periodic input signal into the two-valued signal can include comparing a value of the nonlinear periodic signal to a threshold. If the value of the nonlinear periodic signal is above the threshold, the first value of the two-valued signal can be generated to correspond to the value of the nonlinear periodic signal. If the value of the nonlinear periodic signal is below the threshold, the second value of the two-valued signal can be generated to correspond to the value of the nonlinear periodic signal.

Determining a plurality of transition times can include comparing the generated value of the two-valued signal to an immediately previous value of the two-valued signal. If the generated value of the two-valued signal is above the immediately previous value, the first transition time can be determined to correspond to a rising edge of the two-valued signal. If the generated value of the two-valued signal is below the immediately previous value, the first transition time can be determined to correspond to a falling edge of the two-valued signal.

Applying the trigonometric function to the argument that includes the first time interval can further include receiving a second time interval and determining a sum of the first and second time intervals. A ratio of one of the first and second time intervals to the sum can be determined. An argument can be determined based on the ratio. A trigonometric function can be applied to the argument.

Extracting inertial parameters from the trigonometric result can include determining a displacement of an oscillating element based on the trigonometric result. The inertial parameter can be determined based on the displacement. The displacement can be determined based on a plurality of trigonometric results. The displacement can be determined based on a ratio including the plurality of trigonometric results.

Determining the inertial parameter can include determining an offset in the displacement. The inertial parameter can be determined based on the offset. The offset can be proportional to an acceleration.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 12 depicts a moveable element in a rest position, according to an illustrative implementation;

FIG. 13 depicts a moveable element displaced from a rest position in a first direction, according to an illustrative implementation;

FIG. 14 depicts a moveable element displaced from a rest position in a second direction, according to an illustrative implementation;

FIG. 15 depicts an inertial sensor fabricated from a semiconductor wafer and configured to detect acceleration normal to the plane of the wafer, according to an illustrative implementation;

FIG. 16 depicts eight configurations of fixed and moveable beams which can be used in inertial devices such as the inertial device depicted in FIG. 15, according to an illustrative implementation;

FIG. 19 depicts an inertial sensor with recessed movable beams used for measurement of perturbations in a vertical direction, according to an illustrative implementation;

FIG. 20 depicts an inertial sensor with recessed fixed beams used for measurement of perturbations in a vertical direction, according to an illustrative implementation;

FIG. 21 depicts a combined structure having both recessed fixed beams and recessed moveable beams, according to an illustrative implementation;

DETAILED DESCRIPTION

Figure 1:
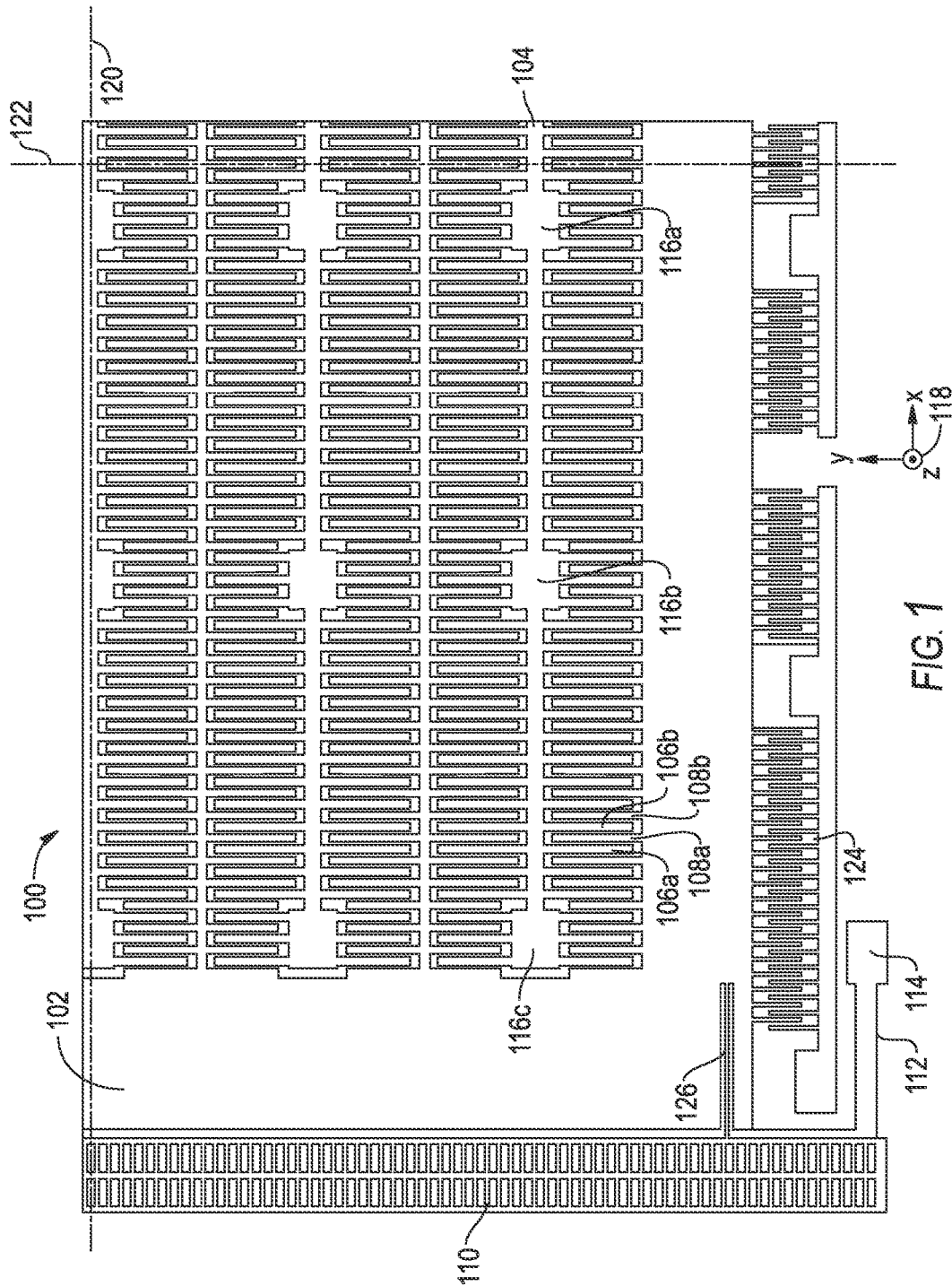
FIG. 1 depicts a periodic capacitive structure used to produce a nonlinear periodic signal, according to an illustrative implementation.

To provide an overall understanding of the disclosure, certain illustrative implementations will now be described, including systems and methods for extracting system parameters from nonlinear periodic signals from sensors. Nonlinear periodic signals from sensors contain significantly more information than linear signals and enable independent measurement of multiple system variables. Independent measurement of system variables allows signals representing an external perturbation to be measured to be decoupled from other factors affecting the system output. For example, an oscillatory mechanical system producing a nonlinear periodic output signal using an oscillator can enable independent measurement of oscillator amplitude, oscillator resonant frequency, offset of the oscillator (which is indicative of an external acceleration), jerk acting on the oscillator (indicative of the first time derivative of external acceleration), and temperature of the oscillator (via a measurement of the oscillator's resonant frequency).

The systems and methods described herein utilize periodic, nonlinear signals to extract system-level information from sensors, as well as information regarding external perturbations acting on the sensors. The systems and methods described herein utilize trigonometric relationships between the periodic nonlinear signals and known system parameters to extract information regarding the external perturbations. These nonlinear signals can be created electromechanically at the sensor level or by electronics that interface with the sensor. The trigonometric relationships can be computed in continuous fashion based on the required bandwidth of the system, or they can be computed periodically by periodically sampling the output signal.

The systems and methods described herein produce nonlinear periodic signals from structures that produce a non-monotonic output signal from monotonic motion of sensor components. Monotonicity is the property of not reversing direction or slope, although a monotonic signal can have a zero slope and monotonic motion can include no motion. Monotonic motion over a given range is motion that does not reverse within that range. Motion that begins in one direction, stops, and then continues in the same direction is considered monotonic since the motion does not reverse. Thus, one example of monotonic motion of a component would be motion of the component in a single direction, and one example of a non-monotonic signal is a signal that increases and then decreases. Some components can experience motion that is monotonic over one range of the motion and non-monotonic over another range of the motion. One example of such a component is a mechanical oscillator which travels in one direction to one extremum, momentarily stops, reverses directions, and travels in the reverse direction to a second extremum, where it stops and reverses back to the original direction of travel. For the range around the mid-point of the oscillator's travels, the oscillator's motion is monotonic. However, for a range that includes motion in both directions around an extremum, the motion is non-monotonic. An output signal that is directly proportional to the position of such an oscillator would be monotonic over ranges in which these oscillators' motion is monotonic, and the output signal would be non-monotonic over ranges in which the oscillator's motion is non-monotonic. However, the systems and methods described herein can produce non-monotonic output signals from motion of an oscillator over a range in which the motion is monotonic.

In some implementations, the sensor is a micro-electromechanical system (MEMS) sensor. In some implementations, the sensor includes periodic capacitive structures. In these implementations, the signal which changes non-monotonically due to monotonic motion of one or more components of the sensor is a capacitance of the sensor. In these implementations, capacitance, and changes in the capacitance, are measured using an analog front end such as a transimpedance amplifier. In some implementations, an output of the analog front end varies monotonically over ranges in which the capacitance varies non-monotonically, but the output crosses a reference level (such as zero or another pre-determined reference level) when the capacitance reverses slope.

FIG. 1 depicts a periodic capacitive structure 100 used to produce a nonlinear periodic signal. The structure 100 includes a moveable element 102, a fixed element 104, a comb drive 124, and a spring element 126. The moveable element 102 includes beams 108a and 108b (collectively, beams 108). The fixed element 104 includes beams 106a and 106b (collectively, beams 106). The moveable element 102 and the fixed element 104 can include additional beams. The fixed element 104 is rigidly fixed to the body of the sensor, and experiences the same external perturbations as the sensor. The structure 100 is fabricated using a conductive material such as doped silicon. The moveable element 102 is electrically isolated from the fixed element 104 to allow the application of an electronic bias voltage between the fixed element 104 and the moveable element 102. In some implementations, the moveable element 102 is electrically grounded while an electric bias is applied to the fixed element 104. In some implementations, the fixed element 104 is electrically grounded and an electric bias is applied to the moveable element 102. A sensing device such as a transimpedance amplifier or a current amplifier can be electrically connected to either of the fixed element 104 or the moveable element 102 to a capacitive or other electrical current resulting from operation of the sensor.

The moveable element 102 is springedly coupled to the fixed element 104 by the spring element 126. The comb drive 124 drives the moveable element 102 in oscillatory motion with respect to the fixed element 104. In some examples, the comb drive 124 oscillates the moveable element 102 at a resonant frequency of the structure 100. In some examples, the comb drive 124 oscillates the moveable element 102 at a frequency that is different than the resonant frequency of the structure 100. The resonant frequency of the structure 100 is governed at least in part by a mass of the moveable element 102 and a stiffness of the spring element 126. The stiffness of the spring element 126 is the inverse of a compliance of the spring element 126 and specifies an amount of force required to deflect the spring element 126 by a given distance. The stiffness is also referred to as a spring constant. The stiffness of the spring element 126 can also be affected by the temperature of the spring element 126, which is affected by an ambient temperature. Thus, changes in ambient or sensor temperature can result in changes in spring stiffness, resulting in changes in resonant frequency of the structure 100. While a single spring element 126 is depicted in FIG. 1, the system 100 can include multiple spring elements 108. Elements of the structure 100, such as the movable element 102, the fixed element 104, the comb drive 124, the spring element 126, sub-structures of these elements, and other elements of the structure 100 can be fabricated by etching vertically into a silicon substrate.

The fixed element 104 is attached to a silicon wafer below (not shown) by bonding lower surfaces of bonding pads such as bonding pads 116a, 116b, and 116c (collectively, bonding pads 116) to the lower silicon wafer. This bonding can be accomplished by using wafer bonding techniques. The moveable element 102 is springedly coupled to the lower silicon wafer by the spring element 126, the truss element 110, the spring element 112, and the bonding pad 114. The lower surface of the bonding pad 114 is also bonded to the lower wafer using wafer bonding techniques. The spring element 126, the truss element 110, and the spring element 112 comprise a linear spring system such that over a desired range of motion, the overall stiffness of the spring system is approximately constant. The truss element 110 can be substantially etched away leaving a grid structure as depicted in FIG. 1, the truss element 110 can be a solid piece, or the truss element 110 can be etched to a lesser degree than it is depicted in FIG. 1. FIG. 1 includes an axis depiction 118 showing orientation of the x, y, and z axes. As depicted, the comb drive 124 causes the moveable element 102 to oscillate along the y axis while moving minimally along the x and z axes. Coordinate systems other than the axis depiction 118 can be used.

For clarity, FIG. 1 depicts approximately one-fourth of the structure 100. The structure 100 is substantially symmetric along each of the lines of symmetry 120 and 122. A top-cap wafer (not shown) may be disposed above and bonded to the tops of the bonding pads 114 and 116 using wafer bonding techniques. The structure 100 can be hermetically sealed between the top and bottom cap wafers and evacuated to a desired vacuum level. The pressure of the pressure 100 affects the quality factor (Q factor) of the structure 100.

Because both the moving element 102 and the fixed element 104 are formed from a single wafer, the structure 100 is self-aligned such that the moving element 102 and the fixed element 104 are aligned perfectly when no force is applied. The elements 102 and 104 can be intentionally offset by an arbitrary amount as desired. Some examples of offset include 0°, 90°, 180°, 270°, or an arbitrary offset such as 146.3°. As described herein, angular offsets refer to phase offsets of a periodic function and are caused by linear offsets of one set of teeth with respect to another. These angular offsets are not necessarily caused by angular geometric offsets. As described herein, an offset of 0° indicates perfect alignment and 180° indicates an offset equal to a half-pitch of features disposed on the fixed element 104 and the moving element 102. The offset is determined by the mask layout used when etching the structure 100 and can be chosen to make use of convenient mathematical relationships or for force cancellation. In some examples, perfect alignment is not achieved due to manufacturing tolerances, but alignment errors are not significant compared to key dimensions of the sensor such as tooth pitch and tooth width.

Figure 2:
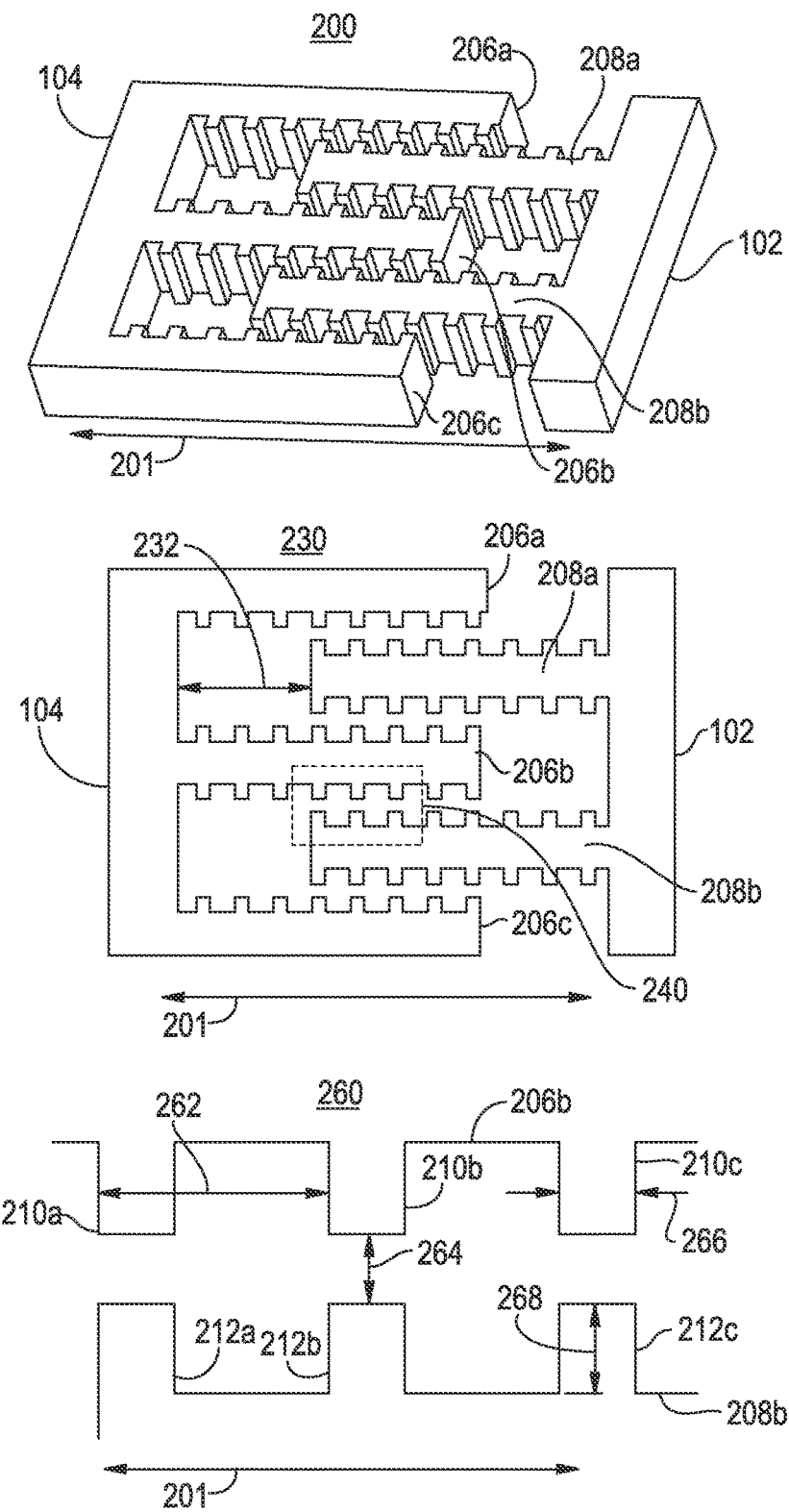
FIG. 2 depicts three views, each showing a schematic representation of parts of moveable elements 102 and a fixed element, according to an illustrative implementation.

FIG. 2 depicts three views 200, 230, and 260, each showing a schematic representation of parts of the moveable element 102 and the fixed element 104. The movable element 102 and the fixed element 104 depicted in FIG. 2 each include a plurality of structures, or beams. In particular, the fixed element 104 includes beams 206a, 206b, and 206c (collectively, beams 206). The moveable element 102 depicted in FIG. 2 includes beams 208a and 208b (collectively, beams 208). Each of the beams 206 and 208 can represent one of the beams 106 and 108, respectively. The moveable element 102 is separated from the fixed element 104 by a distance WO 232. The distance WO 232 can change as the moveable element 102 oscillates with respect to the fixed element 104. The distance WO 232 affects parasitic capacitance between the movable element 102 and the fixed element 104. The distance WO 232 while the movable element 102 is in the rest position is selected to minimize parasitic capacitance while maintaining manufacturability of the sensor. The view 260 depicts an area of interest noted by the rectangle 240 of view 230.

Each of the beams 206 and 208 includes multiple substructures, or teeth, protruding perpendicularly to the long axis of the beams. The beam 206b includes teeth 210a, 210b, and 210c (collectively, teeth 210). The beam 208b includes teeth 212a, 212b and 212c (collectively, teeth 212). Adjacent teeth on a beam are equally spaced according to a pitch 262. Each of the teeth 210 and 212 has a width defined by the line width 266 and a depth defined by a corrugation depth 268. Opposing teeth are separated by a tooth gap 264. As the moveable beam 208b oscillates along the moving axis 201 with respect to the fixed beam 206b, the tooth gap 264 remains unchanged. In some examples, manufacturing imperfections cause the tooth spacing to deviate from the pitch 262. However, provided that the deviation is negligible compared to the pitch 262, the deviation does not significantly impact operation of the sensor and can be neglected for the purposes of this disclosure.

A capacitance exists between the fixed beam 206b and the moveable beam 208b. As the moveable beam 208b oscillates along the moving axis 201 with respect to the fixed beam 206b, the capacitance changes. The capacitance increases as opposing teeth of the teeth 210 and 212 align with each other and decreases as opposing teeth become less aligned with each other. At the position depicted in the view 260, the capacitance is at a maximum and the teeth 210 are aligned with the teeth 212. As the moveable beam moves monotonically along the moving axis 201, the capacitance changes non-monotonically, since a maximum in capacitance occurs as the teeth are aligned.

The capacitance can be degenerate meaning that the same value of capacitance can occur at different displacements of the moveable beam 208b. When the moveable beam 208b has moved from its rest position by a distance equal to the pitch 262, the capacitance is the same as when the moveable beam 208b is in the rest position.

Figure 3:
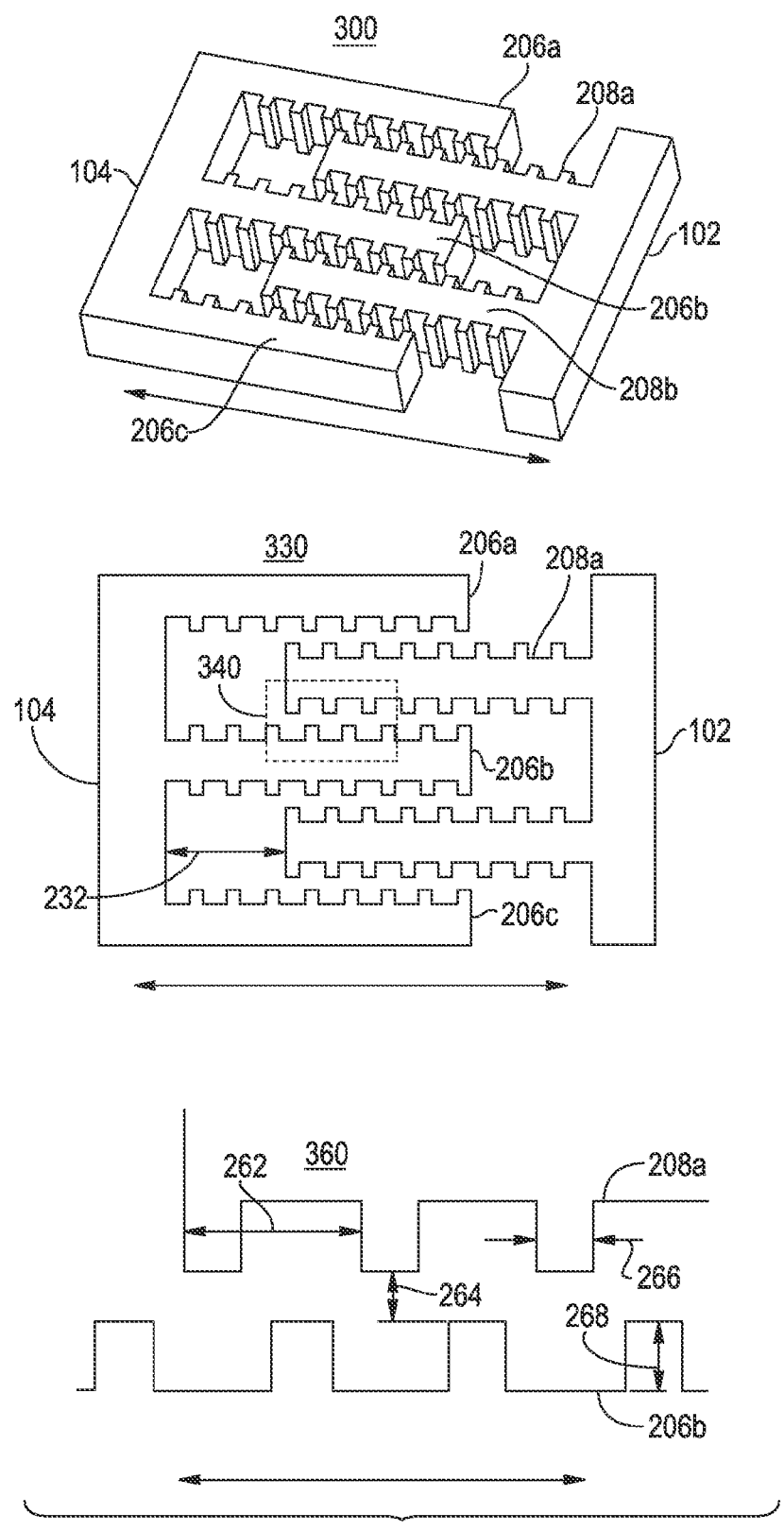
FIG. 3 depicts a moveable element displaced from its rest position by a distance equal to one-half of a pitch distance, according to an illustrative implementation.

FIG. 3 depicts the moveable element 102 displaced from its rest position by a distance equal to one-half the pitch 262. FIG. 3 includes three views 300, 330, and 360 depicting the fixed element 104 and the moveable element 102. As can be seen in the view 360 which depicts the area of interest 340, the teeth of the moveable beam 108a are aligned with the centers of the gaps between teeth of the fixed beam 206b. This anti-alignment produces a minimum in the capacitance and is referred to as a displacement of 180°.

The geometric parameters including the pitch 262, the tooth gap 264, the line width 266, and the corrugation depth 268 can be adjusted to achieve a desired capacitance and a desired change of capacitance with displacement. For example, the parameters can be adjusted to maximize overall capacitance, to maximize a first derivative of the capacitance with respect to displacement or time, to maximize a second derivative of the capacitance with respect to displacement or time, or to maximize a capacitance ratio such as a change in capacitance with respect to an overall capacitance. The distance WO 232 at the rest position can be adjusted to allow oscillator motion and to minimize parallel plate effects on capacitance at maximum displacement. While the same overall behavior of capacitance with respect to motion of the moveable element 102 can be achieved by using only one pair of teeth on a single pair of beams, multiple teeth and multiple beams can be used as depicted in FIGS. 1-3 to provide an improved signal-to-noise ratio.

In some implementations, the structure 100 includes opposing teeth that are offset by 180° at the rest position. Thus, for this configuration, FIG. 3 depicts the device at rest, rather than at a displacement of 180°. In some implementations, the device 100 includes teeth that are offset by angles other than 180°.

Figure 4:
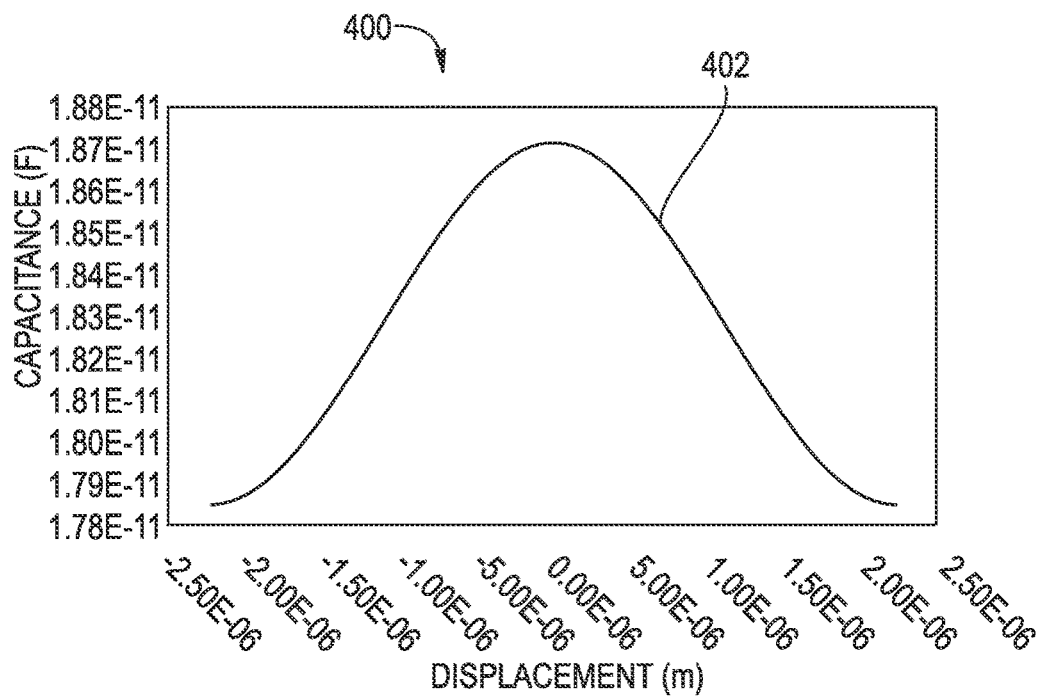
FIG. 4 depicts a graph that shows a dependence of capacitance on displacement, according to an illustrative implementation.

FIG. 4 depicts a graph 400 that shows a dependence of capacitance on displacement. The graph 400 includes a curve 402 representing capacitance between a single pair of opposing teeth. As depicted in the graph 400, capacitance has a maximum at zero displacement and decreases with any nonzero displacement. Accordingly, as displacement monotonically increases from −2 μm to +2 μm, the capacitance varies non-monotonically because it increases and then decreases. This capacitance can be modeled using harmonic functions to arrive at an expression for capacitance as a function of distance as shown in Equation 1. Equations such as equation 1 can be used in circuit design models to predict displacement as a function of capacitance.

$$C(x) = A + B\cos\left(\frac{2\pi}{P}x\right) + C\cos\left(\frac{4\pi}{P}x\right) + \\ D\cos\left(\frac{6\pi}{P}x\right) + E\cos\left(\frac{8\pi}{P}x\right) + F\cos\left(\frac{10\pi}{P}x\right) + G\cos\left(\frac{12\pi}{P}x\right) \quad (1)$$

Figure 5:
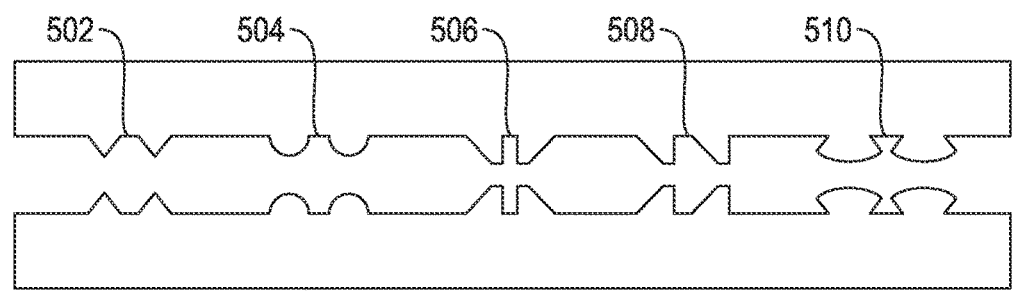
FIG. 5 depicts shapes of teeth that are tailored to produce different dependences of capacitance on displacement, according to an illustrative implementation.

FIG. 5 depicts shapes of teeth that are tailored to produce different dependences of capacitance on displacement. FIG. 5 includes triangular teeth 502, semi-circular teeth 504, mirrored trapezoidal teeth 506, non-mirrored trapezoidal teeth 508, and curved teeth 510. Each of the shapes of teeth depicted in FIG. 5 produce a different capacitance, first derivative of capacitance with respect to displacement, second derivative of capacitance with respect to displacement, and capacitance ratio. Other desired outcomes can be a change in capacitance with time, a first derivative of capacitance with respect to time, and a second derivative of capacitance with respect to time. Depending on the desired capacitance behavior, one or more appropriate tooth shape can be selected.

Figure 6:
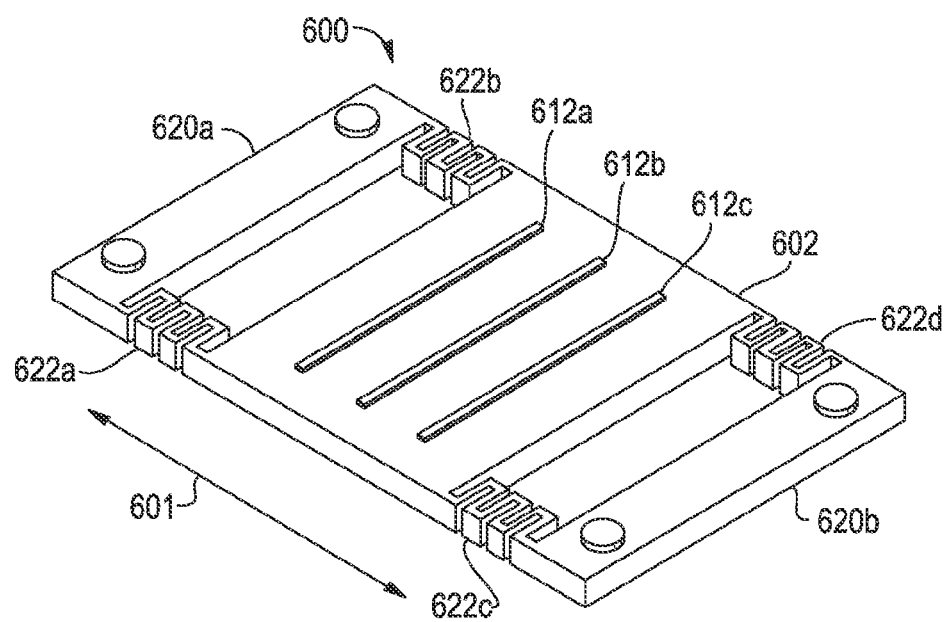
FIG. 6 depicts a capacitive structure used to generate a nonlinear periodic signal, according to an illustrative implementation.

FIG. 6 depicts a capacitive structure 600 used to generate a nonlinear periodic signal. The structure 600 includes a movable element 602 and fixed elements 620a and 620b (collectively, fixed elements 620). The moveable element 602 is springedly coupled to the fixed elements 620 by spring elements 622a, 622b, 622c, and 622d (collectively, spring elements 622). The spring elements 622 allow the moveable elements to move along the moving axis 601 but restrict the moveable element 602 from moving in other directions. In some examples, manufacturing imperfections cause the spring elements 622 to allow the movable element 602 to move along axes other than the moving axis 601. In these examples, motion along other axes is minimal compared to motion along the moving axis 601. The moveable elements 602 include electrodes 612a, 612b, and 612c (collectively, electrodes 612). Each of the centers of the electrodes 612 is separate from the centers of adjacent electrodes by a pitch distance.

The spring elements 622 have a serpentine shape, which results in an approximately constant stiffness in the moving direction axis 601 over the operating range. The spring elements 622 allow motion in the moving axis 601 but substantially prevent motion in other directions.

Figure 7:
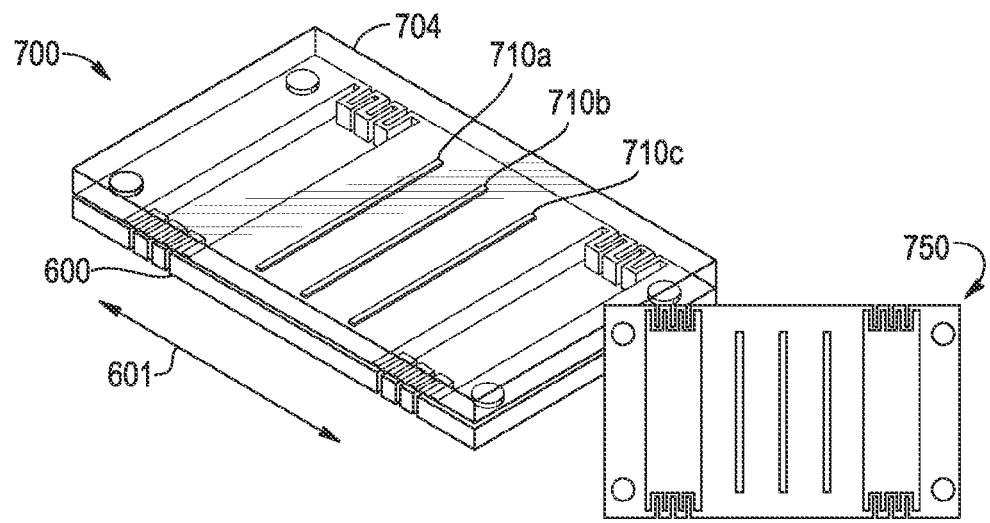
FIG. 7 depicts a perspective view of a structure bonded to a top cap, according to an illustrative implementation.

FIG. 7 depicts a perspective view 700 of the structure 600 bonded to a top cap 704. The top cap 704 is bonded to the fixed elements 620 and includes electrodes 710a, 710b, and 710c (collectively, electrodes 710). Each of the electrodes 710 is aligned with one of electrodes 612 when the moveable element 602 is at the rest position (zero displacement). When the electrodes 612 are aligned with the electrodes 710, a capacitance between the two electrodes is at a maximum. When the electrodes 612 are displaced from the rest position along the moving axis 601, the capacitance decreases. Accordingly, the capacitance between the electrodes 612 and the electrodes 710 varies with displacement of the moveable elements 602 in qualitatively the same manner as the curve 402 of FIG. 4. FIG. 7 includes a view 750 depicting a top view of the top cap 704 bonded to the structure 600.

Achieving alignment between the electrodes 612 and the electrodes 710 at the rest position requires alignment when bonding the top cap 704 to the structure 600. Each of the moving element 602 and the top cap 704 can include a number of electrodes other than three.

Figure 8:
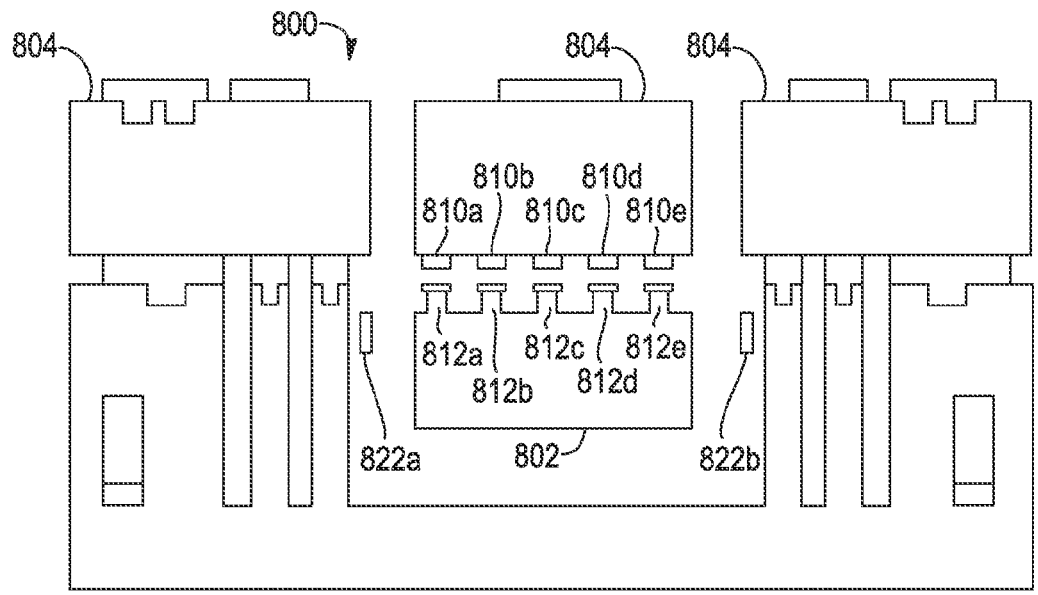
FIG. 8 depicts a cross section of an inertial sensor that includes a moveable element configured to move laterally with respect to a fixed element, according to an illustrative implementation.

FIG. 8 depicts a cross section of an inertial sensor 800 that includes a moveable element 802 configured to move laterally with respect to a fixed element 804. The moveable element 802 is springedly coupled to the fixed element 804 by spring elements 822a and 822b (collectively, spring elements 822). The spring elements 822 allow the moveable element 802 to move laterally by substantially restricting its movement in other directions. The moveable element 802 includes electrodes 812a, 812b, 812c, 812d, and 812e (collectively, electrodes 812) disposed in a linear periodic array. The fixed element 804 includes electrodes 810a, 810b, 810c, 810d, and 810e (collectively, electrodes 810) disposed in a linear periodic array. Adjacent electrodes of the electrodes 810 and 812 are separated by a pitch distance which is the same for each of the adjacent electrodes of electrodes 812 and electrodes 810. The inertial sensor 800 operates in a similar manner as the inertial sensor depicted in FIGS. 6 and 7, and has a dependence of capacitance on displacement that is qualitatively similar to the curve 402 depicted in FIG. 4. The periodic capacitive structure of the sensor 800 thus has a capacitance that varies periodically with displacement. The capacitance experiences local maxima at the positions in which opposing electrodes of the electrodes 810 and 812 are aligned and local minima at the positions in which opposing electrodes are anti-aligned, that is, at displacement distances that are multiples of one-half-pitch from the aligned position.

When an electrical voltage is applied between the electrodes 810 and the electrodes 812, a capacitive current can be generated and measured. The capacitive current across the electrodes is proportional to a rate of change of capacitance with time. As the capacitance can be changed by displacing the moveable electrode 802, a rate of change of capacitance with respect to displacement can be determined. The capacitive current can then be proportional to the rate of change of capacitance with respect to distance. As capacitance between opposing electrode pairs experiences local maxima at positions of alignment and local minima at positions of anti-alignment, the rate of change of capacitance with respect to distance is zero at both positions of anti-alignment and positions of alignment. Thus, when the rate of change of capacitance with respect to displacement is zero at these extrema, the capacitive current is also zero at these extrema.

Thus, the capacitive current is zero when electrodes of the electrodes 810 are aligned with opposing electrodes of the electrodes 812. The capacitive current is also zero when electrodes of the electrodes 810 are aligned with the centers of the gaps between electrodes 812. Since the electrodes 810 and 812 are disposed in linear periodic arrays, the capacitive current then becomes zero at multiple positions of the moveable electrode 802. This property of having the same value at multiple positions is an example of degeneracy.

These multiple positions are separated by a distance equal to one-half-pitch of the electrode 810a and 812. In an exemplary implementation, the inertial sensor 800 is at rest as depicted in FIG. 8, and thus the electrodes 810 are aligned with the electrodes 812 in the rest position. In this exemplary implementation, the capacitive current is zero each time the moveable element 802 is in the rest position and in positions offset from the rest position by integral multiples of the pitch. In this exemplary implementation, the capacitive current will also be zero when the moveable element 802 is displaced from the reference position by a quantity equal to the sum of one-half the pitch and integral multiples of the pitch. Thus, the capacitive current is zero at displacements equal to integral multiples of one-half-pitch from the rest position. In some implementations, the electrodes 810 and the electrodes 812 are not aligned in the rest position, but rather have an offset. In these implementations, the capacitive current is zero at displacements equal to integral multiples of one-half-pitch from the aligned position.

Because, while the moveable element 802 is oscillating, the capacitive current is zero only instantaneously as the electrodes 810 and 812 are either aligned or anti-aligned and has nonzero magnitudes in other positions, times at which the capacitive current is zero can be referred to as zero-crossing points. These zero-crossing points occur due to the moveable element being geometrically positioned in certain positions with respect to the fixed element 804, and the zero-crossing points are unaffected by acceleration, rotation, temperature or other perturbations. By measuring the times at which a zero-crossing occurs, the displacement of the moveable element 802 can be determined as a function of time. Determining the displacement as a function of time of the moveable element 802 enables the calculation of derivative quantities such velocity and acceleration of the moveable element 802. Thus, displacement, velocity, and acceleration of the moveable element 802 can be determined independently of external perturbations. The external perturbations can also be measured using the systems and methods described herein and in part by using the measured zero-crossing times.

Figure 9:
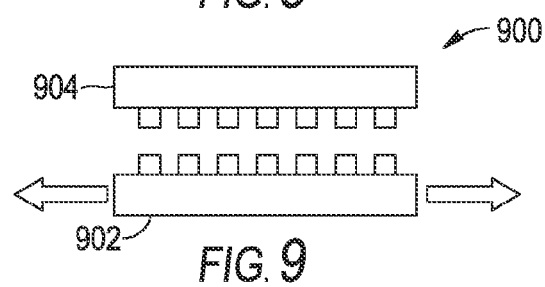
FIG. 9 schematically depicts a cross section view of an inertial sensor, according to an illustrative implementation.

FIG. 9 schematically depicts a cross-section view of an inertial sensor 900. The inertial sensor 900 includes a fixed element 904 and a moveable element 902. Each of the fixed element 904 and the moveable element 902 includes multiple teeth. These teeth can be made of a metal deposited onto the elements 902 and 904, or the teeth can be monolithically integrated into the elements 902 and 904. In some implementations in which the teeth are monolithically integrated, the electrodes 902 and 904 are made of a conductive material such as a doped semiconductor to render the teeth conductive.

Figure 10:
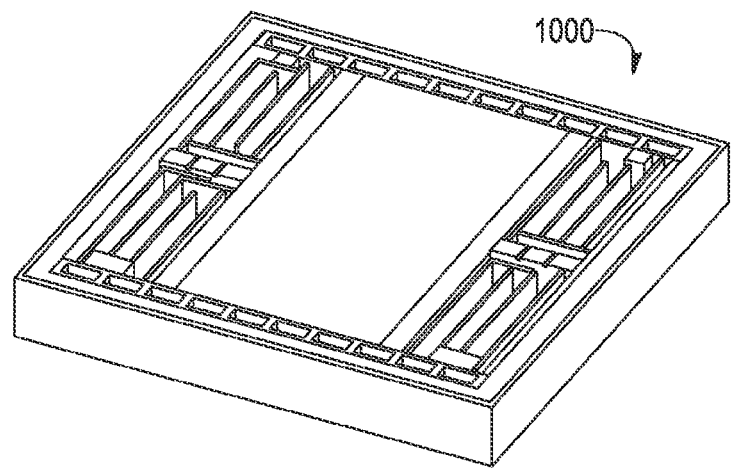
FIG. 10 depicts a perspective view of an inertial sensor, according to an illustrative implementation.

FIG. 10 depicts a perspective view of an inertial sensor 1000. The inertial sensor 1000 can include features of the inertial sensors depicted in FIGS. 6-9.

Figure 11:
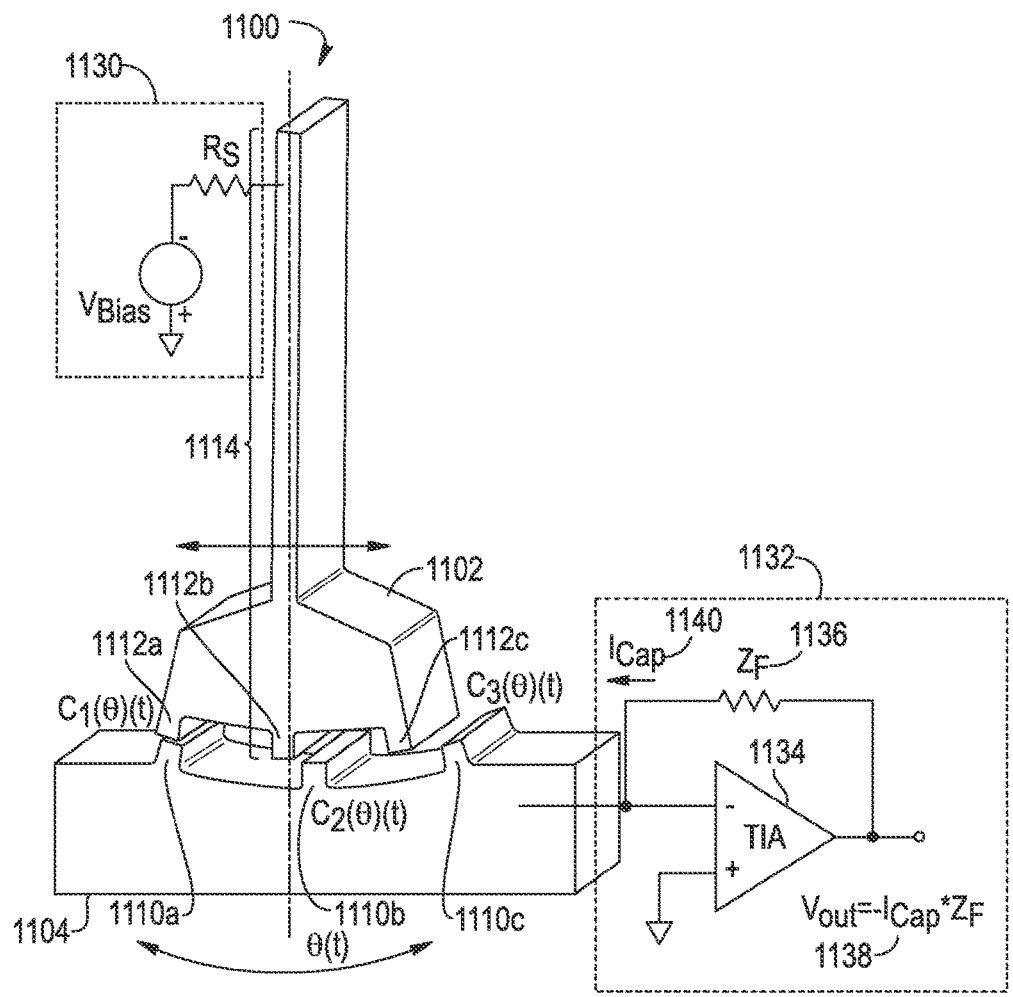
FIG. 11 depicts an inertial sensor configured to extract inertial information from a nonlinear periodic signal, according to an illustrative implementation.

FIG. 11 depicts an inertial sensor 1100 configured to extract inertial information from a nonlinear periodic signal. The inertial sensor 1100 includes a moveable element 1102 and a fixed element 1104. The moveable element 1102 includes teeth 1112a, 1112b, and 1112c (collectively, teeth 1112). The fixed element 1104 includes teeth 1110a, 1110b, and 1110c (collectively, teeth 1110). The moveable element 1102 rotates about an axis of rotation (not shown). The distal ends of the teeth 1112 have a radius r 1114 from the axis of rotation. The teeth 1110 and 1112 are electrically conductive and a capacitance can be measured between the two sets of teeth. A voltage source 1130 applies a bias voltage to the moveable element 1102 with respect to the fixed element 1104, which is grounded. A current measurement unit 1132 measures a capacitive current 1140 passing from the fixed element 1104 to ground. The current measurement unit 1132 includes a transimpedance amplifier 1134 with a feedback resistance 1136. The current measurement unit 1132 produces an output voltage 1138 equal to the product of the capacitive current 1140 and the feedback resistance 1136 with an opposite sign. The moveable element 1102 can be driven to oscillate in angular motion with respect to the fixed element 1104. The oscillation can be perturbed by an external perturbation.

FIG. 12 depicts the moveable element 1102 in a position such that the tooth 1112b is aligned with the tooth 1110b. The capacitance between these two teeth is at a maximum at the position depicted in FIG. 12. Since the teeth 1110 have a different pitch than the teeth 1112, the tooth 1110a is not aligned with the tooth 1112a, nor is the tooth 1110c aligned with the tooth 1112c in the position depicted in FIG. 12. Instead, the tooth 1110a is separate from the tooth 1112a by a distance $d_0$ 1116a. The tooth 1110c is separated from the tooth 1112c by a distance $d_0$ 1116b. The distances $d_0$ 1116a and 1116b can be the same, or they can be different, depending on the geometric spacing of the teeth 1110 and 1112.

FIG. 13 depicts the moveable element 1102 in a position such that tooth 1110c is aligned with the tooth 1112c. In this position, the capacitance between the tooth 1112c and the tooth 1110c is at a maximum.

FIG. 14 depicts the moveable element 1102 in a position such that the tooth 1110a is aligned with the tooth 1112a and the capacitance between these two teeth is at a maximum. Since the teeth 1110 have a different pitch than the teeth 1112, maxima in capacitance occurs at displacement of both integral multiples of the pitch of the teeth 1110 and integral multiples of the pitch of the teeth 1112. Local mimima in capacitance occur at displacement of integral multiples both pitches as well, with half-pitch offsets from the local maxima. Sensors having a tooth pitch for the moveable element that is different than the tooth pitch for the fixed element have the advantage of an increased number of extrema in capacitance, but a disadvantage of a lower signal-to-noise ratio since the teeth are not all aligned at the same time.

The inertial sensor 1100 can be modeled as a damped rotational mechanical oscillator with a lumped inertial mass centered at the end of a lever arm with radius r 1114. The moving element 1102 is disposed at the end of a conductive cantilever which rotates, bends, or both, as it oscillates rotationally. The fixed element 1104 can be considered a capacitive plate, and capacitance between the fixed element 1104 and the moving element 1102 varies spatially and temporally. The capacitance between the fixed element 1104 and the moving element 1102 is determined by the overlap between the teeth 1110 and the teeth 1112. Since the pitch of the teeth 1110 is different than the pitch of the teeth 1112, the overlap relationships are staggered. The capacitance and the rate of change of capacitance (proportional to current) is controlled by the magnitude of the overlap area of opposing teeth and the rate of change of the overlap area. At rest, the nominal position of the moveable element 1102 dictates that the capacitance between the tooth 1112b and the tooth 1110b ($C_2$) has maximum overlap and maximum capacitance. Capacitance between the tooth 1110a and the tooth 1112a ($C_1$) and between the tooth 1110c and 1112c ($C_3$) is minimal because these pairs of teeth have minimal overlap. As the lever arm suspending the moving element 1102 rotates, bends, or both, each capacitive region individually achieves a state of maximum capacitance at a unique position determined solely by the geometry of the device. In essence, $C_1$, $C_2$, and $C_3$ are a set of capacitive switches that are configured to indicate the physical position of the moveable element 1102, independent of the speed and magnitude of the motion of the moveable element 1102. The position is sensed by using a transimpedance amplifier (TIA) or a charge amplifier (CA) to convert the motion-induced capacitive current to a voltage. The capacitive current is determined by the time derivative of the capacitor charge. The capacitor charge (q) is the product of capacitance (C) and the voltage potential ($V_C$) across the capacitor. The time derivative of capacitor charge is expressed in equation 2.

$$\dot{q} = i = \dot{C}V_C + C\dot{V}_C \tag{2}$$

If the series resistance is approximately zero and a TIA is utilized to provide a substantially fixed potential across the capacitor, than the right-most term of equation 2 involving the first time derivative of the capacitor voltage can be neglected as shown in equation 3.

$$i \approx \dot{C}V_C = \frac{dC}{dt}V_C = \frac{dC}{dx}\frac{dx}{dt}V_C = \frac{dC}{dx}\dot{x}V_C \tag{3}$$

Therefore, the capacitive current is approximately equal to the product of the spatial gradient of the capacitor (dC/dx), the velocity of the cantilever mass (x), and the fixed potential across the pick-off capacitor ($V_C$). In some implementations, the design of the capacitor also includes structures that force the capacitor gradient to zero at geometrically determined locations. This design enables measurement of zero-crossing times of the current to correspond to times at which the moveable element 1102 crosses the zero-gradient locations and locations in which the velocity of the moveable element 1102 is zero. The rate of change of current is expressed by its time derivative as shown in equations 4 and 5.

$$\frac{di}{dt} = \ddot{C}V_C = \frac{d}{dt}\left\{\frac{dC}{dx}\frac{dx}{dt}V_C\right\} = \frac{d}{dt}\left\{\frac{dC}{dx}\right\}\frac{dx}{dt}V_C + \frac{dC}{dx}\ddot{x}V_C \tag{4}$$

$$\frac{di}{dt} = \left(\frac{d^2C}{dx^2}\dot{x}^2 + \frac{dC}{dx}\ddot{x}\right)V_C \tag{5}$$

As a result, the rate of change of capacitive current is proportional to the capacitor bias voltage, the second derivative of the capacitance with respect to displacement, and the square of the velocity. The rate of change of the capacitive current is also proportional to the first derivative of capacitance with respect to displacement and the acceleration of the moveable element 1102. Typically, the second derivative of capacitance with respect to displacement has local maxima at locations in which the capacitor gradient is zero, and this coincides with a zero acceleration and maximum velocity condition as shown in equation 6.

$$\frac{di}{dt} \approx \frac{d^2C}{dx^2}\dot{x}^2 V_C \tag{6}$$

The sensor 1100 can produce an accurate measurement of the zero-crossing times. It can be shown that timing uncertainty is proportional to the ratio of noise in the amplitude signal to the rate of the signal crossing. Therefore, uncertainty can be reduced by maximizing the first derivative of current with respect to time measured by the current measurement unit to minimize the timing uncertainty of the zero-crossing events. This can be achieved by maximizing any or all of the three terms in equation 6. The rotational motion of the moveable element 1102 is governed by equation 7.

$$\ddot{\theta} + \dot{\theta}\frac{\omega_o}{Q} + \theta\omega_0^2 = \frac{\text{Accel} \cdot \cos(\theta)}{r} \tag{7}$$

Where, $\Theta$ is the angular displacement in radiance, $\Omega_0$ is the mechanical resonant frequency in radians per second, r is the length of the lever arm suspending the movement element 1102, Q is the quality factor associated with the oscillator's damping, and Accel is an external linear acceleration.

It can be shown that given a finite resistance ($R_S$) in series with the conductive lever arm, the capacitive current can be determined using the differential equation shown in equation 8.

$$i_C = \frac{(\dot{C}_1 + \dot{C}_2 + \dot{C}_3)V_{Bias}}{(C_1 + C_2 + C_3)R_S} - \dot{i}_C \frac{1 + (\dot{C}_1 + \dot{C}_2 + \dot{C}_3)R_S}{(C_1 + C_2 + C_3)R_S} \tag{8}$$

The variables $C_k$ and $\dot{C}_k$ for k=1, 2, 3 used in equation 8 are defined in equations 9 and 10 below.

$$C_k = \frac{\varepsilon \text{Area}_i(\theta(t))}{d_o}; k = 1, 2, 3 \tag{9}$$

$$\dot{C}_k = \dot{\theta}\frac{\varepsilon \frac{d}{d\theta}\text{Area}_i(\theta(t))}{d_o}; k = 1, 2, 3 \tag{10}$$

For the purpose of this illustrative example, the tooth capacitances $C_1$, $C_2$, and $C_3$ are modeled using Gaussian-like functions that have peak values corresponding to the locations of maximal capacitive area overlap and that diminish as the overlapping surface area decreases. The capacitors $C_1$ and $C_3$ are staggered in anti-symmetric ways by the dimension $d_0$ 1116a and 1116b as shown in FIG. 12. This staggering of capacitors affects the overlap because the physical locations at which each capacitor achieves maximum capacitance are all geometrically distinct. Thus, the locations at which the gradient of the capacitors and the capacitive current is zero, as well as locations at which the curvature of the spatial capacitance is maximal and the capacitive current has a maximum slope, are geometrically distinct. Because these locations are geometrically distinct, a single zero-crossing circuit such as a comparator can use the current measurement unit output to detect the timing of all physical crossing events.

In one period of oscillatory motion, each capacitor contributes a zero-crossing corresponding to a unique spatial-temporal point. These unique physical spatial-temporal points correspond to the locations of maximum overlap such as at zero and $\pm d_0$. All of the capacitors share a zero-crossing when the velocity reaches zero at the extrema of the displacement. In addition, a set of zero-crossings results when a superposition of the capacitive currents sums to zero at intermediate displacement locations ($\pm d_0/2$).

The systems and methods described herein have a number of advantages. One advantage is large capacitive areas (as an extruded Z-axis dimension increases capacitive area). Large capacitive areas allow decreases in required bias voltages by more than a factor of 10 and lower required gain in current measurement units. The lack of overlapping geometric features reduces or eliminates issues caused by debris interfering with motion. The reference positions determined by the geometry of the device provide multiple output transition levels and timing information about the maximum displacement points.

Another advantage is that the electronics can be simplified. In some implementations, only one zero-crossing detector such as a comparator is needed to extract all measurement information. No differentiation is required, since the current signal is proportional to the first derivative of capacitance with respect to displacement. The zero-crossing times depend only on the geometric alignment of the capacitors. Furthermore, the zero displacement, or rest, position can be accurately detected. This can assist with calibration of offsets resulting from intrinsic material stresses. Furthermore, the design is amenable to many configurations for manufacturing, such as a lateral spring with cap wafer electrodes or interdigitated beams having teeth. While equations 1-10 are derived with respect to the structure 1100, similar or identical relationships apply to all of the structures described herein.

By using multiple masks and selectively etching certain areas on a wafer, structures in the proof mass layer of the inertial device can have different heights in the out-of-plane (Z) direction. In some implementations, this corrugation in height occurs on the top surface of the wafer. In these examples, either the taller structure can be anchored or the shorter structure can be anchored. Each of these possibilities produces a zero-crossing in the capacitive current at different displacements of the moveable element.

FIG. 15 depicts an inertial sensor fabricated from a semiconductor wafer and configured to detect acceleration normal to the plane of the wafer. The inertial sensor depicted in FIG. 15 includes a moveable element 1502 and a fixed element 1504. The moveable element 1502 includes beams 1508a, 1508b, 1508c, 1508d, 1508e, and 1508f (collectively, beams 1508). The fixed element 1504 includes beams 1506a, 1506b, 1506c, 1506d, 1506e, and 1506f (collectively, beams 1506). The beams 1508 oscillate normal to the plane of the wafer with respect to the fixed beams 1506. In some implementations, the moveable beams 1508 have a different height than the fixed beams 1506. Changes in capacitance can be detected when the moveable beams 1508 cross certain positions with respect to the fixed beams 1506.

FIG. 16 depicts eight configurations of fixed and moveable beams which can be used in inertial devices such as the inertial device depicted in FIG. 15. FIG. 16 includes views 1600, 1610, 1620, 1630, 1640, 1650, 1660, and 1670. The view 1600 includes a fixed beam 1606 and a moveable beam 1608 that is shorter than the fixed beam 1606. At rest, the lower surface of the moveable beam 1608 is aligned with the lower surface of the fixed beam 1606. As the moveable beam is displaced upward by one-half the difference in height between the two beams, the capacitors between the two beams is at a maximum. When the capacitance is at a maximum, the capacitive current is zero and can be detected using a zero-crossing detector as described herein.

The view 1610 includes a moveable beam 1618 and a fixed beam 1616. The moveable beam 1618 is taller than the fixed beam 1616, and the lower surfaces of the moveable fixed beams are aligned in the rest position. As the moveable beam is displaced downward by a distance equal to one-half the distance in height of the two beams, capacitance between the two beams is at a maximum.

The view 1620 includes a fixed beam 1626 and a moveable beam 1628 that is shorter than the fixed beam 1626. The center of the moveable beam is aligned with the center of the fixed beam such that in the rest position, the capacitance is at a maximum.

The view 1630 includes a fixed beam 1636 and a moveable beam 1638 that is taller than the fixed beam 1636. At rest, the center of the moveable beam 1638 is aligned with the center of the fixed beam 1636 and capacitance between the two beams is at a maximum.

The view 1640 includes a fixed beam 1646 and a moveable beam 1648 that is the same height as the fixed beam 1646. At rest, the lower surface of the fixed beam 1646 is above the lower surface of the moveable 1648 by an offset distance. As the moveable beam 1648 move upward by a distance equal to the offset distance, capacitance between the two beams is at a maximum because the overlap area is at a maximum.

The view 1650 includes a fixed beam 1656 and a moveable beam 1658 that is the same height as fixed beam 1656. In the rest position, the lower surface of the moveable beam 1658 is above the lower surface of the fixed beam 1656 by an offset distance. As the moveable beam travels downward by a distance equal to the offset distance, the overlap between the two beams is at a maximum and thus capacitance between the two beams is at a maximum.

The view 1660 includes a fixed beam 1666 and a moveable beam 1668 that is shorter than the fixed beam 1666. In the rest position, the lower surfaces of the two beams are aligned. As the moveable beam 1668 moves upwards by a distance equal to one-half the difference in height between the two beams, overlap between the two beams is at a maximum and thus capacitance is at a maximum.

The view 1670 includes a fixed beam 1676 and a moveable beam 1678 that is taller than the fixed beam 1676. In the rest position, the lower surface of the moveable beam 1678 is below the lower surface of the fixed beam by an arbitrary offset distance. As the moveable beam 1678 moves downwards such that the center of the moveable beam 1678 is aligned with the center of the fixed beam 1676, the overlap area reaches a maximum and thus capacitance between the two beams reaches a maximum. For each of the configurations depicted in FIG. 16, a monotonic motion of the moveable beam produces a non-monotonic change in capacitance resulting in an extremum in capacitance. For all of the configurations depicted in FIG. 16, when capacitance between the two beams is at a maximum, capacitive current is zero.

Figure 17:
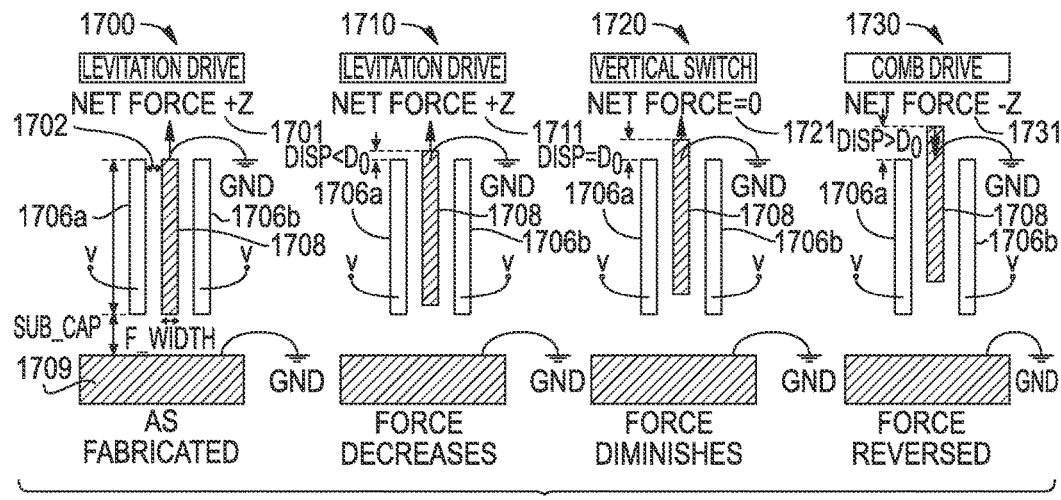
FIG. 17 schematically depicts a drive mechanism used to oscillate structures in the vertical direction, according to an illustrative implementation.

FIG. 17 schematically depicts a drive mechanism used to oscillate structures in the vertical direction. FIG. 17 includes views 1700, 1710, 1720, and 1730. The view 1700 includes fixed electrodes 1706a and 1706b (collectively, electrodes 1706) and a moveable electrode 1708. A gap 1702 exists between the moveable electrode 1708 and the fixed electrode 1706. The view 1700 also includes a bottom ground electrode 1709. A bias voltage is applied to the fixed electrodes 1706. Because the moveable electrode 1708 and the ground electrode 1709 are kept at ground potential, an asymmetric electric field results from the applied bias voltage. The asymmetric field results in a net upward force 1701 on the moveable electrode 1708. The moveable electrode 1708 responds to the net force 1701 by moving upward. The view 1710 depicts the device after the moveable electrode 1708 has moved upwards by a displacement distance. As the moveable electrode 1708 moves upwards with respect to the fixed electrode 1706, the net force 1711 remains but is lower than the net force 1701. The view 1720 depicts the moveable electrode 1708 at the top of its range at zero velocity and the net force 1721 is zero. The view 1730 depicts the electrode 1708 at a displacement larger than the displacement in the view 1720, and at larger displacements, the net force 1731 has reversed direction and is causing the moveable electrode 1708 to move towards the fixed electrodes 1706. In the views depicted in FIG. 17, a bias voltage is applied to the fixed electrodes. The views 1700 and 1710 depict the three electrodes operating in a levitation drive regime. The view 1720 depicts the three electrodes operating in a vertical switch regime, and the view 1730 depicts the three electrodes operating in a comb drive regime. By selecting certain ranges of the moveable electrode 1708 in which to apply the bias voltage, the regime in which the three electrodes operate can be selected. In some implementations, the drive electrodes operate in a levitation drive regime, and in some implementations, the drive electrodes operate in a comb drive regime. The vertical switch regime can be used to detect displacement in the vertical direction. FIG. 17 depicts one moveable electrode, two fixed electrodes, and one ground electrode, but in some examples, other numbers of electrodes are present.

Figure 18:
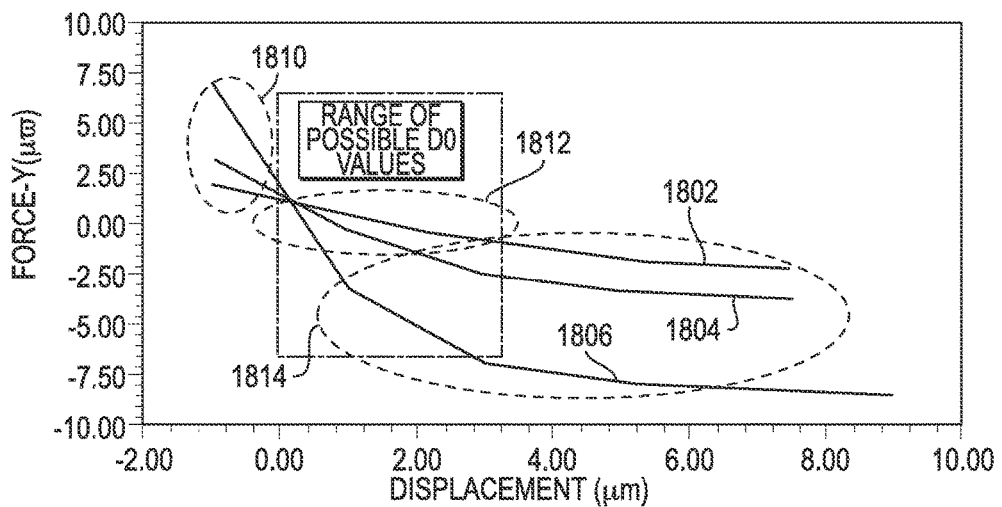
FIG. 18 depicts the relationship between force and displacement for electrodes such as those depicted in FIG. 17, according to an illustrative implementation.

FIG. 18 depicts the relationship between force and displacement for electrodes such as those depicted in FIG. 17. FIG. 18 includes three curves 1802, 1804, and 1806, each corresponding to different geometrical configurations of the electrodes. In the region 1810, the electrodes operate in the levitation drive regime, in the region 1812, the electrodes operate in the vertical switch regime, and in the region 1814, the electrodes operate in the comb drive regime.

If the taller element is anchored or fixed, pull-up electrostatic forces will drive the moveable shorter structure to move upward, until it reaches a displacement of half of the height difference between the two structures. After that, the shorter structure will continue to move upward but electrostatic forces will now decelerate the velocity to zero. At the location in which the velocity equals zero, the moveable structure reaches its maximum displacement in the +Z direction. This maximum displacement is determined by parameters such as rate of change of the vertical capacitance, drive voltage, and spring constant in the Z direction. Subsequently, the taller moveable structure moves downward and is accelerated by the electrostatic forces in the −Z direction. At a displacement equal to half the height difference (the centers of the structures are aligned) the electrostatic force changes direction and begins to decelerate and reduce its downward velocity. At a point of maximum downward displacement, the moveable beam has a velocity of zero and begins to move upward, accelerated by the upwards electrostatic force.

If the shorter beam is anchored or fixed, pull-down electrostatic forces will drive the moveable taller beam to move downward until it reaches a displacement equal to half of the difference in height of the beams. After this point, the taller moveable beam will continue to move downwards but will experience a decelerating electrostatic force. At the location of maximum downward displacement of the moveable beam, the moveable structure has a zero velocity and experiences an upwards electrostatic force. When the taller moveable structure reaches a downward displacement of half the height difference, the electrostatic forces change direction and the beam continues to move upwards with a decelerating electrostatic force. At the point of maximum upward displacement, the moveable structure experiences zero velocity and maximum downward force.

FIG. 19 depicts an inertial sensor used for measurement of perturbations in the vertical direction. FIG. 19 depicts a fixed element 1904 and a moveable element 1902. The fixed element 1904 includes beams 1906a, 1906b, and 1906c (collectively, beams 1906). The moveable element 1902 includes beams 1908a, 1908b, 1908c, and 1908d (collectively, beams 1908). The fixed beams 1906 are the same height as the fixed beam 1904, and the moveable beams 1908 are shorter than the fixed beams 1906 and the moveable element 1902 by a distance 1920.

FIG. 20 depicts an inertial sensor used to sense perturbations in the vertical direction. FIG. 20 depicts a moveable element 2002 and a fixed element 2004. The moveable element 2002 has moveable beams 2008a, 2008b, 2008c, and 2008d (collectively, beams 2008). The fixed beam 2004 includes fixed beams 2006a, 2006b, and 2006c (collectively, beams 2006). The fixed beams 2006 are recessed by a distance 2020 such that the top surface of the fixed beams 2006 is lower than the top surface of the fixed element 2004 and the top surface of the moveable beams 2008. The structures depicted in FIGS. 19 and 20 can be used to implement any of the structures depicted in FIGS. 15-18 and FIG. 21.

FIG. 21 depicts a combined structure having both recessed fixed beams and recessed moveable beams. FIG. 21 includes a moveable element 2102 and fixed elements 2104a and 2104b (collectively, fixed elements 2104). The moveable element 2102 includes moveable beams 2108a and 2108b. The fixed element 2104a includes a fixed beam 2106b, and the fixed element 2104b includes a fixed beam 2106b. The fixed beam 2106a is shorter than the adjacent moveable beam 2108a, and the fixed beam 2106b is taller than the adjacent moveable beam 2108b. The moveable beams 2108a and 2108b are both connected to the moveable element 2102 and thus move together. Thus, when the centers of the beams 2106a and 2108a are aligned to produce maximum overlap surface area and maximum capacitance for that pair, the centers of the beams 2108b and 2106b are not aligned, and vice versa. Thus, capacitance between the fixed and moveable beams are at a maximum at multiple locations of the moveable element 2102. In this way, the capacitive current crosses zero at multiple times during each period of oscillation of the moveable element 2102, and thus multiple zero-crossing times can be detected during each oscillation. In some examples, the fixed beam 2106a is electrically connected to the fixed beam 2106b and the moveable beam 2108a is electrically connected to the moveable beam 2108b, and in some examples, these beams are electrically isolated.

Figure 22:
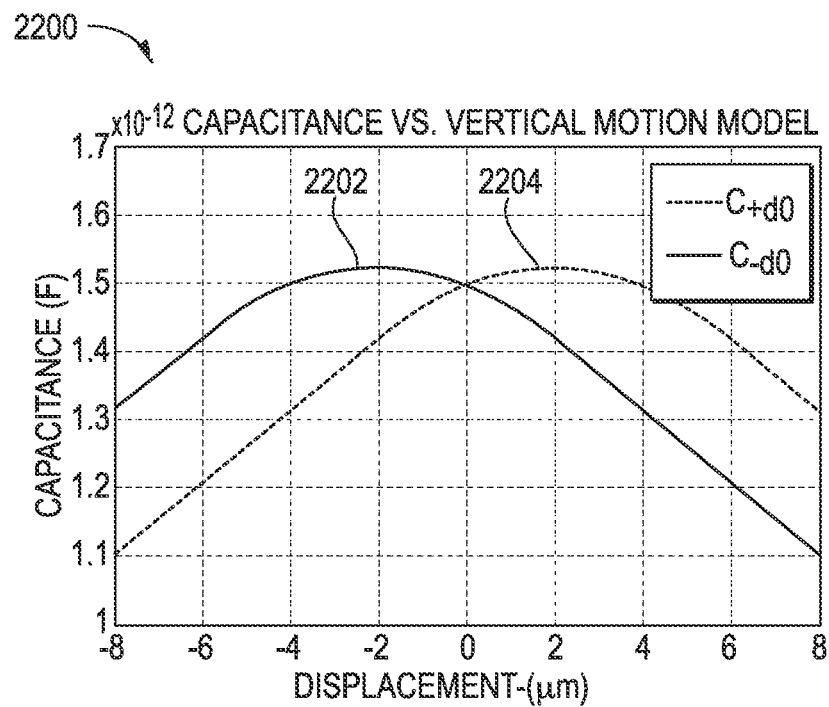
FIG. 22 depicts a graph showing the dependence of capacitance on vertical motion of a moveable element, according to an illustrative implementation.

FIG. 22 depicts a graph 2200 showing the dependence of capacitance on vertical motion of a moveable element. The graph 2200 includes two curves 2202 and 2204, each representing capacitance between adjacent beams. The curves 2202 and 2204 have qualitatively the same shape, but experience maxima in capacitance at different displacements. The curve 2202 experiences a maximum in capacitance at a negative displacement and represents the capacitive behavior of the pair of beams 2106a and 2108a which reach a maximum in overlap in capacitance when the moveable structure 2108a has moved downwards with respect to the fixed structure 2106a. The curve 2204 experiences a maximum in capacitance at a positive displacement and represents the capacitive behavior of the pair of beams 2106b and 2108b. This pair of beams experiences a maximum in overlap surface area and capacitance when the moveable beam 2108b has moved upwards with respect to the fixed beam 2106b.

Figure 23:
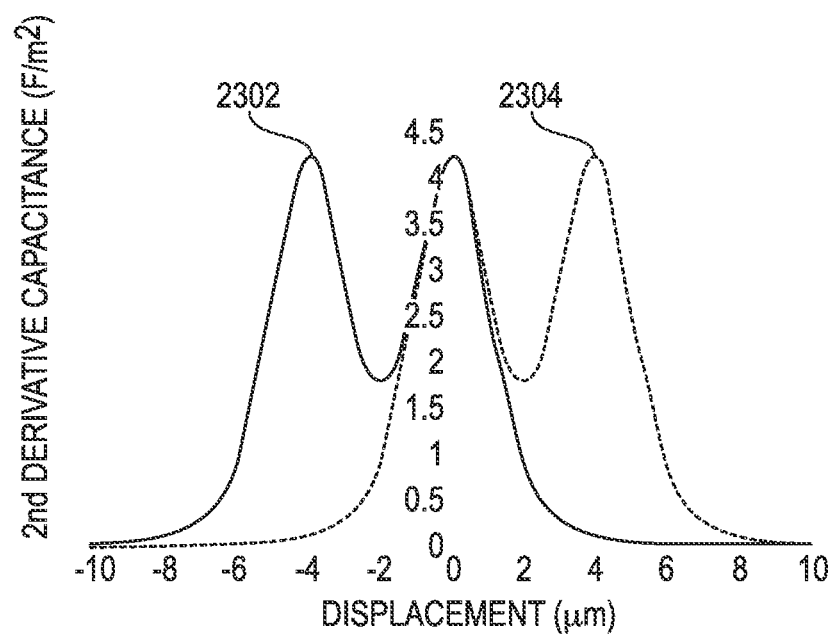
FIG. 23 depicts the behavior of the second derivative of capacitance with respect to displacement of two pairs of beams, according to an illustrative implementation.

FIG. 23 depicts the behavior of the second derivative of capacitance with respect to displacement of two pairs of beams. FIG. 23 includes curves 2302 and 2304. The curve 2302 experiences two maxima, one at a negative displacement and one at zero displacement. The curve 2304 experiences two maxima, one at zero displacement and one at a positive displacement. The curve 2302 represents the second derivative of the curve 2202, and the curve 2304 represents the second derivative of the curve 2204. The second derivative provides an indication of curvature of the capacitance curves and represents a rate of change of capacitive current with respect to displacement. The maxima depicted in FIG. 23 correspond to points at which the current is most rapidly changing.

Figure 24:
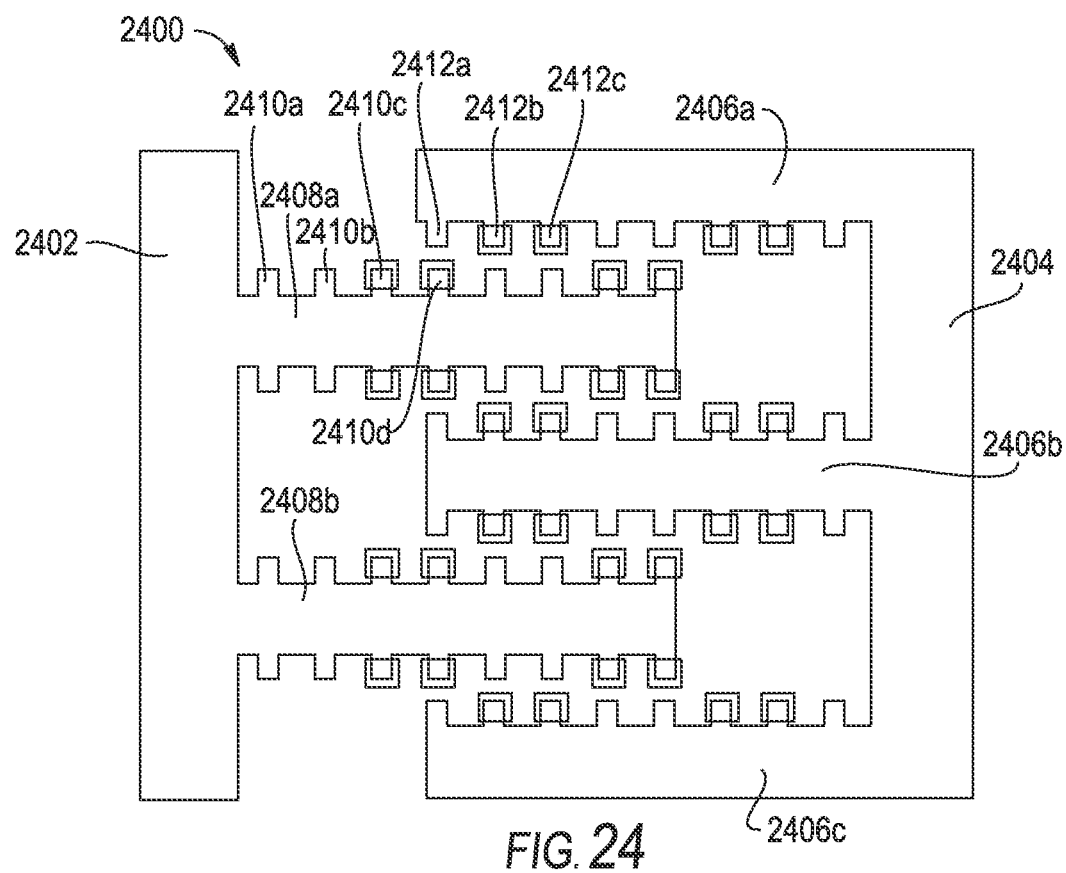
FIG. 24 depicts a top down view of a periodic capacitive structure, according to an illustrative implementation.

FIG. 24 depicts a top down view of a periodic capacitive structure 2400.

Figure 25:
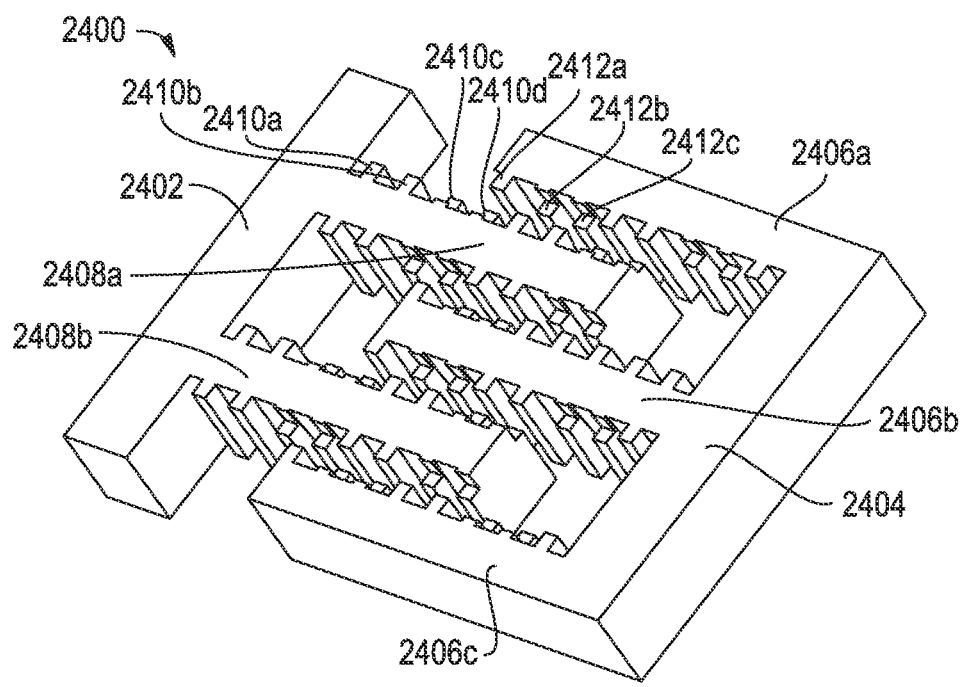
FIG. 25 depicts a perspective view of the capacitive structure of FIG. 24, according to an illustrative implementation.

FIG. 25 depicts a perspective view of the capacitive structure 2400. The capacitive structure 2400 includes a moveable element 2402 and a fixed element 2404. The moveable element 2402 includes moveable beams 2408a and 2408b (collectively, moveable beams 2408). The fixed element includes fixed beams 2406a, 2406b, and 2406c (collectively, fixed beams 2406). Each of the beams 2406 and 2408 includes multiple teeth disposed in a linear periodic array with a pitch distance separating adjacent teeth. The moveable element 2408a includes teeth 2410a, 2410b, 2410c, and 2410d (collectively, teeth 2410). The fixed beam 2406a includes teeth 2412a, 2412b, and 2412c (collectively, teeth 2412). The teeth 2410c, 2410d, 2412b, and 2412c are recessed from the top surface of their respective beams, enabling detection of relative motion in the vertical direction. The structure 2400 can be used for detection of both lateral and vertical motion using combinations of the systems and methods described herein.

Figure 26:
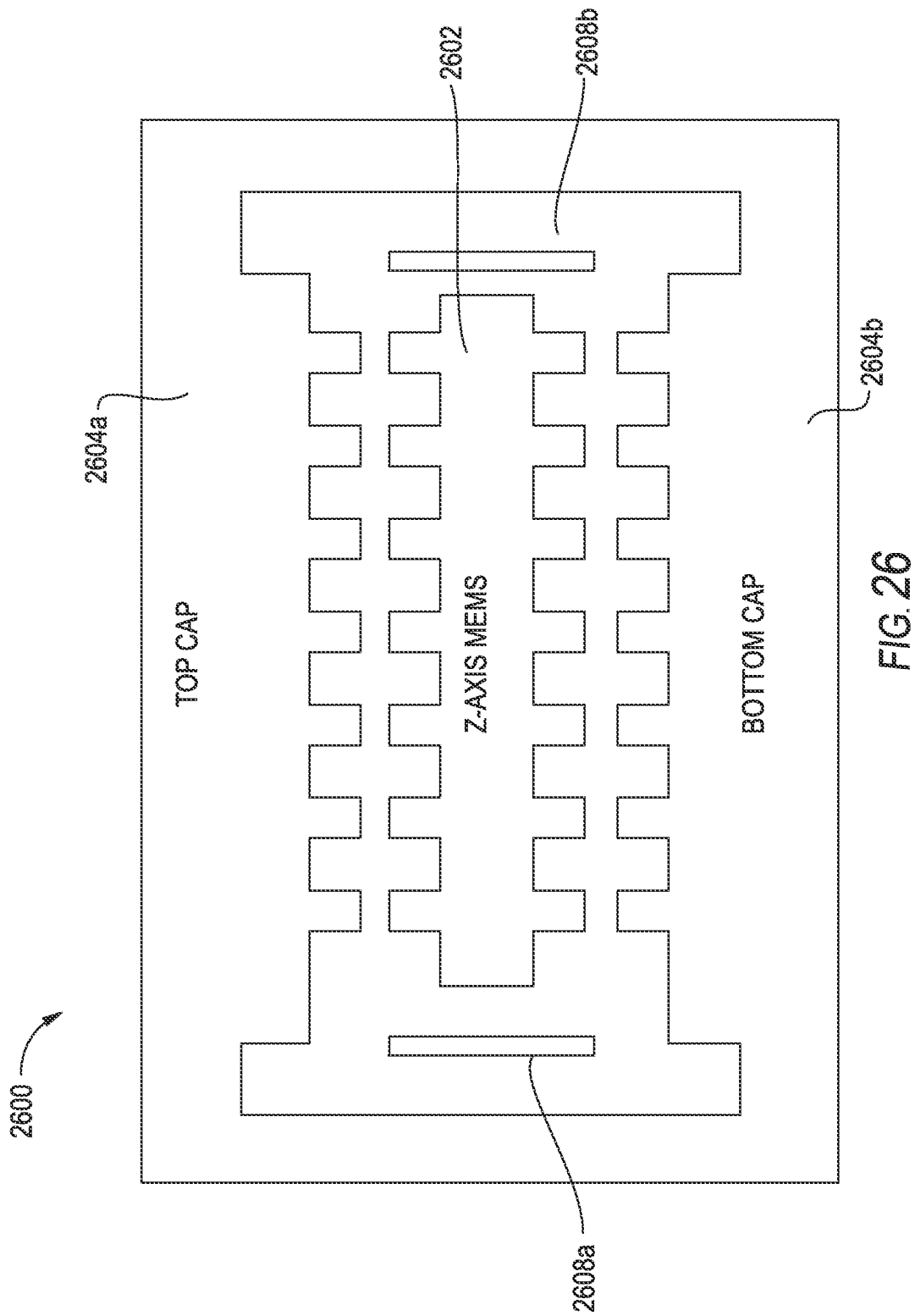
FIG. 26 depicts an inertial sensing structure that includes a movable element and top and bottom cap elements, according to an illustrative implementation.

FIG. 26 depicts an inertial sensing structure 2600 that includes a movable element 2602 and top and bottom cap elements 2604a or 2604b, respectively (collectively, elements 2604). The movable structure 2602 is springedly coupled to one of both of the cap elements 2604 by spring elements 2608a and 2608b (collectively, spring elements 4608). The movable element 2602 is corrugated on its top and bottom surfaces. The corrugation results in teeth spaced in a linear periodic array with a constant pitch between adjacent teeth. The lower surface of the top cap helmet 2604a is corrugated with teeth having the same pitch distance between adjacent teeth. Furthermore, the top surface of the bottom cap helmet 2604b is corrugated with teeth having the same pitch between adjacent teeth. In the rest position, teeth of the movable element 2602 are aligned with teeth of the cap elements 2604.

Since the moveable element 2602 and the cap elements 2604 are conductive, a capacitance can be measured between opposing teeth. At the rest position in which opposing teeth are aligned, capacitance between the movable element 2602 and the cap elements 2604 is at a maximum. The spring elements 2608 are configured to allow the movable element 2602 to oscillate laterally, parallel to the plane of the wafer, but to substantially restrict movement in other directions. As the movable element 2602 oscillates laterally, capacitance between the movable element 2602 and the cap elements 2604 varies according to proximity of opposing teeth. As the movable element 2602 is displaced by a distance equal to one-half the pitch, or a distance equal to the sum of one-half the pitch and integral multiples of the pitch, capacitance is at a minimum. At these locations at which capacitance is at a maximum or a minimum, capacitive current is zero and zero-crossings of the current can be measured using the systems and methods described herein.

The teeth of the top cap 2604a moveable element 2602 and the bottom cap 2604b can be disposed on their respective elements at intervals other than the pitch shown in FIG. 26 and can be disposed at offsets such that some or all of the teeth are not aligned at the rest position. Such an offset can be described as a phase offset, since the structure are periodic and the motion of the movable element 2602 can be a periodic oscillatory motion. When describing an offset as a phase offset, one revolution or period is equal to the pitch distance. Accordingly, an offset equal to one-half the pitch can be described as a 180° or a π offset, and offset equal to one-quarter the pitch distance can be described as a 90° or a π/2 offset, and the like. Geometric parameters of the structure 2600 such as phase offset, corrugation depth, pitch, tooth cap spacing, number of teeth, tooth width, and the like can be chosen to optimize one or more parameters such as capacitance, change in capacitance with position, a ratio of change in capacitance to capacitance, the first derivative of capacitance with respect to displacement or time, and the second derivative of capacitance with respect to displacement or time.

Figure 27:
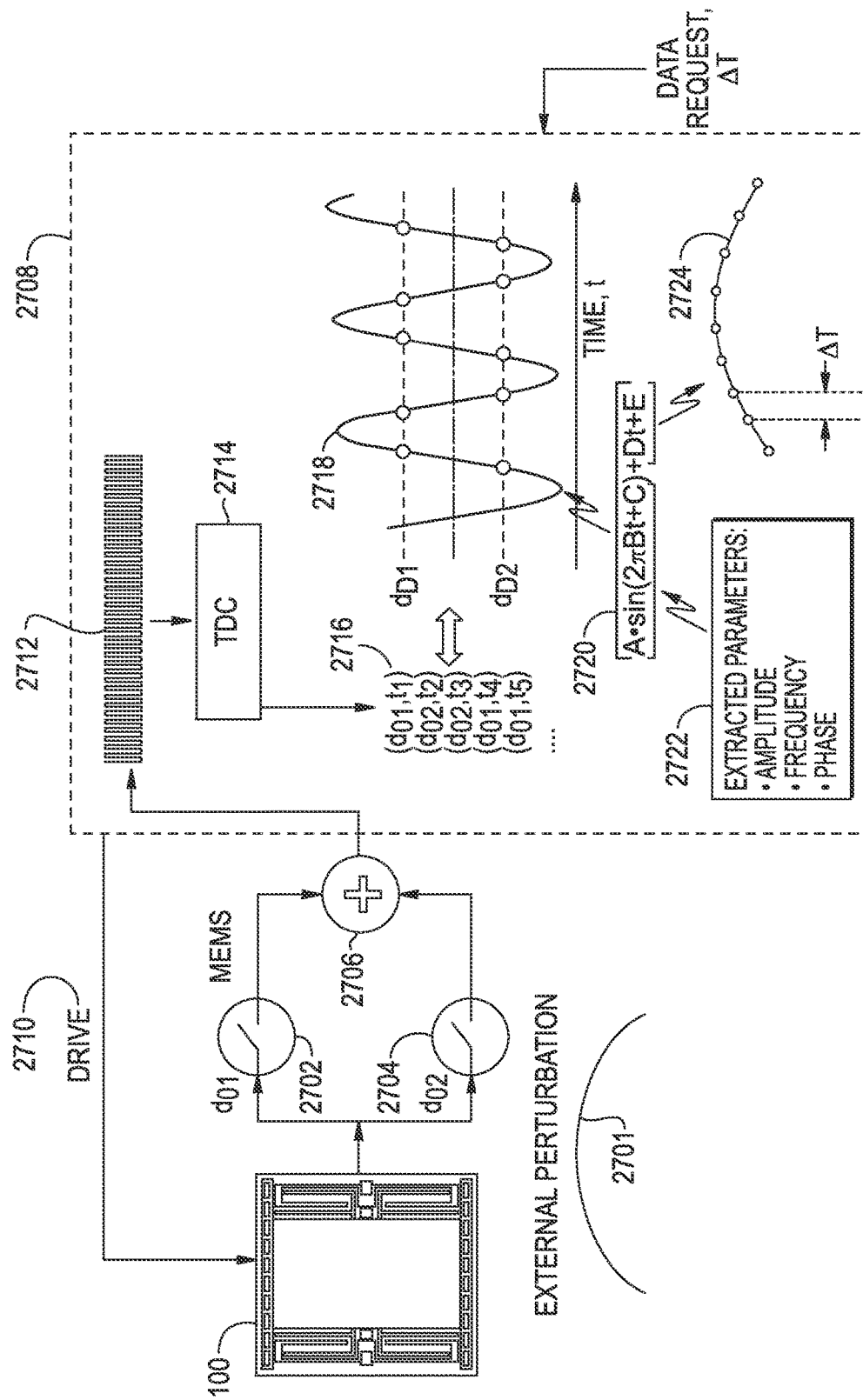
FIG. 27 schematically depicts an exemplary process used to extract inertial formation from an inertial sensor with periodic geometry, according to an illustrative implementation.

FIG. 27 schematically depicts an exemplary process used to extract inertial information from an inertial sensor with periodic geometry. FIG. 27 includes an inertial sensor 100 which experiences an external perturbation 2701. A drive signal 2710 causes a movable portion of the sensor 100 to oscillate. Zero-crossings of an output signal from the inertial sensor 100 are generated at 2702 and 2704 and combined at 2706 into a combined signal. A signal processing module 2708 processes the combined analog signal to determine inertial information. One or more processes can invert the analog signal into a rectangular waveform 2712. This can be accomplished using a comparator, by amplifying the analog signal to the rails, or by other methods. A time-to-digital converter (TDC) 2714 is used to determine rising and falling edges of the rectangular signal 2712. These rising and falling edges are associated with zero-crossings of the combined signal. The TDC 2714 outputs the series of zero-crossing times 2716 associated with zero-crossings. These zero-crossing times 2716 can be part of a periodic waveform 2718 that can be approximated by a periodic function 2720. By fitting the zero-crossing times 2716 to the periodic function 2720, inertial parameters 2722 can be extracted from the fit to the periodic function 2720. The extracted parameters 2722 are related to the external perturbation 2701 acting on the sensor 100. Time intervals 2724 can also be extracted from the fit to the periodic function 2720. Because the zero-crossings are associated with specific physical locations of movable portions of the sensor 100, displacement information can be reliably determined independent of drift, creep and other factors which tend to degrade performance of inertial sensors.

Figure 28:
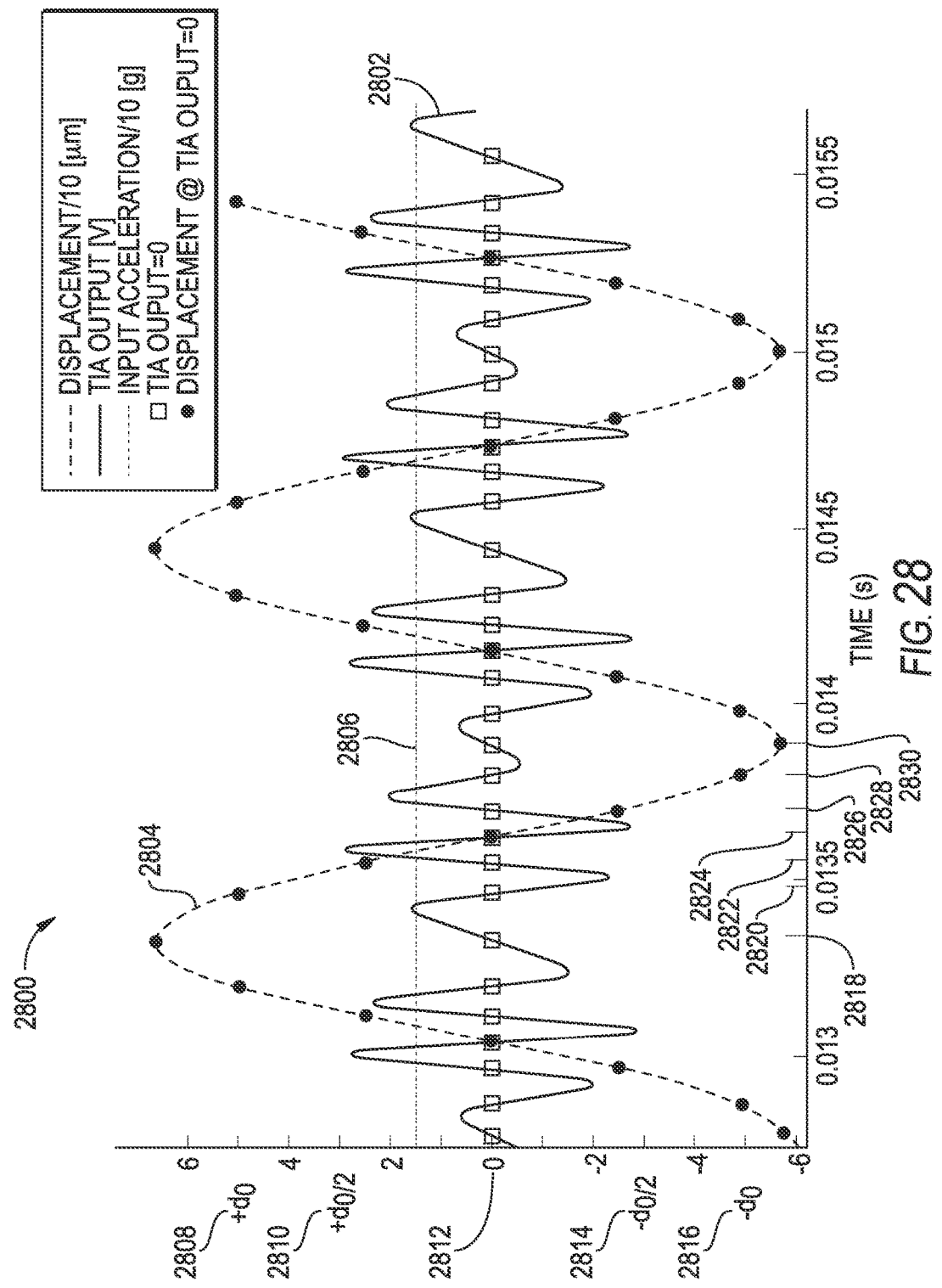
FIG. 28 depicts a graph which represents the association of analog signals derived from the inertial sensor with zero-crossing times and displacements of the inertial sensor, according to an illustrative implementation.

FIG. 28 depicts a graph 2800 which represents the association of analog signals derived from the inertial sensor with zero-crossing times and displacements of the inertial sensor. The graph 2800 represents signals derived from an oscillator in which opposing teeth are aligned at the rest position. The graph 2800 includes curves 2802, 2804 and 2806. The curve 2802 represents an output of an analog front end such as a TIA. Since a TIA outputs a signal proportional to its input current, the curve 2802 represents a capacitive current measured between movable and fixed elements of an inertial device such as the inertial device 100. The curve 2806 represents an input acceleration that is applied to the inertial device 100. The input acceleration represented by the curve 2806 is a 15 G acceleration at 20 Hz. The curve 2804 represents displacement of the movable element of the inertial device 100 as it oscillates. FIG. 28 includes square symbols indicating points on the curve 2802 at which the curve 2802 crosses the zero level. These zero-crossings in the current represent local maxima or minima (extrema) of capacitance between the movable element and the fixed element of the inertial device, because capacitive current is proportional to the first derivative of capacitance. FIG. 28 includes circular symbols indicating points on the curve 2804 corresponding to times at which the curve 2802 crosses zero. The circular symbols indicate the correlation between physical position of a movable element of the oscillator and zero-crossing times of the outputs of signal 2802.

At the time 2818, the curve 2002 crosses zero because the displacement of the movable element of the oscillator is at a maximum and the oscillator is at rest, as indicated by the displacement curve 2804. Here, capacitance reaches a local extremum because the movable element has a velocity of zero, not necessarily because teeth or beams of the oscillator are aligned with opposing teeth or beams. At time 2820, the TIA output curve 2802 crosses zero because the oscillator displacement reaches the $+d_0$ location 2808. The $+d_0$ location 2808 corresponds to a displacement in a position direction equal to the pitch distance and is a point at which opposing teeth or beams are aligned to produce maximum capacitance. At time 2822, the TIA output curve 2802 crosses zero because the movable element of the oscillator is at a position at which the teeth are anti-aligned. This occurs when the teeth of the movable element 102 are aligned with the centers of gaps between teeth of the fixed element 104, resulting in a minimum in capacitance. This minimum in capacitance occurs at a location of $+d_0/2$ 2810, corresponding to a displacement to one-half the pitch distance in the positive direction.

At time 2824, the TIA output curve 2802 crosses zero because teeth of the movable element 102 are aligned with teeth of the fixed element 104, producing a maximum in capacitance. The time 2824 corresponds to a time at which the movable element is at the rest position, indicated by the zero displacement 2812 on the curve 2804. At time 2826, the TIA output 2202 crosses zero because teeth of the movable element 102 are anti-aligned with teeth of the fixed element 104, producing a local minimum in capacitance. This anti-alignment occurs at a displacement of $-d_0/2$ 2814, corresponding to a displacement of one-half the pitch distance in the negative direction. At time 2828, the TIA output 2802 crosses zero because the teeth of the movable element 102 are aligned with the teeth of the fixed element 104, creating a local maximum in capacitance. This local maximum in capacitance occurs at a displacement of $-d_0$ 2816, corresponding to a displacement equal to such distance in the negative direction. At time 2830, the TIA output curve 2802 crosses zero because the movable element 102 has a velocity of zero as it reverses direction. This direction reversal is illustrated by the displacement curve 2804. As at time 2818, when the movable element has a velocity of zero, capacitance is not changing with time and thus the current and TIA output (which are proportional to the first derivative of capacitance) are zero.

Figure 29:
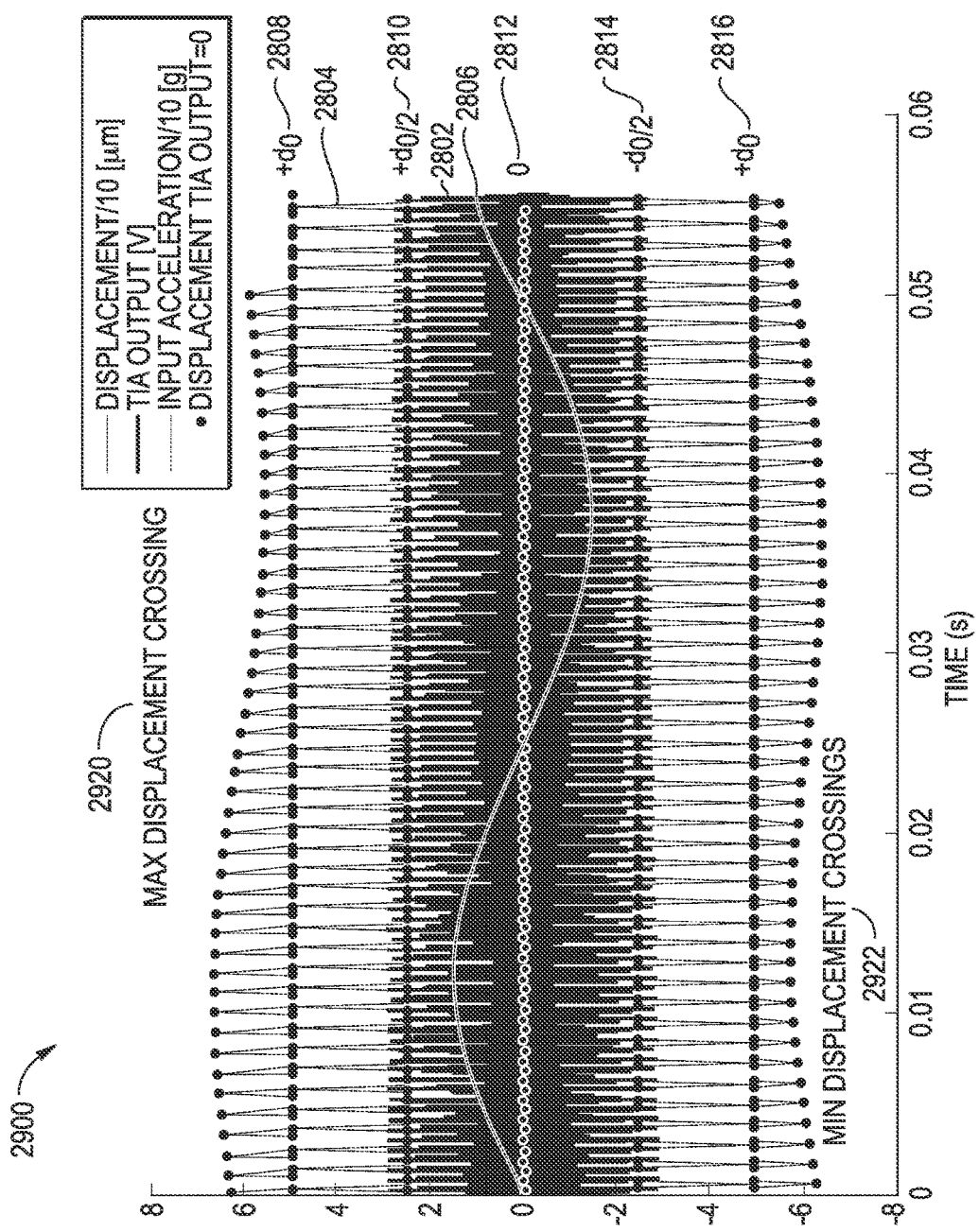
FIG. 29 depicts a graph showing the effect of an external perturbation on input and output signals of the inertial sensors described herein, according to an illustrative implementation.

FIG. 29 depicts a graph 2900 showing the effect of an external perturbation on input and output signals of the inertial sensors described herein. The graph 2900 includes the TIA output curve 2802, the displacement curve 2804, and the input acceleration curve 2806. The graph 2900 depicts the same signals depicted in the graph 2800, and the only difference is that the graph 2900 represents a longer duration of time then the graph 2800. With a longer duration of time displayed in the graph 2900, the periodicity of the input acceleration curve 2806 is more easily discerned. In addition, maximum displacement crossings 2920 and minimum displacement crossings 2922 can be discerned in the graph 2900 to experience a similar periodicity. In contrast to the maximum displacement crossings 2920 and the minimum displacement crossings 2922, the amplitude of which varies with time, zero-crossings of the TIA output signal 2802 triggered by alignment or anti-alignment of teeth of the fixed and movable elements 104 and 102 at the locations $+d_0/2$ 2808, 0 2812, $-d_0/2$ 2814, and $-d_0$ 2816 are stable with time. These reference crossings, the amplitude of which are stable with time, provide stable, drift-independent indications of oscillator displacement and can be used to extract inertial parameters.

Figure 30:
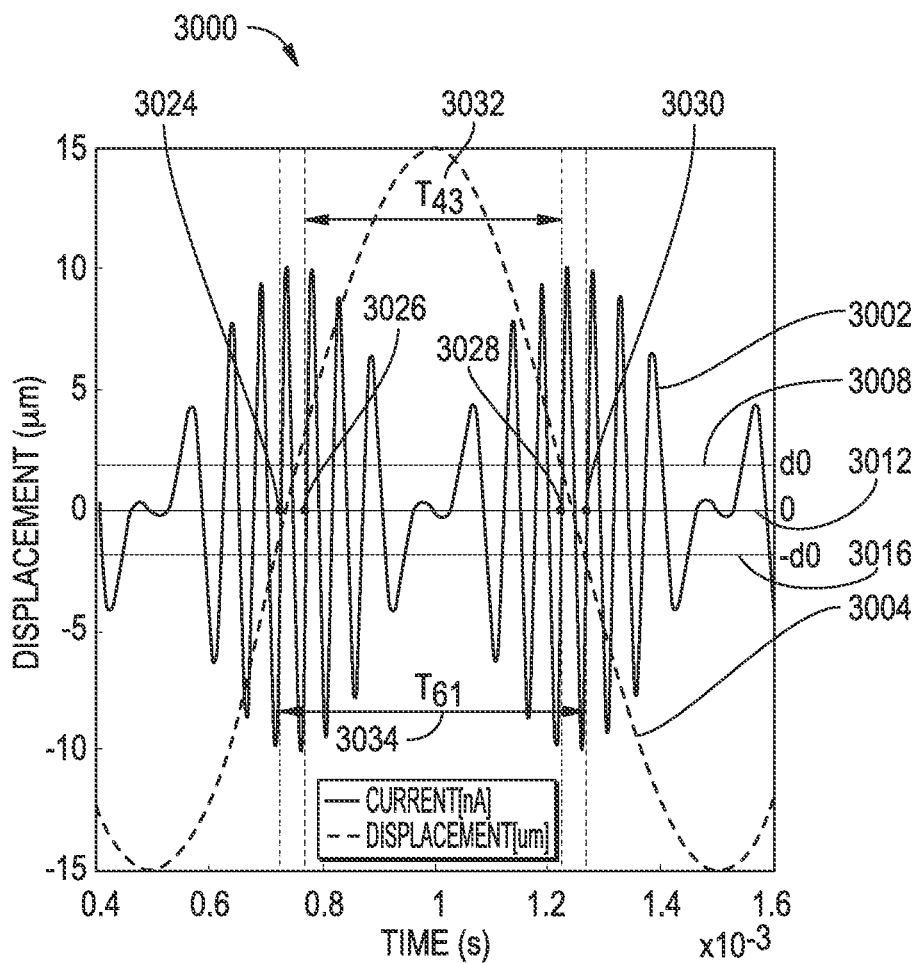
FIG. 30 depicts a graph that illustrates the response of a current to an oscillator displacement, according to an illustrative implementation.

FIG. 30 depicts a graph 3000 that illustrates the response of a current to an oscillator displacement. The graph 3000 includes a current curve 3002 and a displacement curve 3004. The current curve 3002 represents an input signal for a TIA. The TIA may produce an output signal such as the TIA output curve 2802 in response. The current curve 3002 is a capacitive current between the fixed beam 104 and the movable beam 102 in response to displacement of the movable beam 102 according to the displacement curve 3004. The current curve 3002 crosses zero at numerous times, including times 3024, 3026, 3028, and 3030. At the times 3024 and 3030, the movable element 102 has a displacement of $-d_0$, as shown in the graph 3000. At the times 3026 and 3028, the movable element 102 has a displacement of $+d_0$, shown on the graph 3000. The graph 3000 includes two time intervals $T_{43}$ 3032 and $T_{61}$ 3034. The time interval $T_{43}$ 3032 corresponds to the difference in time between time 3026 and time 3028. The time interval $T_{61}$ 3034 corresponds to the time difference between times 3024 and 3030. Thus, time interval $T_{61}$ 3034 corresponds to the time between subsequent crossings of the $-d_0$ 3016 level, and the time interval $T_{43}$ 3032 corresponds to the time interval between subsequent crossings of the $+d_0$ 3008 level. The methods used to determine the time intervals $T_{43}$ 3032 and $T_{61}$ 3034 can be used to determine other time intervals, such as between a crossings of the $+d_0$ 3008 and the next subsequent crossing of the $-d_0$ 3016, between a time interval between a crossing of the $-d_0$ 3016 and the next crossing of the $+d_0$ 3008, between the time 3030 and the next crossing of the $+d_0$ 3008, between crossings of the zero 3012, between zero-crossings due to a maximum or minimum of displacement, or between any other combination of zero-crossings of the current curve 2002 or a TIA output signal corresponding to the current curve 3002.

Figure 31:
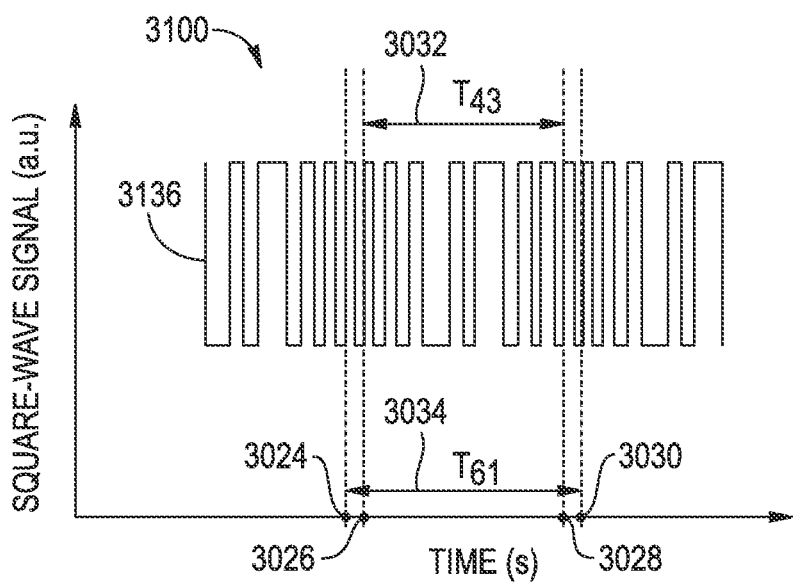
FIG. 31 depicts a graph showing a square-wave signal representing zero-crossing times of a current signal, according to an illustrative implementation.

FIG. 31 depicts a graph 3100 showing a square-wave signal representing zero-crossing times of the current signal 3002. The graph 3100 includes a square-wave curve 3136. The square-wave 3136 has substantially two values: a high value and a low value. While the square-wave curve 3136 may have intermediate values as it transitions between the high and low values, the time spent at intermediate values is far less than the combined time spent at the high and low of the values. The square-wave signal 3136 can be produced by a variety of methods, including using a comparator to detect changes in an input signal, by amplifying an input signal to the limits of an amplifier so as to saturate the amplifier (amplifying to the rails), by using an analog-to-digital converter, and the like. One way to produce these square-wave curve 3136 from the current curve 3002 is to use a comparator to detect zero-crossings of the current curve 3002. When the current curve 3002 has a value greater than a reference level (such as zero), the comparator outputs a high value, and when the current curve 3002 has a value less than the reference level (such as zero), the comparator has a low value. The comparator's output transitions from low to high when the current curve 3002 transitions from a negative value to a positive value, and the comparator's output transitions from high to low when the current curve 3002 transitions from a positive value to a negative value. Thus, times of rising edges of the square-wave signal 3136 correspond to times of negative-to-positive zero-crossings of the current curve 3004, and falling edges of the square-wave signal 3136 correspond to positive-to-negative zero-crossings of the current curve 3002. The square-wave signal 3136 includes the same time intervals 3032 and 3034 as the current curve 3002. One benefit of converting the current curve 3002 to a square-wave signal such as the square-wave signal 3136 is that in a square-wave signal, rising and falling edges are steeper. Steep rising and falling edges provide more accurate resolution of the timing of the edges and lower timing uncertainty. Another benefit is that square-wave signals are amenable to digital processing.

Figure 32:
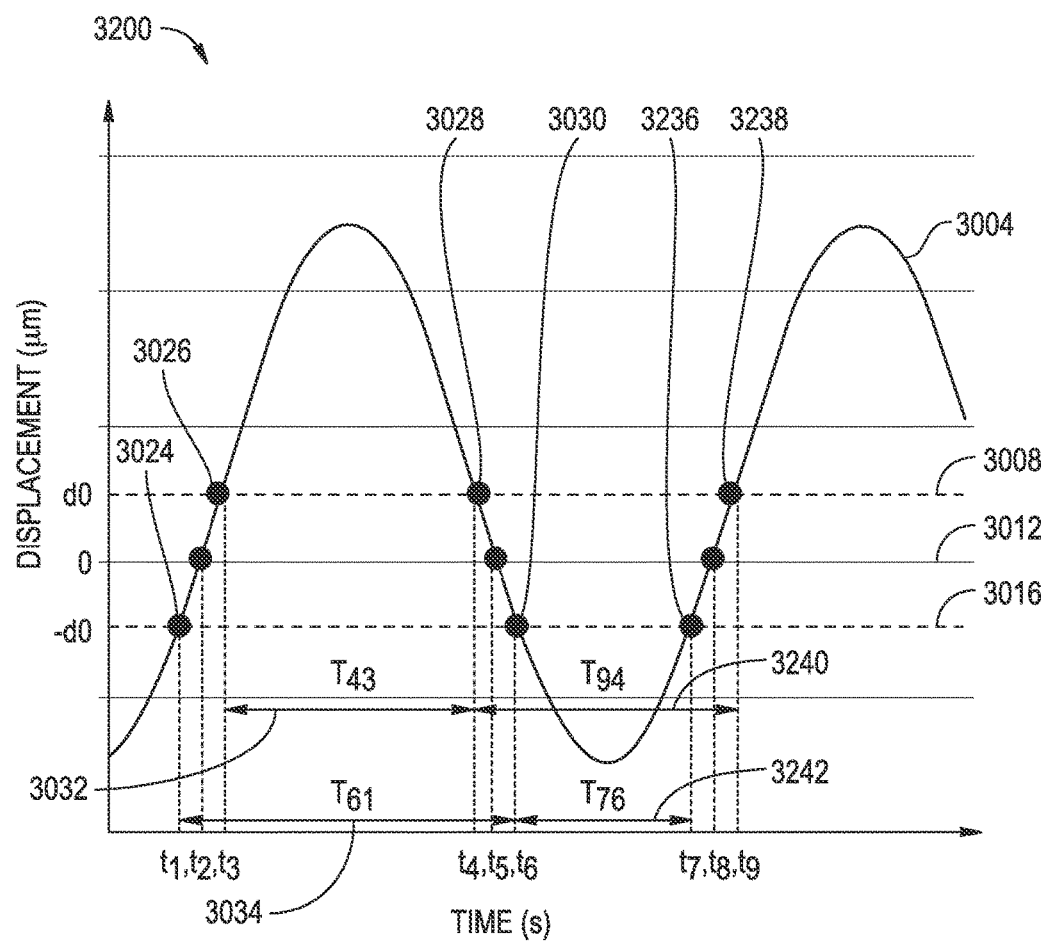
FIG. 32 depicts a graph which illustrates additional time intervals of a displacement curve, according to an illustrative implementation.

FIG. 32 depicts a graph 3200 which illustrates additional time intervals of displacement curve 3004. In addition to the times depicted in the graph 3000, the graph 3200 includes times 3236 and 3238. In addition to the time intervals depicted in the graph 3000, the graph 3200 includes the time interval $T_{94}$ 3240 and the time interval $T_{76}$ 3242. The time interval $T_{94}$ 3240 corresponds to the time interval between times 3038 and 3238, both crossings of the $d_0$ 3008 level. The time interval $T_{76}$ 3242 corresponds to the time interval between times 3030 and 3236, both crossings of the $-d_0$ 3016 level. As can be seen in FIG. 29, the oscillator displacement as shown by the displacement curve 2804 experiences an offset that is correlated with input acceleration as indicated by the acceleration curve 2806. Thus, one way to detect shifts of the displacement curve 3004 and thus input acceleration is to compare relative positions of zero-crossing times. For example, a sum of the time intervals $T_{43}$ 3032 and $T_{94}$ 3240 represents a period of oscillation as does a sum of the periods $T_{61}$ 3034 and $T_{36}$ 3242. In comparing a subset of the period, such as comparing the time interval $T_{43}$ 3032 with the sum of $T_{43}$ 3032 and $T_{94}$ 3240 represents the proportion of time that the oscillator spends at a displacement greater than $+d_0$ 3008. An increase in this proportion from a reference proportion indicates a greater acceleration in a positive direction than the reference. Likewise, a decrease in this proportion from the reference indicates a greater acceleration in the negative direction. Other time intervals can be used to calculate other proportions and changes in acceleration. Displacement of oscillator can be determined from the time intervals depicted in FIG. 32 using equations 11, 12, and 13.

$$d = \frac{2d_0 \cos\left(\pi \frac{T_{61}}{P_{m1}}\right)}{\cos\left(\pi \frac{T_{61}}{P_{m1}}\right) - \cos\left(\pi \frac{T_{43}}{P_{m2}}\right)} - d_0 \quad (11)$$

$$P_{m1} = T_{61} + T_{76} \quad (12)$$

$$P_{m2} = T_{43} + T_{94} \quad (13)$$

Displacement of the oscillator can be converted to an acceleration using Hooke's Law. Displacement of the oscillator can be calculated recursively for each half cycle of the oscillator. Using this information, the displacement of the oscillator can be recorded as a function of time. This allows the calculation of external perturbations with zero drift and lower broadband noise.

Figure 33:
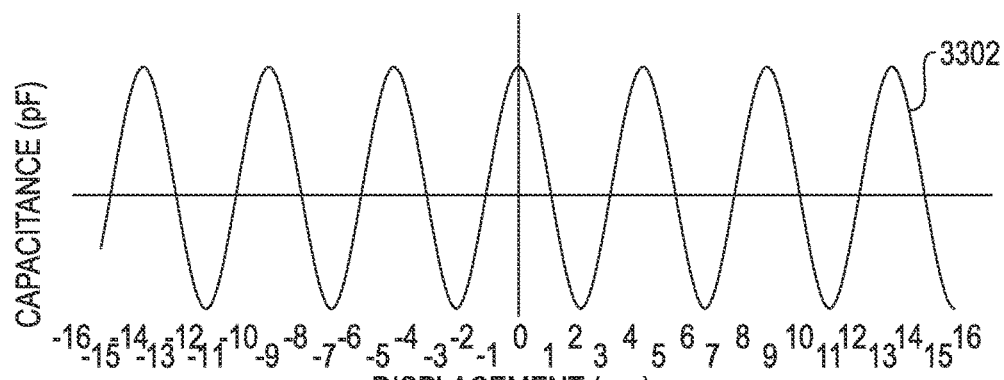
FIG. 33 depicts a relationship between capacitance of an inertial sensor and displacement of a moving element, according to an illustrative implementation.

FIG. 33 depicts the relationship between capacitance of the inertial sensor 100 and displacement of the moving element 102. FIG. 33 includes a capacitance curve 3302 that is periodic and substantially sinusoidal. Thus, monotonic motion of the movable element 102 produces a capacitance that changes non-monotonically with displacement. This non-monotonicity is a function of the geometric structure of the sensor 100 and the manner in which the sensor 100 is excited.

Figure 34:
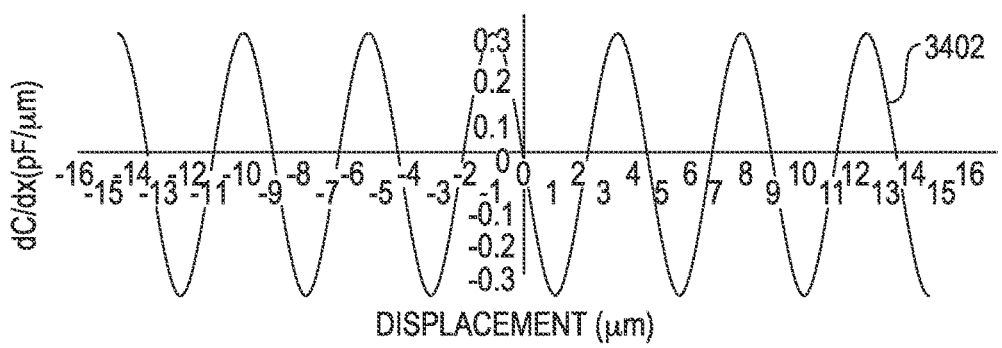
FIG. 34 depicts a relationship between displacement and the first derivative of capacitance with respect to displacement, according to an illustrative implementation.

FIG. 34 depicts the relationship between displacement and the first derivative of capacitance with respect to displacement. FIG. 34 includes a dC/dx curve 3402 which is periodic and substantially sinusoidal. The curve 3402 is the first derivative of the capacitance curve of 3302. As such, the dC/dx curve 3402 crosses zero when the capacitance curve 3302 experiences a local extremum. Capacitive current is proportional to the first derivative of capacitance and thus proportional to, and shares zero-crossings with, the dC/dx curve 3402.

Figure 35:
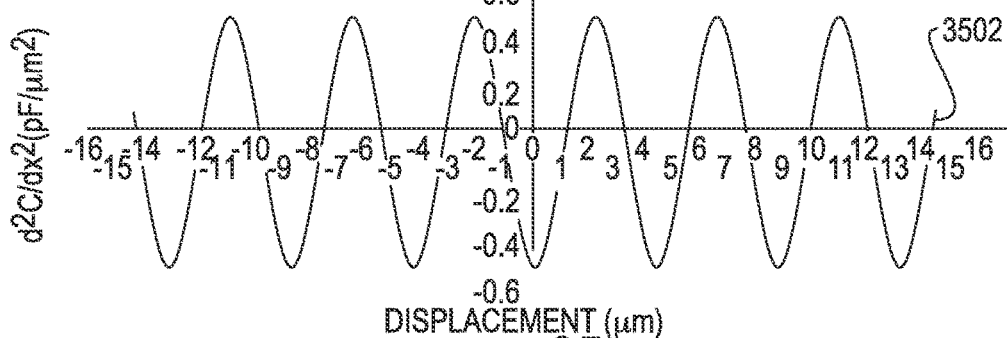
FIG. 35 depicts a relationship between displacement and the second derivative of capacitance with respect to displacement, according to an illustrative implementation.

FIG. 35 depicts the relationship between displacement and the second derivative of capacitance with respect to displacement. FIG. 35 includes a $d^2C/dx^2$ curve 3502. The $dC/dx^2$ curve 3502 is the first derivative of the dC/dx curve 3402 and as such has a value of zero at local extrema of the dC/dx curve 3402. The $d^2C/dx^2$ curve 3502 indicates the slope of the dC/dx curve 3402 and thus indicates locations at which the current is most rapidly changing. In some implementations, it is desirable to maximize the amplitude of the $d^2C/dx$ curve 3502 to maximize the steepness of the current curve. This reduces uncertainty in resolving timing of zero-crossings of the current. Reducing uncertainty of the zero-crossing times results in decreased system noise and decreased jitter, as well as, lower gain required of the system. Decreased jitter results in improved resolution of external perturbations. In some implementations, it is desirable to minimize the impact of variable parasitic capacitance, which is parasitic capacitance that varies with oscillator motion.

Figure 36:
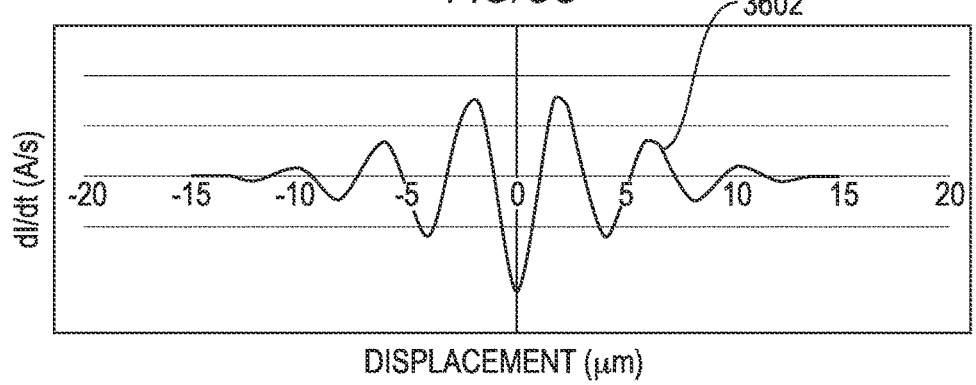
FIG. 36 depicts a relationship between time, the rate of change of capacitive current, and displacement, according to an illustrative implementation.

FIG. 36 depicts the relationship between time, the rate of change of capacitive current, and displacement. FIG. 36 includes a dI/dt curve 3602. The capacitive current used to determine the dI/dt curve 3602 is obtained by applying a fixed voltage across the capacitor used to produce the capacitive curve 3302. The dI/dt curve 3602 represents the rate at which the capacitive current is changing with time and thus provides an indicator of the steepness of the current slope. High magnitudes of the dI/dt signal indicate rapidly changing current and high current slopes. Since the oscillator used to generate the curves shown in FIGS. 33-36 oscillates about zero displacement and reverses direction at displacements of +15 μm and −15 μm, the velocity of the oscillator is lowest at its extrema of displacement. At these displacement extrema, the current is also changing less rapidly and thus the dI/dt curve 3602 has a lower magnitude. Using zero-crossings at which the dI/dt curve 3602 has large values results in improved timing resolution and decreased jitter. These zero-crossings occur near the center of the oscillator's range.

Figure 37:
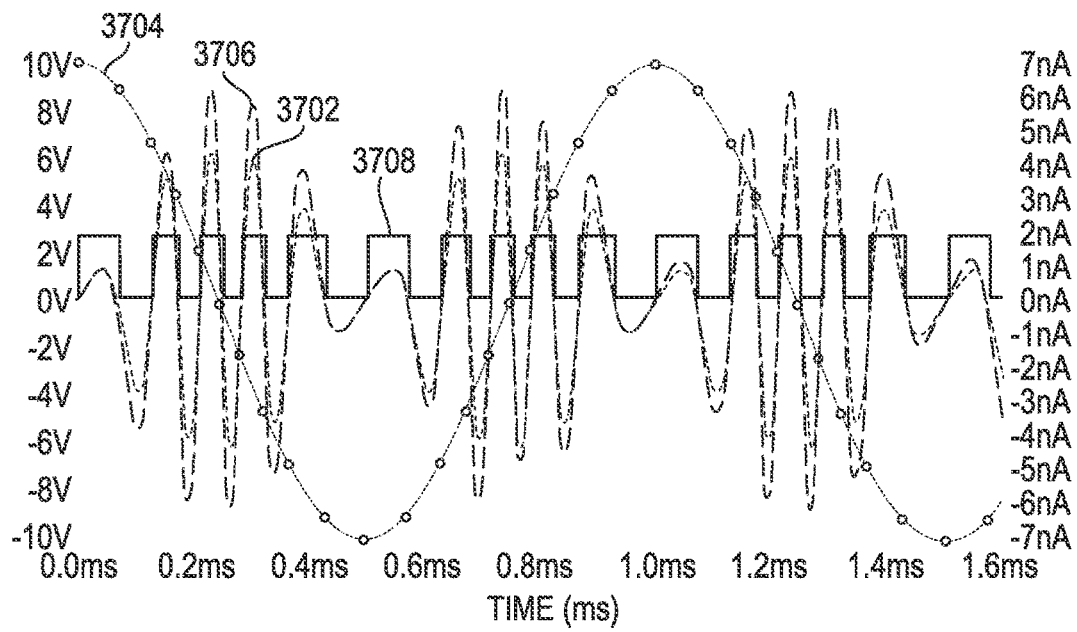
FIG. 37 depicts a relationship between oscillator displacement, capacitive current, output voltage of a current measurement unit such as a transimpedance amplifier, and a square-wave signal produced by a zero-crossing detector such as a comparator, according to an illustrative implementation.

FIG. 37 depicts the relationship between oscillator displacement, capacitive current, output voltage of a current measurement unit such as a TIA, and a square-wave signal produced by a threshold-crossing detector such as a comparator. FIG. 37 includes an output voltage curve 3702, an oscillator displacement curve 3704, a capacitive current 3706, and a square-wave curve 3708. The output voltage curve 3702 is representative of the TIA output curve 2802. The oscillator displacement 3704 is representative of any of the displacement curves 2718, 2804, and 3004. The current curve 3706 is representative of the current curve 3002. The square-wave curve 3708 is representative of the square-wave curve 3136.

The current curve 3706 represents a capacitive current between a movable element, such as the movable element 102 and a fixed element, such as the fixed element 104. The output voltage curve 3702 represents the output voltage of an amplifier having the current curve 3706 as an input. The displacement curve 3704 represents displacement of the movable element 102 with respect to the fixed element 104. The square-wave curve 3708 represents the output of a zero-crossing detector having the current curve 3706 as an input. FIG. 37 includes circles indicating points on the displacement curve 3704 which correspond to the zero-crossings of the current curve 3706. FIG. 37 depicts signals resulting from a scenario in which the movable element 102 is oscillated to a displacement amplitude such that a tooth of the movable element 102 is aligned with five different teeth of the fixed element 104 at different times in the period of oscillation. Thus, during one period of oscillation, the current curve 3706 experiences 20 zero-crossings. Two zero-crossings result from alignment of the tooth on the movable element 102 with each of the five respective teeth on the fixed element for which it becomes aligned during the period, for a total of 10 zero-crossings. The current curve 3706 experiences two zero-crossings for each of the four gaps between teeth of the fixed element 104 with which the tooth of the movable element 102 becomes aligned during each period, for a total of eight additional zero-crossings. Finally, the current curve 3706 experiences one zero-crossing for each of the two extrema of oscillator displacement during the period, for a total of two additional zero-crossings. This brings the total number of zero-crossings during each period of oscillator displacement to 20. The amplitude of oscillator displacement relative to the pitch of teeth on the fixed element 104 and movable element 102 affects the number of zero-crossings of the current during each period of oscillation because the amplitude controls the number of teeth and gaps of the fixed element with which each of the teeth on the movable element interacts. Except for zero-crossings due to displacement extrema, the displacements at which these zero-crossings occur are independent of oscillator velocity, applied inertial force, or amplitude of oscillation.

Figure 38:
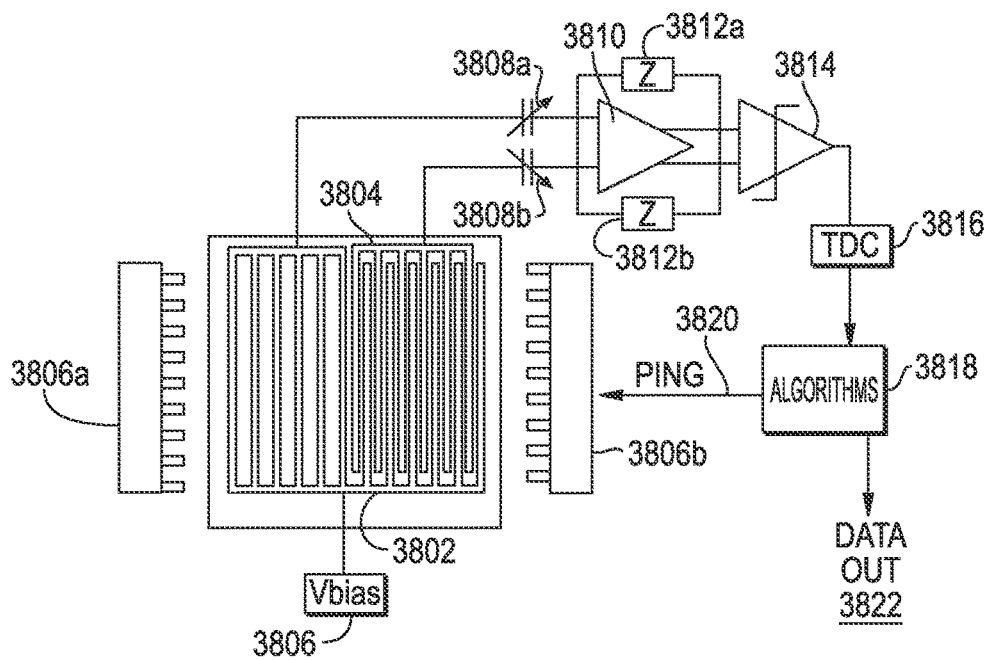
FIG. 38 depicts a system for extracting inertial data from an input acceleration using a periodic capacitive sensor, according to an illustrative implementation.

FIG. 38 depicts a system for extracting inertial data from an input acceleration using a periodic capacitive sensor. FIG. 38 depicts a moveable element 3802 and a fixed element 3804, both of which have electrically conductive components which together act as a capacitor. A bias voltage 3806 is applied between the moveable element 3802 and the fixed element 3804. FIG. 38 depicts drive elements 3806a and 3806b (collectively, drive elements 3806) which oscillate the moveable element 3802 laterally with respect to the fixed element 3804. The drive elements 3806 can be comb drives or levitation drives. As the moveable element 3802 oscillates with respect to the fixed element 3804, the capacitive between the two elements varies. Each of the moveable element 3802 and the fixed element 3804 each has a periodic array of conductive structures. The conductive structures on the left halves of the fixed element 3804 and the moveable element 3802 are aligned in the rest position. The conductive structures on the right halves of the moveable element 3802 and the fixed element 3804 are anti-aligned in the rest position. Thus, as the moveable element 3802 oscillates with respect to the fixed element 3804, the capacitances of the left and right halves of the structure change at a frequency equal to the frequency of oscillation, but the capacitance of the right half is phase-shifted from the capacitance of the left half by 180°. This phase shift of 180° is achieved by offsetting the right electrodes by one-half of the pitch distance between electrodes. The variable capacitance of each of the left and right halves is represented by the variable capacitors 3808a and 3808b (collectively, variable capacitors 3808), respectively.

A capacitive current flows through the circuit due to the changing capacitance, and the capacitive currents of each of the left and right halves are measured by an amplifier 3810 having feedback resistors 3812a and 3812b (collectively, feedback resistors 3812). In some examples, a separate amplifier is used to independently measure currents from each of the capacitors 3808. A threshold crossing detector 3814 detects times at which the capacitive currents cross reference thresholds. In some examples, the reference threshold is zero, and in some examples the reference threshold is different than zero. One example of a threshold crossing detector 3814 is a comparator. The output of the threshold crossing detector 3814 provides an input to a TDC 3816. The TDC 3816 provides time intervals at which the reference threshold is crossed. The time intervals measured by the TDC 3816 are provided to algorithms 3818 which extract inertial parameters from the measured time intervals. The extracted inertial parameters are represented by the data out 3822. The algorithms 3818 can provide a ping 3820 to the drive elements 3806. The ping 3820 can provide feedback to the drive elements based on measured parameters of the oscillation. In some examples, the left and right halves are physically offset by distances other than one-half of the pitch between adjacent electrodes, resulting in phase offsets of other than 180°. By having left and right halves moving together but providing signals with different phases, the system depicted in FIG. 38 can employ force cancellation and/or convenient mathematical relationships to extract inertial parameters from nonlinear periodic signals.

Figure 39:
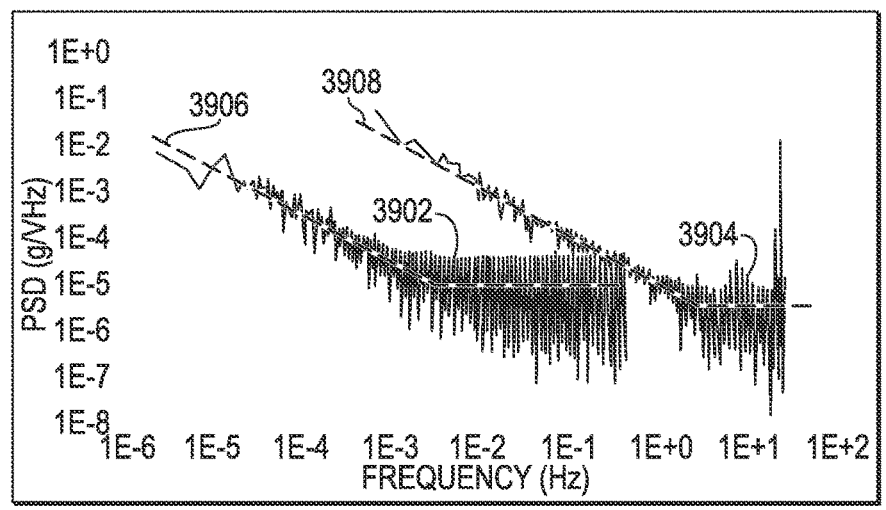
FIG. 39 depicts the noise behavior of the systems and methods described herein, according to an illustrative implementation.

FIG. 39 depicts the noise behavior of the systems and methods described herein as compared to a conventional system. FIG. 39 includes a noise curve 3902 for a periodic capacitive sensor constructed and operated according to the systems and methods described herein. FIG. 39 also includes a noise curve 3904 for a prior art sensor. FIG. 39 includes a fit curve 3906 for the sensor constructing and operated according to the systems and methods described herein and a fit curve 3908 for the conventional sensor. The "knee" of a noise curve indicates the frequency below which noise increases significantly with decreasing frequency. The sensor constructed and operated according to the systems and methods described herein exhibits a 1/f noise knee at 0.003 Hz, while the prior art sensor exhibits a noise knee at 3 Hz. The lower noise knee of the systems and methods described herein allows better resolution of low-frequency signals.

Figure 40:
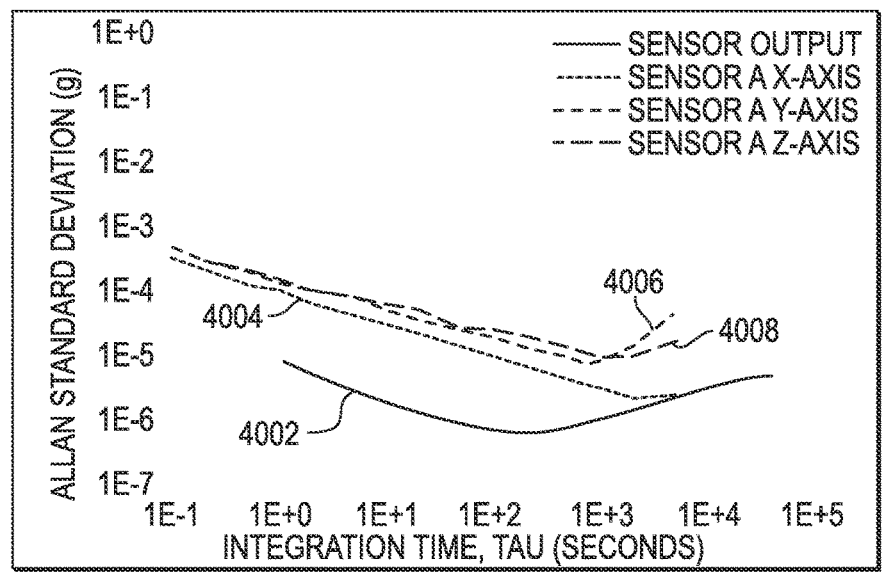
FIG. 40 depicts an Allan standard deviation graph showing the long-term stability of a sensor constructed and operated according to the systems and methods described herein, according to an illustrative implementation.

FIG. 40 depicts an Allan standard deviation graph showing the long-term stability of a sensor constructed and operated according to the systems and methods described herein as compared to a conventional system. FIG. 40 includes a curve 4002 showing the long-term stability of the output of a sensor constructed and operated according to the systems and methods described herein. FIG. 40 also includes curves 4008, 4006, and 4004 representing long-term stability of the x-axis, y-axis, and z-axis outputs of a conventional system, respectively. As can be seen in FIG. 40 the sensor constructed and operated according to the system and methods described herein has a lower Allan standard deviation across all integration times than any other axis of the prior art sensor.

Figure 41:
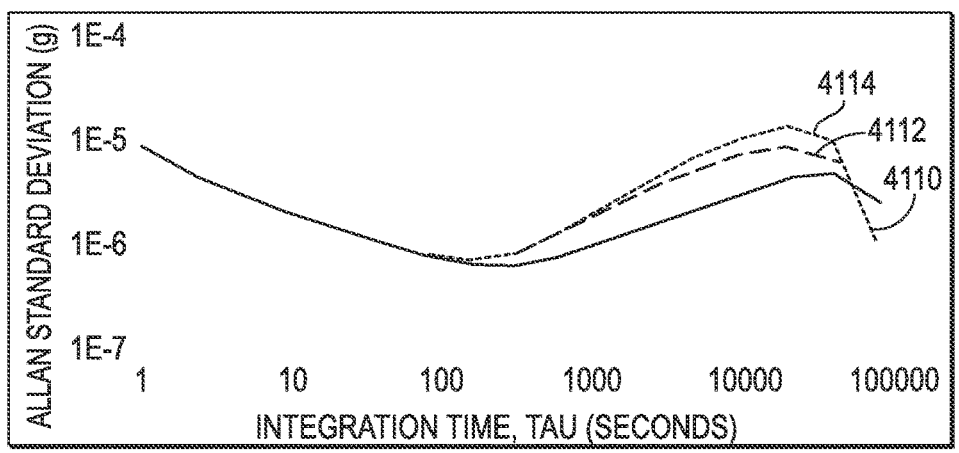
FIG. 41 depicts the long-term stability of an output of a sensor constructed and operated according to the systems and methods described herein, according to an illustrative implementation.

FIG. 41 depicts the long-term stability of an output of a sensor constructed and operated according to the systems and methods described herein. FIG. 41 includes 3 curves 4110, 4112 and 4114, each indicating Allan standard deviation of the sensor output over a 5.5 day period. The Allan standard deviation does not exceed 20 μg over the measured time period.

Figure 42:
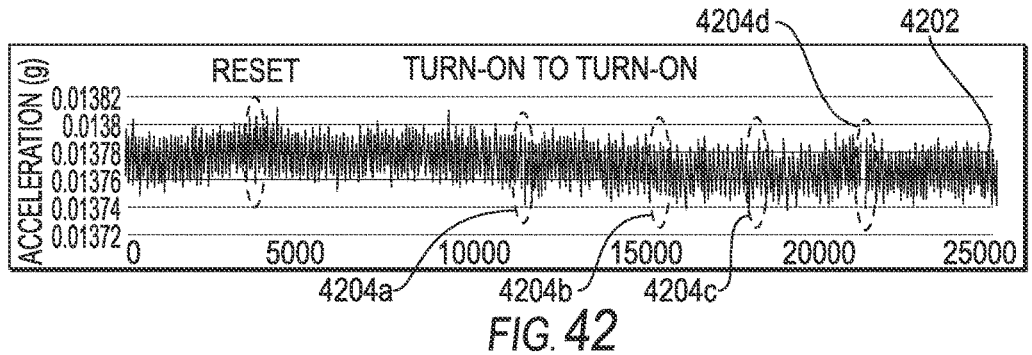
FIG. 42 depicts the turn-on repeatability of a sensor constructed and operated according to the systems and methods described herein, according to an illustrative implementation.

FIG. 42 depicts the turn-on repeatability of a sensor constructed and operated according to the systems and methods described herein. Turn-on repeatability is important because often, power-cycles of traditional sensors will cause variation of internal gain or charging effects which result in significant degradation of turn-on repeatability. FIG. 42 includes a measured acceleration curve 4202 representing the output of the initial sensor. During the time period depicted by FIG. 42, the inertial sensor experiences a constant acceleration and should produce a constant output. At times 4204a, 4204b, 4204c, and 4204d (collectively times 4204), the sensor is powered off and then powered on again. As seen in FIG. 42, the sensor output does not significantly change when the sensor is power-cycled. This results in decreased drift, improved performance and improved reliability.

Figure 43:
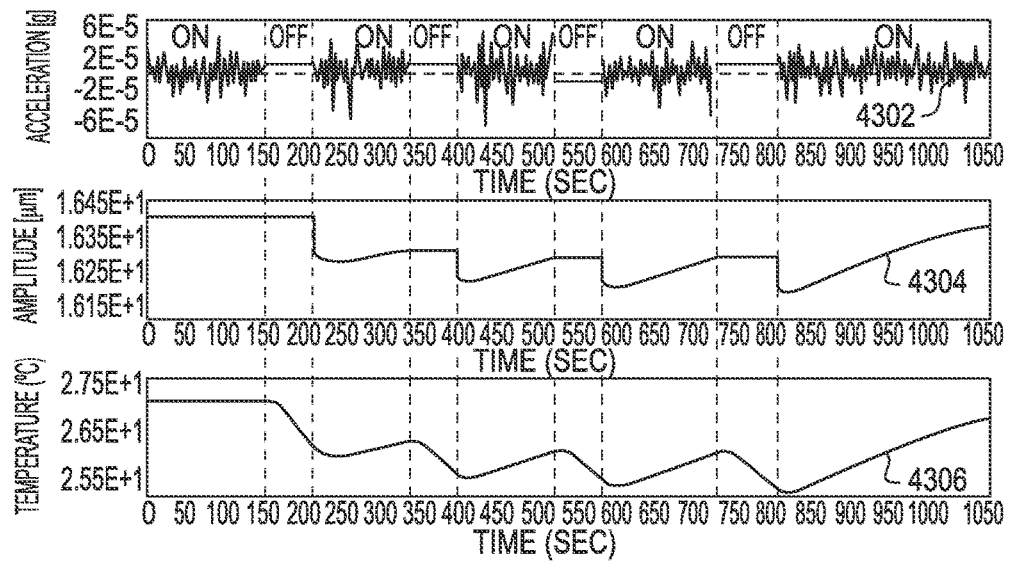
FIG. 43 depicts the stability of a sensor constructed and operated according to the systems and methods described herein, according to an illustrative implementation.

FIG. 43 depicts the stability of a sensor constructed and operated according to the systems and methods described herein. During the time period depicted in FIG. 43, the sensor experiences a constant acceleration and should produce a constant output signal. FIG. 43 includes an acceleration output curve 4302, a displacement amplitude curve 4304, and an ambient temperature curve 4306. The acceleration output 4302 represents the output of the sensor. The displacement amplitude curve 4304 represents the amplitude of the oscillator displacement. The ambient temperature curve 4306 represents the ambient temperature of the sensor's environment. Because increases in temperature would reduce the stiffness of the oscillator material, increases in the temperature curve 4306 are correlated with increases in the displacement amplitude curve 4304. However, even though the oscillator displacement amplitude is changing, the sensor output curve 4302 remains relatively constant. This illustrates that the sensor output is independent of ambient temperature changes. The sensor output curve 4302 also remains relatively constant when the sensor is power-cycled.

Figure 44:
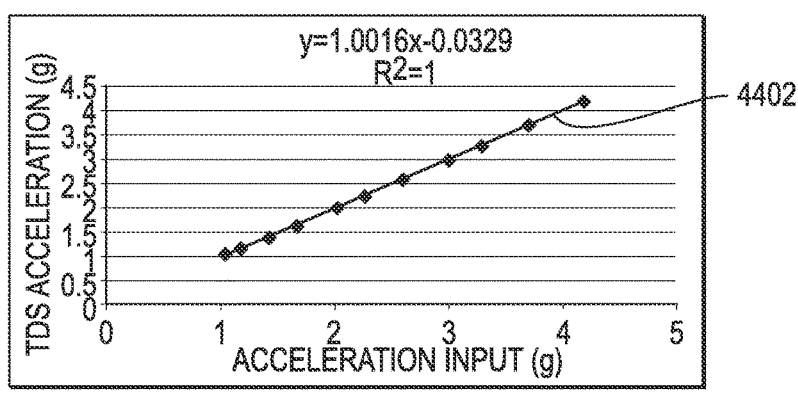
FIG. 44 depicts a graph showing the linearity of a sensor constructed and operated according to the systems and methods described herein, according to an illustrative implementation.

FIG. 44 depicts a graph showing the linearity of a sensor constructed and operated according to the systems and methods described herein. FIG. 44 includes a curve 4402 demonstrating the relationship between sensor output acceleration and input acceleration. The sensor produces an accurate and linear output acceleration signal over an input acceleration range of 1-4 g. The sensor produces a linear output despite using nonlinear periodic signals to determine the acceleration.

Figure 45:
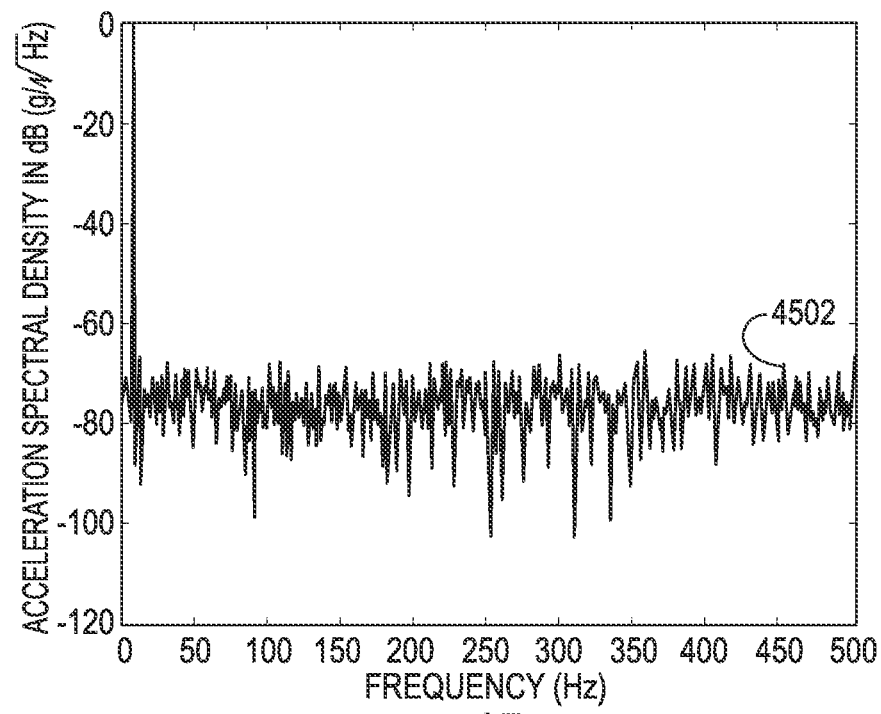
FIG. 45 depicts an output spectrum in the frequency domain of a sensor constructed and operated according to the systems and methods described herein, according to an illustrative implementation.

FIG. 45 depicts the output spectrum in the frequency domain of a sensor constructed and operated according to the systems and methods described herein. FIG. 45 includes an acceleration spectral density curve 4502 which represents the sensor output in response to a 10 Hz periodic input acceleration with an amplitude of 1 g. The acceleration spectral density curve 4502 exhibits a significant peak at 10 Hz and a low level of broadband white noise at other frequencies.

Figure 46:
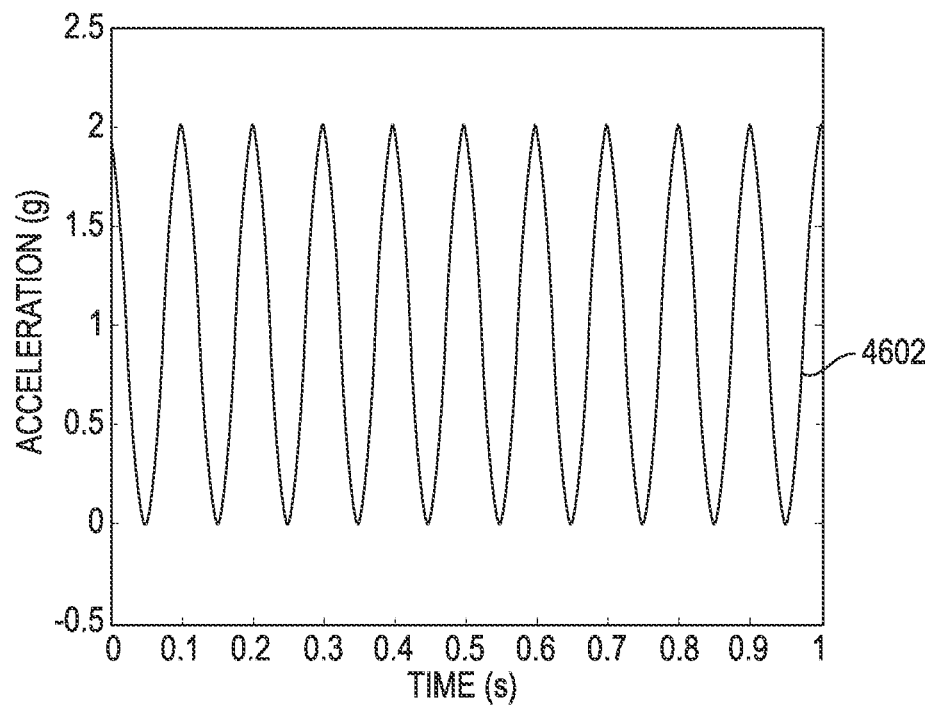
FIG. 46 depicts an acceleration output of the scenario depicted in FIG. 45, in the time domain, according to an illustrative implementation.

FIG. 46 depicts the acceleration output of the scenario depicted in FIG. 45, in the time domain. FIG. 46 includes an acceleration curve 4602 which represents the sensor output acceleration of a function of time. This output acceleration curve 4602 is a periodic curve at 10 Hz with an amplitude of 1 g. The acceleration curve 4602 has high stability and low drift.

Figure 47:
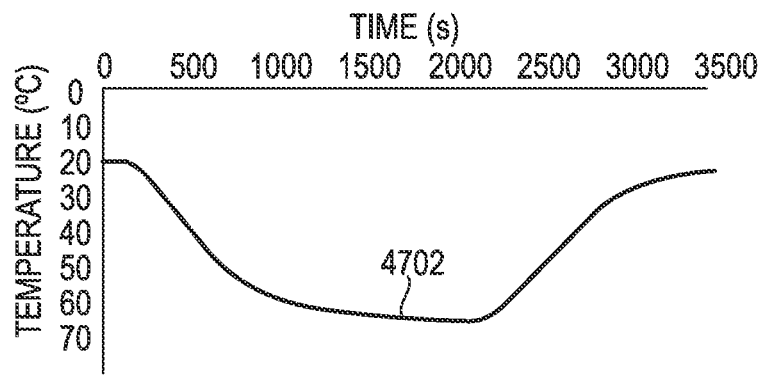
FIG. 47 depicts a curve which represents a change in ambient temperature applied to the oscillator, according to an illustrative implementation.
Figure 48:
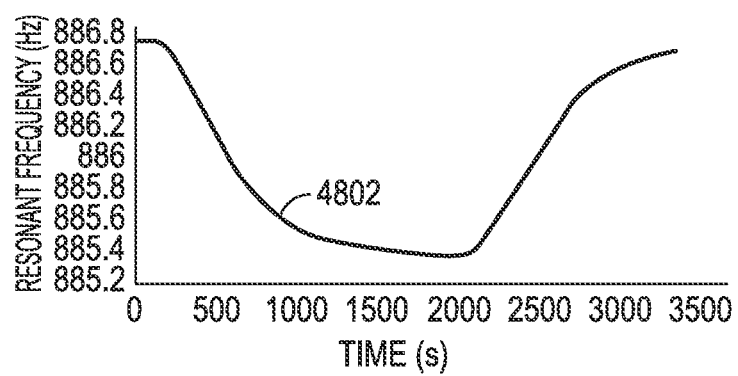
FIG. 48 depicts a curve which represents a change in resonant frequency of the oscillator due to the change in temperature depicted in FIG. 47, according to an illustrative implementation.
Figure 49:
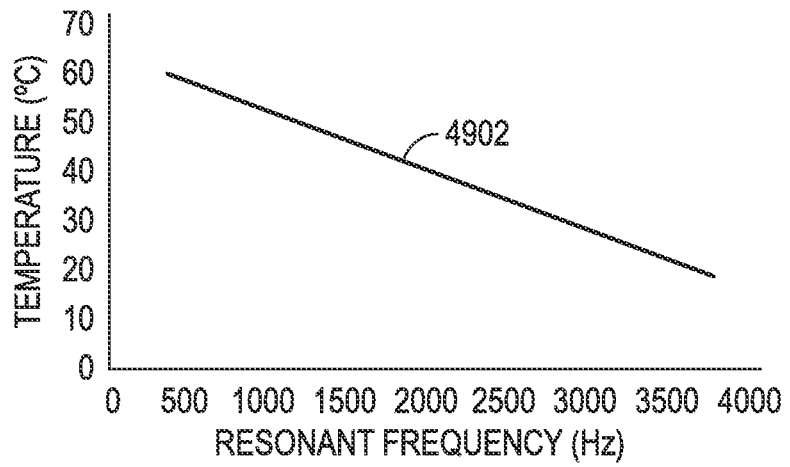
FIG. 49 depicts a curve representing the dependence of resonant frequency on temperature, according to an illustrative implementation.

FIGS. 47-49 depict the impact of temperature on resonant frequency of an oscillator constructed and operated according to the systems and methods described herein. FIG. 47 depicts a curve 4702 which represents a change in ambient temperature of the oscillator. FIG. 48 depicts a curve 4802 which represents a change in resonant frequency of the oscillator due to the change in temperature depicted in FIG. 47. This change in resonant frequency is due to a change in stiffness of the oscillator. FIG. 49 depicts a curve 4902 representing the dependence of resonant frequency on temperature. The curve 4902 is linear, indicating that the resonant frequency varies linearly with ambient temperature. This linearity illustrates that the measurement of frequency, as performed by the sensor, is decoupled from other system parameters such as electrical noise, gains, voltages, and offsets that may vary with temperature.

Figure 50:
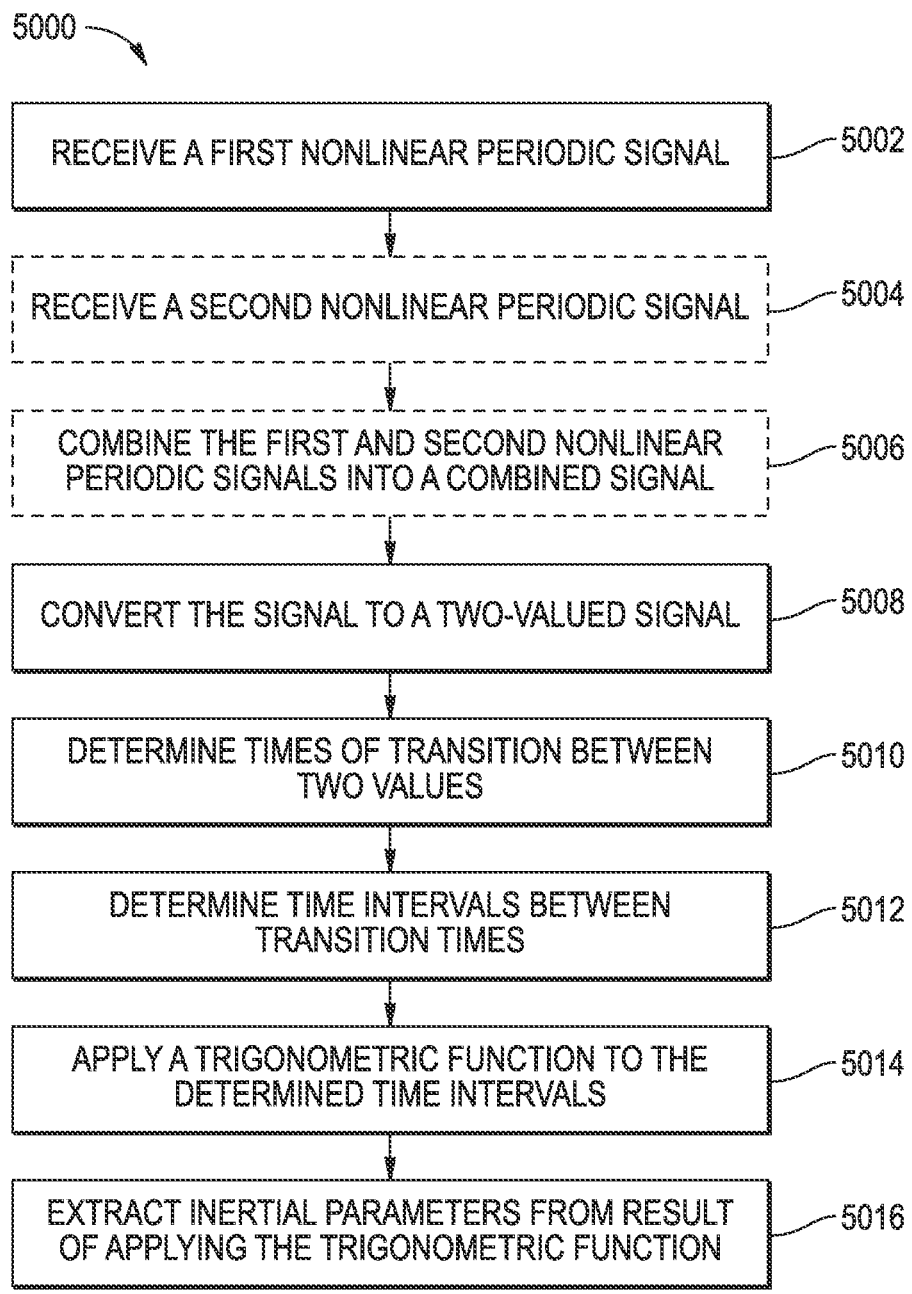
FIG. 50 depicts a flow chart of a method used to extract inertial parameters from a nonlinear periodic signal, according to an illustrative implementation.

FIG. 50 depicts a flow chart of a method 5000 used to extract inertial parameters from a nonlinear periodic signal. At 5002, a first nonlinear periodic signal is received. At 5004, a second nonlinear periodic signal is optionally received. The first nonlinear periodic signal and the optional second nonlinear periodic signal can be generated by any of the structures depicted in FIGS. 1-3, 5-17, 19-27, and 38. The first nonlinear periodic signal and the optional second nonlinear periodic signal can be any of the signals 402, 2202, 2204, 2302, 2304, 2802, 3002, 3302, 3402, 3502, 3602, 3702, and 3706.

At 5006, optionally, the first and second nonlinear periodic signals are combined into a combined signal. This can be accomplished by one or both of the elements 2706 and 3810. If the steps 5004 and 5006 are omitted, the method 5000 proceeds from 5002 directly to 5008.

At 5008, the signal is converted to a two-valued signal. The two-valued signal can be a signal that has substantially only two values, but may transition quickly between the two values. This two-valued signal can be a digital signal such as that output from a digital circuit element. In some examples, the two-valued signal is produced by amplifying the combined signal or one of the first and second nonlinear signals using a high-gain amplifier. This technique can be referred to as "amplifying to the rails." The two-valued signal may be converted by an element such as the element 3814, and can be one or more of the signals 2712, 3136, 3708. The two-valued signal can be determined based on a threshold such that if the combined, first, or second signal is above the threshold, the two-valued signal takes on a first value and if below the threshold, the two-valued signal takes on a second value.

At 5010, times of transitions between the two values of the two-valued signal are determined. In some examples, these times can be determined using a time-to-digital converter (TDC) such as one or both of the elements 2714 and 3816. The time intervals determined in this way can be one or more of the intervals 2716, 3032, 3034, 3240, and 3242.

At 5014, a trigonometric function is applied to the determined time intervals. The trigonometric function can be a sine function, a cosine function, a tangent function, a cotangent function, a secant function, and a cosecant function. The trigonometric function can also be one or more of the inverse trigonometric functions such as the arcsine, the arccosine, the arctangent, the arccotangent, the arcsecant, and the arccosecant functions. Applying the trigonometric function can include applying a trigonometric function to an argument that is based on the determined time intervals.

At 5016, inertial parameters are extracted from the result of applying the trigonometric function. Extracting the inertial parameters can include curve fitting and computing derivatives of the result. The inertial information obtained can be one or more of the signals 2722, 2724, 2806 and 3822. The inertial parameters can one or more of sensor acceleration, sensor velocity, sensor displacement, sensor rotation rate, sensor rotational acceleration and higher order derivatives of linear or rotational acceleration, such as jerk, snap, crackle, and pop.

Figure 51:
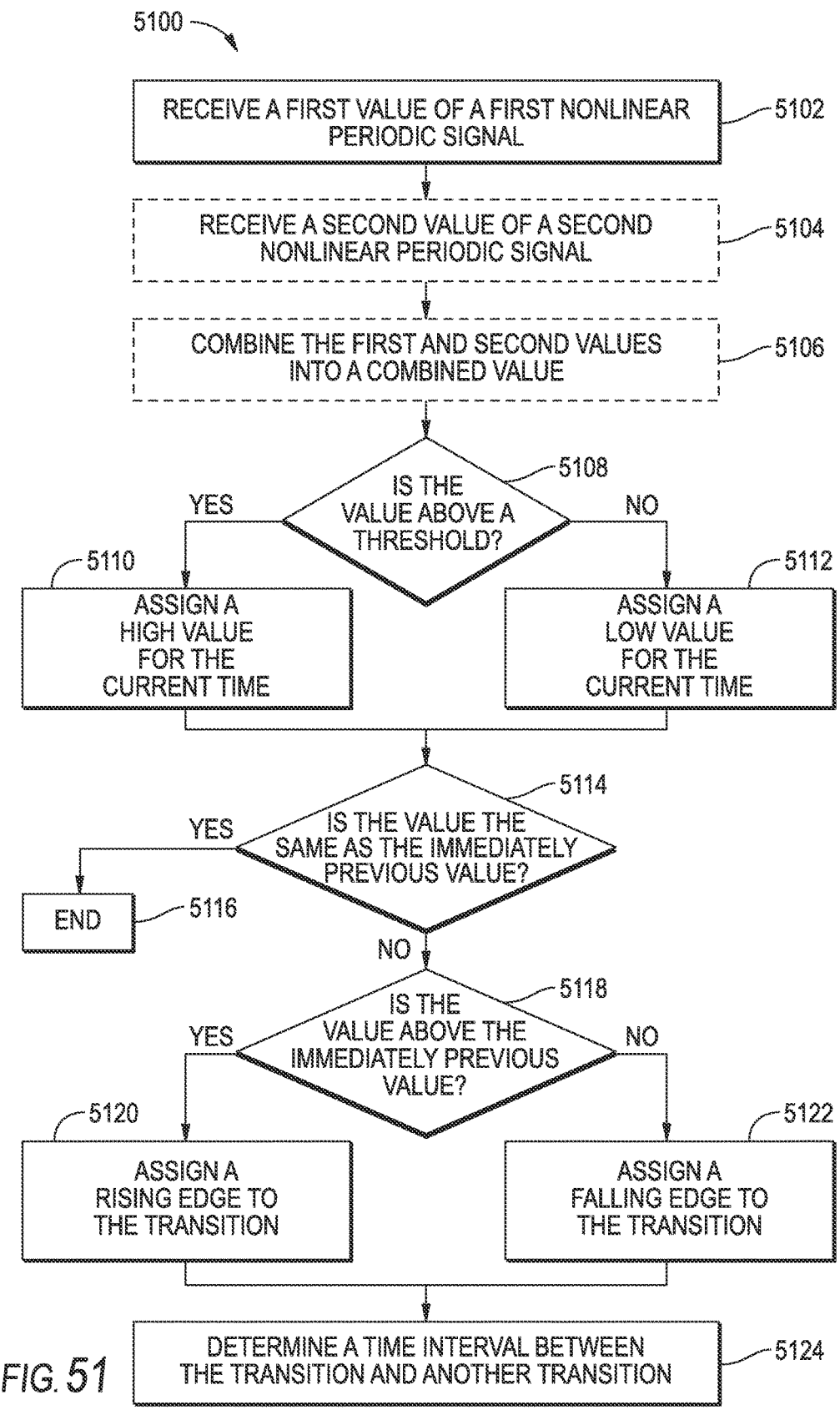
FIG. 51 depicts a method for determining times of transition between two values based on nonlinear periodic signals, according to an illustrative implementation.

FIG. 51 depicts a method 5100 for determining times of transition between two values based on nonlinear periodic signals. The method 5100 can be used to perform one or more of the steps 5002, 5004, 5006, 5008, and 5010 of the method 5000.

At 5102, a first value of a first nonlinear of a nonlinear periodic signal is received. At 5104, a second value of a second nonlinear periodic signal is optionally received. The first and second values are values of the first and second signals at particular moments in time, and can be analog or digital values. The first and second nonlinear periodic signals of the method 5100 can be the same as the first and second nonlinear periodic signals of the method 5000.

At 5106, the first and second values are optionally combined into a combined value. The values may be combined using one or both of the elements 2706 and 3810. Combining may include summing the values, taking a difference of the values, multiplying the values, or dividing the values. If the optional steps 5104 and 5106 are omitted, the method 5100 proceeds from 5102 directly to 5108.

At 5108, the first value or the combined value is compared to a threshold. If the value is above the threshold, the method 5100 proceeds to 5110.

At 5110, a high value is assigned for the current time. If the value is not above the threshold, the method 5100 proceeds to 5112. At 5112, a low value is assigned for the current time. The steps 5108, 5110 and 5112 can be used to generate a two-valued signal having high and low values from an input signal. The two-valued signal of the method 5100 can be the same as the signal of the method 5000.

At 5114, the value of the signal for the current time is compared to a value of the signal for an immediately previous time. If the two values are the same, the method 5100 proceeds to 5116 where the method 5100 terminates. If the two values are not the same, a transition has occurred and the method proceeds to 5118.

At 5118, the sense of the transition (whether the transition is a rising edge or a falling edge) is determined. If the value for the current time is greater than the value for the previous time, a rising edge is assigned to the transition.

If the value for the current time is not above the value for the previous time, the method 5100 proceeds to 5122. At 5122, a falling edge is assigned to the transition. Thus, times having transitions are detected and classified as having either rising or falling edges. At 5124, a time interval is determined between the transition and another transition. Time intervals between these transition times can be determined by obtaining a difference in time values between times of transition.

Figure 52:
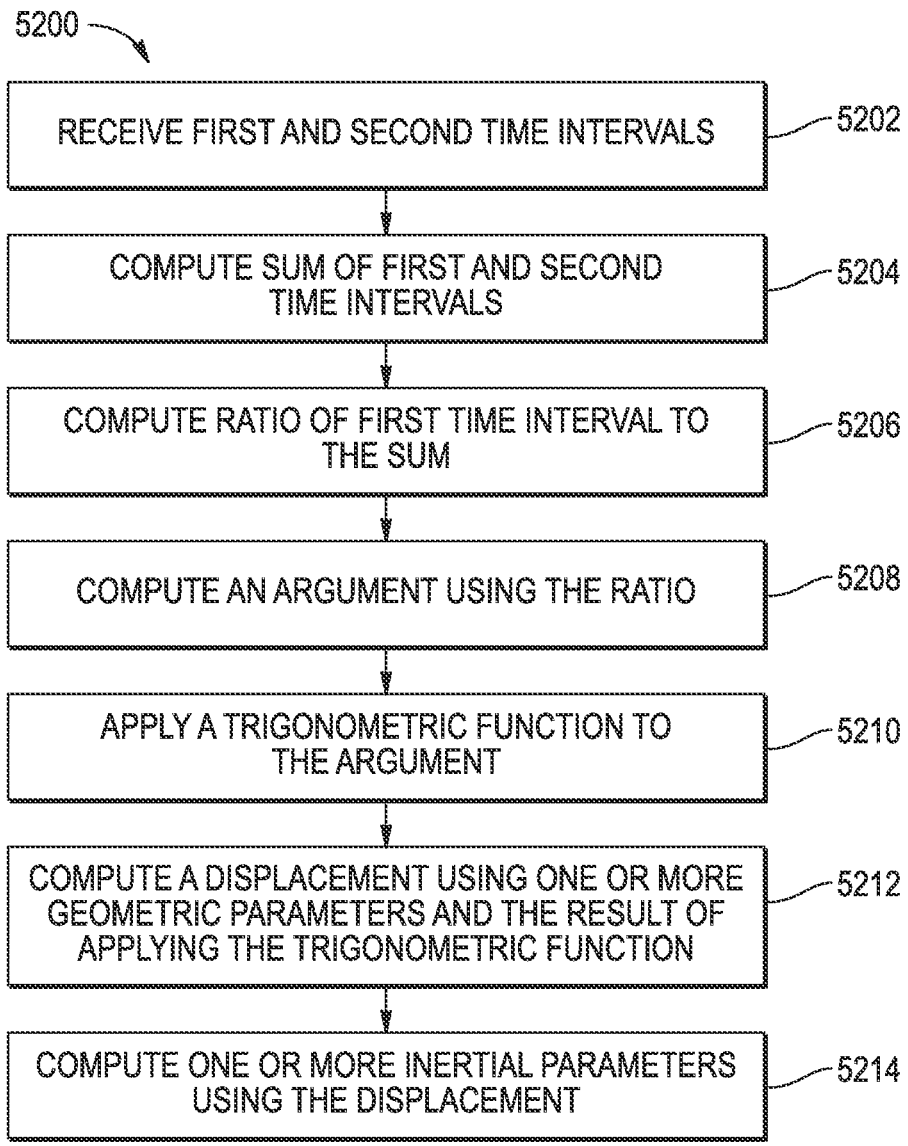
FIG. 52 depicts a method to compute inertial parameters from time intervals, according to an illustrative implementation.

FIG. 52 depicts a method 5200 to compute inertial parameters from time intervals. The method 5200 can be used to perform one or more of the steps 5014 and 5016 of the method 5000.

At 5202, first and second time intervals are received. The first and second time intervals can be determined using the method 5100.

At 5204, a sum of the first and second time intervals is computed. The sum can be the measured period as described by equations 12 and 13. At 5206, a ratio of the first time interval to the sum is computed. The ratio can be one or more of the ratios forming part of the arguments of the cosine functions in equation 11.

At 5208, an argument is computed using the ratio. The argument can be one or more of the arguments of the cosine functions of equation 11.

At 5210, a trigonometric function is applied to the argument. The trigonometric function can be any of the trigonometric functions described with respect to step 5104 of the method 5000.

At 5212, a displacement is computed using one or more geometric parameters and the result of applying the trigonometric function. The displacement can be computed using equation 11. Computing displacement can involve computing more than one trigonometric function, and arguments other than the computed argument of 5208 can be included as arguments of some of the trigonometric functions.

At 5214, one or more inertial parameters are computed using the displacement. The inertial parameters computed can be any of the inertial parameters described with respect to step 5016 of the method 5000. Inertial parameters can be computed by obtaining one or more derivatives of the displacement with respect to time. Inertial parameters may be extracted using an offset of the computed displacement to determine an external acceleration. In this way, inertial parameters are computed from time intervals.

In some implementations, a sensor includes a fixed comb-like structure with teeth periodically spaced at a pitch. This fixed comb-like structure is initially aligned with a nearby and identical structure which is attached to a proof mass that is mobile in a direction parallel to pitch direction. The capacitance between the mobile and fixed structures varies nonlinearly and non-monotonically as a function of x(t), which represents the relative lateral displacement between the moveable and fixed structures. Additionally, this nonlinear capacitance variation between the moveable and fixed structures is known, repeatable, and periodic (having degenerate values). The capacitance can be modeled as shown in equation 14.

$$S_{MAP}(t) = C_0 + C_1 \cdot \sin\left[\frac{2\pi}{P} \cdot x(t)\right] = C_0 + C_1 \cdot \sin\left[\frac{2\pi}{P} \cdot (A\sin(\omega_d t) + \Delta)\right] \quad (14)$$

In equation 14, the motion of the proof mass is sinusoidal as shown in equation 15.

$$x(t) = A \sin(\omega_d t) + \Delta \quad (15)$$

Performing calculations using the capacitance, and electrical signals resulting therefrom, can produce the amplitude, frequency, and offset of the motion the proof mass. These parameters are A, $\omega_d$, and $\Delta$, respectively. By repeatedly solving for these variables, the amplitude, frequency and offset of the motion of the proof mass can be determined with respect to time. The offset is proportional to an external acceleration acting on the sensor.

To obtain these parameters, the times at which the sensor has predetermined values of capacitance are measured. At these times, the proof mass is known to be at a position that is given by equation 16, where n takes on integral values.

$$\frac{2\pi}{P} \cdot x(t) = n \cdot \pi \quad (16)$$

The oscillator is known to be at a displacement that is a multiple of P/2 by tracking the number of times at which the capacitance equals the predetermined capacitance. The number of times at which the oscillator crosses displacements of P/2 can be tracked to overcome issues of degeneracy in capacitance. In particular, successive times at which the oscillator displacement equals +P/2 and −P/2 (δt and δt−, respectively) are measured and used to solve for A, $\omega_d$, and Δ. Equation 17 shows the calculation of $\omega_d$ as a function of the time intervals.

$$\omega_d = \frac{2\pi}{\text{Period}} = 2\pi \frac{2}{(\delta t_1^+ + \delta t_2^+ + \delta t_1^- + \delta t_2^-)} \quad (17)$$

Exploiting the similarity of the measured time intervals combined with the fact that all time measurements were taken at points at which the capacitance equaled known values of capacitance and the oscillator displacement equaled integral multiples of P/2, the system of equations 18 and 19 can be obtained.

$$x(t) = +\frac{P}{2} = A \cdot \cos\left(\omega_d \frac{\delta t_1^+}{2}\right) + \Delta \quad (18)$$

$$x(t) = -\frac{P}{2} = A \cdot \cos\left(\omega_d \frac{\delta t_1^-}{2}\right) + \Delta \quad (19)$$

The difference of equations 18 and 19 allows Δ to be determined as in equation 20.

$$A = \frac{P}{\cos\left(\omega_d \frac{\delta t_1^+}{2}\right) - \cos\left(\omega_d \frac{\delta t_1^-}{2}\right)} \quad (20)$$

The sum of the equations 18 and 19 allows Δ to be determined as in equation 21.

$$\Delta = -\frac{A}{2} \cdot \left[\cos\left(\omega_d \frac{\delta t_1^+}{2}\right) + \cos\left(\omega_d \frac{\delta t_1^-}{2}\right)\right] \quad (21)$$

In some examples, the non-monotonic property produced by monotonic motion of the movable element 102 is a non-monotonically, nonlinearly, and spatially varying capacitance. In some examples, the signal is a non-monotonically, nonlinearly, and spatially varying magnetic, optical, or piezoelectric signal. In some examples, a nonlinear signal is applied to structures other than MEMS devices. In some examples, a nonlinear signal is applied to MEMS structures such as rotational or linearly translated MEMS structures.

In some examples, a nonlinear signal is transformed into a time varying nonlinear signal via spatial oscillation of one movable component with respect to another. For example, one movable capacitive plate can oscillate with respect with another fixed capacitive plate. In some examples, the oscillations are due to an input forcing function, such as an electrostatic, magnetic, or physical drive that causes motion of the movable capacitive plate. The movable plate can oscillate a resonant frequency of the structure, or the moveable plate can oscillate at a frequency that is off resonance. In some examples, the movable plate oscillates due to a perturbing force such as an acceleration force. The perturbing force can act orthogonal to a drive velocity, which creates a time-varying periodic signal on an output axis at the same frequency, or harmonics thereof, as the drive velocity signal.

In some examples, an excitation field itself is varied with time. For example one or more of the components is attached to a compliant structure but is not actively driven into oscillation. Instead, the time varying signal is generated by varied by varying, for example, voltage between the components. External perturbations will act on the compliant component, causing modulation of the time-varying nonlinear signal produced by the component.

In some examples, creation of nonlinear periodic signals is performed at the sensor level. In some examples, creation of these nonlinear periodic signals is performed within electronics that interface with this sensor. Nonlinear, time varying, periodic signals can be created with arbitrary phase by varying physical structures of the sensor. For example, the structure on the movable portion can be offset from alignment with structures on the fixed portion by an arbitrary fraction of the pitch.

Nonlinear, non-monotonic, time varying signals can be generated with a fixed set of electrically decoupled structures with which a nonlinear time-varying force of variable phase is generated. The time-varying force may be caused by the application of voltages of equal magnitude and different phase to each of the set of structures. This generates signals at phases determined by the phase difference of the applied voltages.

Sets of nonlinear signals with identical or differing phases can be combined to form mathematical transforms between measured output signals and system variables such as amplitude, offset, temperature, and frequency. Combinations of nonlinear signals with identical or differing phases can be included to minimize or eliminate a time varying force imparted on a physical system that results from measurement of the nonlinear signal. For example, two separate signals can be included within the system at 0° and 180° of phase, such that each signal is the inverse of the other. An example set of signals of this nature are the signals +A*sin(ωt) and −A*sin(ωt) for phases of 0° and 180° respectively.

Mathematical relationships between the periodic nonlinear signals and external perturbations can be applied to extract inertial information. For example, mathematical relationships can be applied in a continuous fashion based on bandwidth and data rates of the system. In some examples, mathematical relationships can be applied in a periodic sampled fashion. Mathematical relationships can be applied in the time or the frequency domains. Harmonics generated by the sensor can be utilized mathematically to shift frequency content to enable filtering and removal of lower frequency, drift-inducing noise. Harmonics can also be used to render the sensor insensitive or immune to these drift-inducing noise sources by applying one or more mathematical relationships to decouple the inertial signal from other system variables.

Physical structures can result in a nonlinear, non-monotonic, time-varying capacitive signal. For sensing along the x and y axes (in the plane of the wafer), a self-aligned in-plane structure may be used. Teeth of this type of structure can be straight, square, rounded, triangular, sawtooth, or another shape, such as the shapes depicted in FIG. 5. A shape can be chosen to meet requirements of the application, the associated electronics or a mathematical transform used to analyze the signal, and can be chosen to maximize a capacitance, change a capacitance, a force derivative in capacitance, a second derivative in capacitance, or other similar quantities. In some of the implementations, parallel, periodic structures are formed in the top surface of one or more plates of a capacitor.

In some implementations, assist structures uniquely identify when external perturbations cause an offset in the physical structure of the device. Offsets can be integral or non-integral multiples of a pitch of tooth spacing. These assist structures are electrically isolated from one another and from the main nonlinear periodic signal.

To sense external perturbations in the z axis, normal to the plane of the wafer, corrugations may be formed on one or more surface of the sensor. In some examples, corrugated comb figures are formed with height differences. In some examples, vertically corrugated teeth are formed in a self-aligned in-plane structure used for x or y axis sensing. In some examples, vertical corrugations are added to one or more plates of a capacitor.

In some examples, materials used to form the device may be varied spatially to result in a time-varying component of capacitance resulting from device motion. For example, oxides, other dielectrics, metals, and other semiconductors can be deposited or patterned with spatial variations. These spatial variations in dielectric constant will result in time variations of capacitance when components of the sensor are moved relative to each other. In some examples, both top and bottom surfaces of silicon used to form a proof mass include vertical corrugations. In some examples, both top and bottom cap wafers surrounding the device layer of silicon include vertical corrugations. In some examples, one or more of spatial variations in material, corrugation of the top of the device layer of silicon, corrugation of the bottom device layer of silicon, corrugation of the top cap wafer, and corrugation of the bottom cap wafer are used to form the sensor. In some examples, a vernier capacitor structure is used to form the sensor.

Signals output by the systems and methods described herein can include acceleration forces, rotational forces, rotational accelerations, changes in pressure, changes in system temperature, and magnetic forces. In some examples, the output signal is a measure of the variation or stability of the amplitude of a periodic signal, such as the oscillator displacement. In some examples, the output signal is a measurement in the variation or stability of the frequency of the periodic signal. In some examples, the output is a measurement of the variation or stability of the phase of the periodic signal. In some examples, the output signal includes a measurement of time derivatives of acceleration, such as jerk, snap, crackle, and pop, which are the first, second, third, and fourth time derivatives of acceleration, respectively.

In some examples, periodicity in physical structures is utilized to detect relative translation of one of the structures by tracking rising and falling edges caused by local extrema of capacitance, these local extrema of capacitance corresponding to translation of multiples of one half-pitch of the structure periodicity. The number of edges counted can be translated into an external acceleration. In some examples, an oscillation is applied to the physical structure, and in other examples, no oscillation force is applied to the physical structure.

A nonlinear least-squares curve fit, such as the Levenburg Marquardt curve fit, can be used to fit the periodic signal to a periodic equation such as equation 22.

$$A \sin(Bt+C)+Dt+E \quad (22)$$

In equation 22, A represents amplitude, B represents frequency, C represents phase, E represents the offset of an external acceleration force, and D represents the first derivative of the external acceleration force, or the time-varying component of acceleration of the measurement. The measurement period is one-half of the oscillation cycle. Additionally, higher-order polynomial terms can be included for the acceleration as shown in equation 23.

$$A \sin(Bt+C)+Dt^3+Et^2+Ft+G+ \quad (23)$$

In some examples, the input perturbing acceleration force can be modeled as a cosine function as shown in equation 24, in which D and E represent the amplitude and frequency of the perturbing acceleration force, respectably.

$$A \sin(Bt+C)+D \cos(Et) \quad (24)$$

If the external perturbing acceleration is small in comparison to the internal acceleration of the oscillator itself, a linear approximation may be used to model the perturbing acceleration. In this case, the offset modulation is taken to be small in comparison to the overall amplitude of the generated periodic signal. By doing so, a measurement of a single time period can be taken to be linearly proportional to the external perturbing force. In some examples, multiple time periods may be linearly converted into acceleration and then averaged together to obtain lower noise floors and higher resolution.

In some examples, analysis in the frequency domain may be performed based on the periodic nature of the nonlinear signals being generated, as well as their respective phases. Frequency domain analysis can be used to reject common-mode noise. Additionally, the nonzero periodic rate of the signal can be used to filter out low frequency noise or to high-pass or band-pass the signal itself to mitigate low-frequency drift.

The electrodes 612 depicted in FIG. 6 are electrically isolated and separated by a constant-pitch spacing. In some examples, groups of three or more conductive lines are disposed on the device 600. In some examples, each group has different spacings with respect to one another. The groups of lines, instead of being electrically isolated, can be intentionally shorted together. The choice of configuration will affect the overall spatial dependence of the capacitive signal but may not change the locations of the zero-crossings if chosen appropriately. Electrically decoupled signals can be electrically summed at the circuit level either before or after the amplifier.

A second wafer, designated as a top cap wafer, is bonded to the structure 600 as shown in FIG. 7. The bottom side of this top cap wafer has similar arrangement of electrodes as the electrodes 612, with the exception that the spacings between each set or group on the top cap wafer are different from spacings on the base wafer. The spacings are such that one group of electrodes is perfectly aligned while the second and third groups are offset by an amount equal to $+/-d_0$. For the case of more than three electrically independent groups, additional offsets can be created.

The first derivative of capacitance with respect to displacement will be zero when one side of electrodes is perfectly overlapped with the corresponding set of electrodes on the top cap wafer 704. During overlap, the capacitance is maximized which causes a zero point in the capacitive slope. A zero in the first derivative further represents a zero current point, such as a transition between positive and negative currents. These transitional points can be detected by amplifying the signal to the rails using a high gain amplifier.

For a proof mass oscillating in the vertical direction according to equation 25, the time-varying capacitance C(t) can be obtained by the mathematical transformation shown in equation 26.

$$Z(t)=Z_0 \sin(2\pi f_0 t) \quad (25)$$

$$\frac{dC}{dt} = \frac{dC}{dZ}\frac{dZ}{dt} = \frac{dC}{dZ} \times 2\pi f_0 Z_0 \cos(2\pi f_0 t) \quad (26)$$

It will be apparent that aspects of the systems and methods described herein may be implemented in many different forms of software, firmware, and hardware in the implementations illustrated in the drawings. The actual software code or hardware configurations used to implement aspects consistent with the principles of the systems and method described herein is not limiting. Thus, the operation and behavior of the aspects of the systems and methods were described without reference to the specific software or hardware configurations—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method of processing a nonlinear periodic signal, the method comprising:
   receiving a nonlinear periodic input signal from an inertial sensor comprising a fixed element that includes a first plurality of equally spaced teeth and a moveable element that includes a second plurality of equally spaced teeth, the nonlinear periodic input signal experiencing a nonmonotonic change responsive to monotonic motion of the second plurality of equally spaced teeth relative to the first plurality of equally spaced teeth;
   converting the nonlinear periodic input signal to a two-valued signal having first and second values, based at least in part on the nonmonotonic change;
   determining first and second transition times between the first and second values;
   applying a trigonometric function to a time signal comprising the first and second transition times to determine a trigonometric result; and
   extracting an inertial parameter of the inertial sensor from the trigonometric result.

2. The method of claim 1, wherein applying the trigonometric function to the time signal comprising the first and second transition times further comprises:
   determining a first time interval between the first and second transition times; and
   applying the trigonometric function to the time signal comprising the first time interval to determine the trigonometric result.

3. The method of claim 1, wherein receiving the nonlinear periodic input signal comprises:
   receiving a first nonlinear periodic signal;
   receiving a second nonlinear periodic signal; and
   combining the first and second nonlinear periodic signals to result in the nonlinear periodic input signal.

4. The method of claim 1, wherein converting the nonlinear periodic input signal into the two-valued signal comprises:
   comparing a value of the nonlinear periodic input signal to a threshold;
   if the value of the nonlinear periodic input signal is above the threshold, assigning a first value to the two-valued signal to correspond to the value of the nonlinear periodic input signal; and
   if the value of the nonlinear periodic input signal is below the threshold, assigning a second value to the two-valued signal to correspond to the value of the nonlinear periodic input signal.

5. The method of claim 4, wherein determining a plurality of transition times comprises:
   comparing the two-valued signal to an immediately previous value of the two-valued signal;
   if the two-valued signal is above the immediately previous value, determining that the first transition time corresponds to a rising edge of the two-valued signal; and
   if the two-valued signal is below the immediately previous value, determining that the first transition time corresponds to a falling edge of the two-valued signal.

6. The method of claim 2, wherein applying the trigonometric function to the time signal comprising the first time interval further comprises:
   receiving a second time interval;
   determining a sum of the first and second time intervals;
   determining a ratio of one of the first and second time intervals to the sum;
   determining an argument based on the ratio; and
   applying a trigonometric function to the argument.

7. The method of claim 1, wherein extracting the inertial parameter from the trigonometric result comprises:
   determining a physical displacement of an oscillating element based on the trigonometric result; and
   determining the inertial parameter based on the physical displacement.

8. The method of claim 7, wherein the physical displacement is determined based on a plurality of trigonometric results.

9. The method of claim 8, wherein the physical displacement is determined based on a ratio including the plurality of trigonometric results.

10. The method of claim 7, wherein determining the inertial parameter comprises:
    determining an offset in the physical displacement; and
    determining the inertial parameter based on the offset.

11. The method of claim 10, wherein:
    the inertial parameter is an acceleration of the inertial sensor; and
    the offset is proportional to the acceleration.

12. A system for processing a nonlinear periodic signal, the system comprising:
    an inertial sensor comprising a fixed element that includes a first plurality of equally spaced teeth and a moveable element that includes a second plurality of equally spaced teeth, the moveable element disposed proximate to the fixed element to enable monotonic motion of the second plurality of equally spaced teeth, relative to the first plurality of equally spaced teeth, to cause a nonmonotonic change in a nonlinear periodic input signal; and
    control circuitry configured for:
       receiving the nonlinear periodic input signal from the inertial sensor;
       converting the nonlinear periodic input signal to a two-valued signal having first and second values, based at least in part on the nonmonotonic change;
       determining first and second transition times between the first and second values;

applying a trigonometric function to a time signal comprising the first and second transition times to determine a trigonometric result; and extracting an inertial parameter of the inertial sensor from the trigonometric result.

13. The system of claim 12, wherein applying the trigonometric function to the time signal comprising the first and second transition times further comprises:

determining a first time interval between the first and second transition times; and applying the trigonometric function to the time signal comprising the first time interval to determine the trigonometric result.

14. The system of claim 12, wherein the control circuitry is configured for receiving the nonlinear periodic input signal by:

receiving a first nonlinear periodic signal;

receiving a second nonlinear periodic signal; and combining the first and second nonlinear periodic signals to result in the nonlinear periodic input signal.

15. The system of claim 12, wherein the control circuitry is configured for converting the nonlinear periodic input signal into the two-valued signal by:

comparing a value of the nonlinear periodic input signal to a threshold;

if the value of the nonlinear input periodic signal is above the threshold, assigning a first value to the two-valued signal to correspond to the value of the nonlinear periodic input signal; and if the value of the nonlinear periodic input signal is below the threshold, assigning a second value to the two-valued signal to correspond to the value of the nonlinear periodic input signal.

16. The system of claim 15, wherein the control circuitry is configured for determining a plurality of transition times by:

comparing the two-valued signal to an immediately previous value of the two-valued signal;

if the two-valued signal is above the immediately previous value, determining that the first transition time corresponds to a rising edge of the two-valued signal; and if the two-valued signal is below the immediately previous value, determining that the first transition time corresponds to a falling edge of the two-valued signal.

17. The system of claim 13, wherein the control circuitry is configured for applying the trigonometric function to the time signal comprising the first time interval further by:

receiving a second time interval;

determining a sum of the first and second time intervals;

determining a ratio of one of the first and second time intervals to the sum;

determining an argument based on the ratio; and applying a trigonometric function to the time signal.

18. The system of claim 12, wherein the control circuitry is configured for extracting the inertial parameter from the trigonometric result by:

determining a physical displacement of an oscillating element based on the trigonometric result; and determining the inertial parameter based on the physical displacement.

19. The system of claim 18, wherein the control circuitry is configured for determining the physical displacement based on a plurality of trigonometric results.

20. The system of claim 19, wherein the control circuitry is configured for determining the physical displacement based on a ratio including the plurality of trigonometric results.

21. The system of claim 18, wherein the control circuitry is configured for determining the inertial parameter by:

determining an offset in the physical displacement; and determining the inertial parameter based on the offset.

22. The system of claim 21, wherein:

the inertial parameter is an acceleration of the inertial sensor; and the offset is proportional to the acceleration.

* * * * *